(12) United States Patent
Kopelman

(10) Patent No.: US 11,648,089 B2
(45) Date of Patent: May 16, 2023

(54) ORTHODONTIC APPLIANCES AND SYSTEMS WITH ELASTIC MEMBERS

(71) Applicant: Align Technology, Inc., San Jose, CA (US)

(72) Inventor: Avi Kopelman, Palo Alto, CA (US)

(73) Assignee: Align Technology, Inc., San Jose, CA (US)

( * ) Notice: Subject to any disclaimer, the term of this patent is extended or adjusted under 35 U.S.C. 154(b) by 385 days.

(21) Appl. No.: 16/926,432

(22) Filed: Jul. 10, 2020

(65) Prior Publication Data

US 2020/0337806 A1    Oct. 29, 2020

Related U.S. Application Data

(63) Continuation of application No. 14/609,970, filed on Jan. 30, 2015, now Pat. No. 10,758,323.

(60) Provisional application No. 61/934,657, filed on Jan. 31, 2014.

(51) Int. Cl.
*A61C 7/08* (2006.01)
*A61C 7/14* (2006.01)
*A61C 7/00* (2006.01)

(52) U.S. Cl.
CPC ............... *A61C 7/08* (2013.01); *A61C 7/14* (2013.01); *A61C 7/002* (2013.01)

(58) Field of Classification Search
CPC ............ A61C 7/002; A61C 7/17; A61C 7/08
USPC ........................................................ 433/24
See application file for complete search history.

(56) References Cited

U.S. PATENT DOCUMENTS

| 2,467,432 A | 4/1949 | Kesling |
| 3,237,305 A | 3/1966 | Hegedus |
| 3,334,417 A | 8/1967 | Spengeman |
| 3,407,500 A | 10/1968 | Kesling |

(Continued)

FOREIGN PATENT DOCUMENTS

| AU | 3031677 A | 5/1979 |
| AU | 517102 B2 | 7/1981 |

(Continued)

OTHER PUBLICATIONS

Gim-Alldent Deutschland, "Das DUX System: Die Technik," (with Certified English Translation), 5 pages total (2002).

(Continued)

*Primary Examiner* — Nicholas D Lucchesi
(74) *Attorney, Agent, or Firm* — Fortem IP LLP

(57) ABSTRACT

Orthodontic appliances and systems are provided. In some embodiments, an orthodontic appliance for repositioning a patient's teeth includes a first shell section shaped to receive a first portion of the patient's teeth and a first discontinuity formed on the first shell section, and a second shell section shaped to receive a second portion of the patient's teeth and a second discontinuity formed on the second shell section. The orthodontic appliance can also include a first elastic member coupled to the first shell section, such that the first elastic member interacts with the first discontinuity to exert a first force on the first portion of the patient's teeth. The orthodontic appliance can also include a second elastic member coupled to the second shell section, such that the second elastic member interacts with the second discontinuity to exert a second force on the second portion of the patient's teeth.

30 Claims, 47 Drawing Sheets

(56) References Cited

U.S. PATENT DOCUMENTS

| | | |
|---|---|---|
| 3,593,421 A | 7/1971 | Allen |
| 3,600,808 A | 8/1971 | Reeve et al. |
| 3,660,900 A | 5/1972 | Andrews et al. |
| 3,683,502 A | 8/1972 | Wallshein et al. |
| 3,738,005 A | 6/1973 | Cohen et al. |
| 3,762,050 A | 10/1973 | Dal Pont |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 3,988,832 A | 11/1976 | Wallshein |
| 4,014,096 A | 3/1977 | Dellinger |
| 4,195,046 A | 3/1980 | Kesling et al. |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,413,978 A | 11/1983 | Kurz |
| 4,478,580 A | 10/1984 | Barrut et al. |
| 4,500,294 A | 2/1985 | Lewis et al. |
| 4,504,225 A | 3/1985 | Yoshii |
| 4,505,673 A | 3/1985 | Yoshii et al. |
| 4,526,540 A | 7/1985 | Dellinger et al. |
| 4,575,330 A | 3/1986 | Hull et al. |
| 4,575,805 A | 3/1986 | Moermann et al. |
| 4,591,341 A | 5/1986 | Andrews et al. |
| 4,609,349 A | 9/1986 | Cain et al. |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling et al. |
| 4,676,747 A | 6/1987 | Kesling et al. |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz et al. |
| 4,798,534 A | 1/1989 | Breads et al. |
| 4,836,778 A | 6/1989 | Baumrind et al. |
| 4,837,732 A | 6/1989 | Brandestini et al. |
| 4,850,864 A | 7/1989 | Diamond et al. |
| 4,850,865 A | 7/1989 | Napolitano et al. |
| 4,856,991 A | 8/1989 | Breads et al. |
| 4,877,398 A | 10/1989 | Kesling et al. |
| 4,880,380 A | 11/1989 | Martz et al. |
| 4,889,238 A | 12/1989 | Batchelor et al. |
| 4,890,608 A | 1/1990 | Steer et al. |
| 4,935,635 A | 6/1990 | O'Harra et al. |
| 4,936,862 A | 6/1990 | Walker et al. |
| 4,937,928 A | 7/1990 | Van der Zel et al. |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell et al. |
| 5,011,405 A | 4/1991 | Lemchen |
| 5,017,133 A | 5/1991 | Miura et al. |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman et al. |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax et al. |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson et al. |
| 5,342,202 A | 8/1994 | Deshayes et al. |
| 5,368,478 A | 11/1994 | Andreiko et al. |
| 5,382,164 A | 1/1995 | Stern et al. |
| 5,395,238 A | 3/1995 | Andreiko et al. |
| 5,431,562 A | 7/1995 | Andreiko et al. |
| 5,440,326 A | 8/1995 | Quinn et al. |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern et al. |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. et al. |
| 5,621,648 A | 4/1997 | Crump et al. |
| 5,645,420 A | 7/1997 | Bergersen et al. |
| 5,645,421 A | 7/1997 | Slootsky et al. |
| 5,655,653 A | 8/1997 | Chester et al. |
| 5,683,243 A | 11/1997 | Andreiko et al. |
| 5,692,894 A | 12/1997 | Schwartz et al. |
| 5,725,376 A | 3/1998 | Poirier et al. |
| 5,725,378 A | 3/1998 | Wang et al. |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson et al. |
| 5,823,778 A | 10/1998 | Schmitt et al. |
| 5,848,115 A | 12/1998 | Little et al. |
| 5,857,853 A | 1/1999 | Van Nifterick et al. |
| 5,866,058 A | 2/1999 | Batchelder et al. |
| 5,879,158 A | 3/1999 | Doyle et al. |
| 5,880,961 A | 3/1999 | Crump et al. |
| 5,880,962 A | 3/1999 | Andersson et al. |
| 5,934,288 A | 8/1999 | Avila et al. |
| 5,957,686 A | 9/1999 | Anthony et al. |
| 5,964,587 A | 10/1999 | Sato et al. |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda et al. |
| 6,049,743 A | 4/2000 | Baba et al. |
| 6,062,861 A | 5/2000 | Andersson |
| 6,068,482 A | 5/2000 | Snow et al. |
| 6,099,314 A | 8/2000 | Kopelman et al. |
| 6,123,544 A | 9/2000 | Cleary |
| 6,152,731 A | 11/2000 | Jordan et al. |
| 6,178,967 B1 | 1/2001 | Barnes, Sr. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren et al. |
| 6,244,861 B1 | 6/2001 | Andreiko et al. |
| 6,293,790 B1 | 9/2001 | Hilliard |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier et al. |
| 6,386,864 B1 | 5/2002 | Kuo |
| 6,398,548 B1 | 6/2002 | Muhammad et al. |
| 6,402,707 B1 | 6/2002 | Ernst et al. |
| 6,450,807 B1 | 9/2002 | Chishti et al. |
| 6,454,565 B2 | 9/2002 | Phan et al. |
| 6,471,511 B1 | 10/2002 | Chishti et al. |
| 6,482,298 B1 | 11/2002 | Bhatnagar et al. |
| 6,524,101 B1 | 2/2003 | Phan et al. |

(56) References Cited

U.S. PATENT DOCUMENTS

| | | | |
|---|---|---|---|
| 6,554,611 B2 | 4/2003 | Shishti et al. |
| 6,572,372 B1 | 6/2003 | Phan et al. |
| 6,629,840 B2 | 10/2003 | Chishti et al. |
| 6,702,575 B2 | 3/2004 | Hilliard |
| 6,705,863 B2 | 3/2004 | Phan et al. |
| 6,722,880 B2 | 4/2004 | Chishti et al. |
| 6,749,414 B1 | 6/2004 | Hanson et al. |
| 6,830,450 B2 | 12/2004 | Knopp et al. |
| 7,077,646 B2 | 7/2006 | Hilliard |
| 7,553,157 B2 | 6/2009 | Abolfathi et al. |
| 7,637,262 B2 | 12/2009 | Bailey et al. |
| 7,810,503 B2 | 10/2010 | Magnin |
| 7,831,322 B2 | 11/2010 | Liu et al. |
| 7,878,801 B2 | 2/2011 | Abolfathi et al. |
| 7,892,474 B2 | 2/2011 | Shkolnik et al. |
| 8,118,592 B2 | 2/2012 | Tortorici et al. |
| 8,439,672 B2 | 5/2013 | Matov et al. |
| 8,439,674 B2 | 5/2013 | Li et al. |
| 8,444,412 B2 | 5/2013 | Baughman et al. |
| 8,517,726 B2 | 8/2013 | Kakavand et al. |
| 8,758,009 B2 | 6/2014 | Chen et al. |
| 8,858,226 B2 | 10/2014 | Phan et al. |
| 8,899,976 B2 | 12/2014 | Chen et al. |
| 8,899,977 B2 | 12/2014 | Cao et al. |
| 9,655,691 B2 | 5/2017 | Li et al. |
| 9,795,460 B2 | 10/2017 | Martz et al. |
| 9,937,018 B2 * | 4/2018 | Martz | A61C 7/08 |
| 10,179,035 B2 * | 1/2019 | Shivapuja | A61C 13/0013 |
| 10,299,894 B2 | 5/2019 | Tanugula et al. |
| 10,555,792 B2 | 2/2020 | Kopelman et al. |
| 10,758,323 B2 * | 9/2020 | Kopelman | A61C 7/14 |
| 2001/0041320 A1 | 11/2001 | Phan et al. |
| 2002/0006597 A1 | 1/2002 | Andreiko et al. |
| 2002/0051951 A1 | 5/2002 | Chishti et al. |
| 2002/0187451 A1 * | 12/2002 | Phan | B29C 48/154 |
| | | | 433/6 |
| 2002/0192617 A1 | 12/2002 | Phan et al. |
| 2003/0009252 A1 | 1/2003 | Pavlovskaia et al. |
| 2003/0139834 A1 | 7/2003 | Nikolskiy et al. |
| 2003/0190575 A1 | 10/2003 | Hilliard |
| 2003/0198911 A1 | 10/2003 | Knopp et al. |
| 2003/0198912 A1 | 10/2003 | Mah |
| 2003/0207224 A1 | 11/2003 | Lotte et al. |
| 2003/0224311 A1 | 12/2003 | Cronauer et al. |
| 2004/0067463 A1 | 4/2004 | Rosenberg |
| 2004/0128010 A1 | 7/2004 | Pavlovskaia et al. |
| 2004/0166462 A1 | 8/2004 | Phan et al. |
| 2004/0209218 A1 | 10/2004 | Chishti et al. |
| 2004/0229185 A1 | 11/2004 | Knopp |
| 2005/0048433 A1 | 3/2005 | Hilliard et al. |
| 2005/0055118 A1 | 3/2005 | Nikolskiy et al. |
| 2005/0100853 A1 | 5/2005 | Tadros et al. |
| 2005/0186524 A1 | 8/2005 | Abolfathi et al. |
| 2005/0186526 A1 | 8/2005 | Stewart et al. |
| 2005/0208450 A1 | 9/2005 | Sachdeva et al. |
| 2005/0233276 A1 | 10/2005 | Kopelman et al. |
| 2006/0068353 A1 | 3/2006 | Abolfathi et al. |
| 2006/0078841 A1 | 4/2006 | Desimone et al. |
| 2006/0093992 A1 | 5/2006 | Wen |
| 2006/0199142 A1 | 9/2006 | Liu et al. |
| 2006/0199153 A1 | 9/2006 | Liu et al. |
| 2007/0231765 A1 * | 10/2007 | Phan | A61C 19/003 |
| | | | 433/6 |
| 2007/0275340 A1 | 11/2007 | Kopelman et al. |
| 2008/0050692 A1 | 2/2008 | Hilliard |
| 2008/0254402 A1 | 10/2008 | Hilliard |
| 2008/0268400 A1 | 10/2008 | Moss et al. |
| 2009/0014013 A1 | 1/2009 | Magnin |
| 2009/0061375 A1 | 3/2009 | Yamamoto et al. |
| 2009/0098500 A1 | 4/2009 | Diaz Rendon |
| 2009/0191502 A1 | 7/2009 | Cao et al. |
| 2009/0298006 A1 | 12/2009 | Schwartz |
| 2010/0068671 A1 | 3/2010 | Kakavand et al. |
| 2010/0075268 A1 | 3/2010 | Duran |
| 2010/0086890 A1 | 4/2010 | Kuo |
| 2010/0092905 A1 | 4/2010 | Martin |
| 2010/0138025 A1 | 6/2010 | Morton et al. |
| 2010/0151404 A1 | 6/2010 | Wu et al. |
| 2010/0279245 A1 | 11/2010 | Navarro |
| 2011/0020761 A1 | 1/2011 | Kalili |
| 2011/0039223 A1 | 2/2011 | Li et al. |
| 2011/0185525 A1 | 8/2011 | Stapelbroek et al. |
| 2011/0269091 A1 | 11/2011 | Li et al. |
| 2011/0269092 A1 | 11/2011 | Kuo et al. |
| 2011/0281229 A1 | 11/2011 | Abolfathi |
| 2012/0082950 A1 | 4/2012 | Li et al. |
| 2012/0150494 A1 | 6/2012 | Anderson et al. |
| 2012/0270173 A1 | 10/2012 | Pumphrey et al. |
| 2012/0282565 A1 | 11/2012 | Adell |
| 2013/0078594 A1 | 3/2013 | Leslie-Martin et al. |
| 2013/0089828 A1 | 4/2013 | Borovinskih et al. |
| 2013/0095446 A1 | 4/2013 | Andreiko et al. |
| 2013/0122448 A1 | 5/2013 | Kitching et al. |
| 2013/0157213 A1 | 6/2013 | Arruda |
| 2013/0204583 A1 | 8/2013 | Matov et al. |
| 2013/0244194 A1 | 9/2013 | Bergersen |
| 2013/0302742 A1 | 11/2013 | Li et al. |
| 2013/0323665 A1 | 12/2013 | Dinh et al. |
| 2014/0011162 A1 | 1/2014 | Zegarelli |
| 2014/0061974 A1 | 3/2014 | Tyler |
| 2014/0178829 A1 | 6/2014 | Kim |
| 2014/0193767 A1 | 7/2014 | Li et al. |
| 2014/0265034 A1 | 9/2014 | Dudley |
| 2014/0300676 A1 | 10/2014 | Miller et al. |
| 2014/0363779 A1 | 12/2014 | Kopelman et al. |
| 2015/0097315 A1 | 4/2015 | Desimone et al. |
| 2015/0097316 A1 | 4/2015 | Desimone et al. |
| 2015/0102532 A1 | 4/2015 | Desimone et al. |
| 2015/0157421 A1 | 6/2015 | Martz et al. |
| 2015/0216627 A1 | 8/2015 | Kopelman |
| 2015/0238283 A1 | 8/2015 | Tanugula et al. |
| 2015/0257856 A1 | 9/2015 | Martz et al. |
| 2015/0265376 A1 | 9/2015 | Kopelman |
| 2015/0305832 A1 | 10/2015 | Patel |
| 2015/0366637 A1 | 12/2015 | Kopelman et al. |
| 2015/0366638 A1 | 12/2015 | Kopelman et al. |
| 2016/0081769 A1 | 3/2016 | Kimura et al. |
| 2016/0128803 A1 | 5/2016 | Webber et al. |
| 2016/0135925 A1 | 5/2016 | Mason et al. |
| 2017/0007367 A1 | 1/2017 | Li et al. |
| 2017/0007368 A1 | 1/2017 | Boronkay |
| 2017/0007371 A1 | 1/2017 | Robichaud |
| 2017/0100210 A1 | 4/2017 | Wen |
| 2017/0367792 A1 | 12/2017 | Raby et al. |
| 2017/0367793 A1 | 12/2017 | Veis |
| 2018/0000564 A1 | 1/2018 | Cam et al. |
| 2020/0170757 A1 | 6/2020 | Kopelman et al. |

FOREIGN PATENT DOCUMENTS

| | | |
|---|---|---|
| AU | 5598894 A | 6/1994 |
| CA | 1121955 A | 4/1982 |
| CN | 1575782 A | 2/2005 |
| CN | 1655731 A | 8/2005 |
| CN | 1684638 A | 10/2005 |
| CN | 101188981 A | 5/2008 |
| CN | 101404952 A | 4/2009 |
| CN | 202589687 U | 12/2012 |
| CN | 103340690 A | 10/2013 |
| DE | 2749802 A1 | 5/1978 |
| DE | 69327661 T2 | 7/2000 |
| DE | 102010036107 A1 | 3/2012 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| EP | 1806064 A1 | 7/2007 |
| EP | 2000110 A2 | 12/2008 |
| EP | 2138124 A1 | 12/2009 |
| ES | 463897 A1 | 1/1980 |

(56) References Cited

FOREIGN PATENT DOCUMENTS

| | | |
|---|---|---|
| FR | 2369828 A1 | 6/1978 |
| FR | 2652256 A1 | 3/1991 |
| FR | 2872406 A1 | 1/2006 |
| GB | 1550777 A | 8/1979 |
| JP | S5358191 A | 5/1978 |
| JP | H0428359 A | 1/1992 |
| JP | 08508174 | 9/1996 |
| JP | H08508174 A | 9/1996 |
| JP | 2004016632 A | 1/2004 |
| JP | 2007260158 A | 10/2007 |
| JP | 4184427 B1 | 11/2008 |
| JP | 2009153577 A | 7/2009 |
| JP | 2013123626 A | 6/2013 |
| KR | 200465679 Y1 | 3/2013 |
| TW | M464148 U | 11/2013 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |
| WO | WO-0180764 A1 | 11/2001 |
| WO | WO-2006044012 A1 | 4/2006 |
| WO | WO-2006096558 A2 | 9/2006 |
| WO | WO-2007110071 A1 | 10/2007 |
| WO | WO-2008073766 A2 | 6/2008 |
| WO | WO-2015114450 A1 | 8/2015 |
| WO | WO-2015140614 A1 | 9/2015 |
| WO | WO-2015193709 A1 | 12/2015 |
| WO | WO-2015193710 A1 | 12/2015 |

OTHER PUBLICATIONS

Mormann et al., "Marginale Adaptation von adhasuven Porzellaninlays in vitro," (with Certified English Translation), Separatdruck aus: Schweiz. Mschr. Zahnmed. 95: 1118-1129, 1985, (total of 24 pages).
Siemens, "CEREC—Computer-Reconstruction," (with Certified English Translation), High Tech in der Zahnmedizin, 29 pages total (2004).
Sirona Dental Systems GmbH, CEREC 3D, Manuel utilisateur, Version 2.0X (in French with Certified English Translation), 2003, 229 pages total.
AADR. American Association for Dental Research, Summary of Activities, Mar. 20-23, 1980, Los Angeles, CA, p. 195.
Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.
Alexander et al., "The DigiGraph Work Station Part 2 Clinical Management," JCO, pp. 402-407 (Jul. 1990).
Altschuler, "3D Mapping of Maxillo-Facial Prosthesis," AADR Abstract #607, 2 pages total, (1980).
Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.
Altschuler et al., "Laser Electro-Optic System for Rapid Three-Dimensional (3D) Topographic Mapping of Surfaces," Optical Engineering, 20(6):953-961 (1981).
Altschuler et al., "Measuring Surfaces Space-Coded by a Laser-Projected Dot Matrix," SPIE Imaging Applications for Automated Industrial inspection and Assembly, vol. 182, p. 187-191 (1979).
Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapter 3, pp. 13-24 (1989).
Bartels, et al., An Introduction to Splines for Use in Computer Graphics and Geometric Modeling, Morgan Kaufmann Publishers, pp. 422-425 (1987).
Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.
Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.
Baumrind et al., "Mapping the Skull in 3-D," reprinted from J. Calif. Dent. Assoc., 48(2), 11 pages total, (1972 Fall Issue).
Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Opeation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL http://astronomy.swin.edu.au/—pbourke/prolection/coords.
Boyd et al., "Three Dimensional Diagnosis and Orthodontic Treatment of Complex Malocclusions With the Invisalign Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form in Predetermination, Am, Journal of Orthodontics, vol. 79, No. 2 (Feb. 1981), pp. 115-133.
Burstone (interview), "Dr. Charles J. Burstone on the Uses of the Computer in Orthodontic Practice (Part 1)," J. Clin. Orthod., 13(7):442-453 (Jul. 1979).
Burstone (interview), "Dr. Charles J. Burstone on the Uses of the Computer in Orthodontic Practice (Part 2)," J. Clin. Orthod., 13(8):539-551 (Aug. 1979).
Carbon3D. CLIP Technology. A new approach to 3D printing. 2015. http://carbon3d.com/Accessed Jul. 1, 2015.
Cardinal Industrial Finishes, Powder Coatings information posted at http://www.cardinalpaint.com on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.

(56) References Cited

OTHER PUBLICATIONS

Composite material. Wikipedia. Last modified Jun. 22, 2015. https://en.wikipedia.org/wiki/Composite_material.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision, "Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992.
Definition for gingiva. Dictionary.com p. 1-3. Retrieved from the internet Nov. 5, 2004 http://reference.com/search/search?q=gingiva.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at http://www.dent-x.com/DentSim.htm, 6 pages.
Desimone. What if 3D printing was 100% faster? TEDtalk. Mar. 2015. http://www.ted.com/talks/joe_desimone_what_if_3d_printing_was_25x_faster.
Doyle, "Digital Dentistry," Computer Graphics World, pp. 50-52, 54 (Oct. 2000).
DuraClearTM product information, Allesee Orthodontic Appliances-Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et al., "Automated Finite Element Modeling of a Human Mandible with Dental Implants," JS WSCG '98—Conference Program, retrieved from the Internet: http://wscg.zcu.cz/wscg98/papers98/Strasser 98.pdf, 8 pages.

Gao et al., "3-D element Generation for Multi-Connected Complex Dental and Mandibular Structure," Proc. Intl Workshop on Medical Imaging and Augmented Reality, pp. 267-271 (Jun. 12, 2001).
Gim-Alldent Deutschland, "Das DUX System: Die Technik," 2 pages total (2002).
Gottleib et al., "JCO Interviews Dr. James A. McNamura, Jr., on the Frankel Appliance: Part 2: Clinical 1-1 Management,"J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxillofacial Surgery," AAOMS, 3 pages total, (Sep. 13, 1990).
Guess et al., "Computer Treatment Estimates in Orthodontics and Orthognathic Surgery," JCO, pp. 262-28 (Apr. 1989).
Halterman. A path to the future—continuous composite 3D printing. Nov. 12, 2014. http://www.3dprinterworld.com/article/path-future-continuous-composite-3d-printing.
Heaven et al., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . .
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hipolite. Helios One 3D Printer—New Heliolithography Technology Could Eventually Replace SLA and FDM. Jul. 2, 2014. http://3dprint.com/7958/orange-maker-helio-one-3d/.
Hoffmann, et al., "Role of Cephalometry for Planning of Jaw Orthopedics and Jaw Surgery Procedures," (Article Summary in English, article in German), Informationen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
Important Tip About Wearing the Red White & Blue Active Clear Retainer System. Allesee Orthodontic Appliances-Pro Lab. 1 page (1998).
International search report and written opinion dated Apr. 23, 2015 for PCT/IB2015/000104.
International search report and written opinion dated May 13, 2015 for PCT/IB2015/000108.
International search report and written opinion dated May 19, 2015 for PCT/IB2015/000112.
International search report and written opinion dated Jul. 31, 2015 for PCT/IB2015/000106.
JCO Interviews, "Craig Andreiko , DDS, MS on the Elan and Orthos Systems," JCO, pp. 459-468 (Aug. 1994).
JCO Interviews, "Dr. Homer W. Phillips on Computers in Orthodontic Practice, Part 2," JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports on Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).

(56) References Cited

OTHER PUBLICATIONS

Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991).
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Clin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—as Easy as One, Two, Three," AOA/Pro Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).
Nishiyama et al., "A New Construction of Tooth Repositioner by LTV Vinyl Silicone Rubber," J. Nihon Univ. Sch. Dent., 19(2):93-102 (1977).
Objet Geometries. Wikipedia. Last modified Jul. 17, 2014. https://en.wikipedia.org/wiki/Objet_Geometries.
Orange Maker. High resolution 3D printing technology. 2015. http://www.orangemaker.com/. Accessed Jul. 1, 2015.
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
Procera Research Projects, "Procera Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances, http://www.essix.com/magazine/defaulthtml Aug. 13, 1997.

Rapid prototyping. Protosys Technologies. 2005. http://www.protosystech.com/rapid-prototyping.htm. Accessed Jul. 1, 2015.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording the Dental Cast in Three Dimensions," Am. J. Orthod. Dentofacial Orthop., 92(3):199-206 (Sep. 1987).
Rudge, "Dental Arch Analysis: Arch Form, a Review of the Literature," Eur. J. Orthod., 3(4):279-284 1981.
Sakuda et al., "Integrated Information-Processing System in Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolaryngol Head Neck Surg., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee Orthodontic Appliances-Pro Lab product information, 6 pages (2003).
The Choice Is Clear: Red, White & Blue . . . The Simple, Affordable, No-Braces Treatment, Allesee HI Orthodontic Appliances-Pro Lab product information for doctors. http://ormco.com/aoa/appliancesservices/RWB/doctorhtml, 5 pages (May 19, 2003).
The Choice is Clear: Red, White & Blue . . . The Simple, Affordable, No-Braces Treatment, Allesee HJ Orthodontic Appliances-Pro Lab product information for patients, (http://ormco.com/aoa/appliancesservices/RWB/patients.html), 2 pages (May 19, 2003).

(56) References Cited

OTHER PUBLICATIONS

The Orange Maker Spins the Plate to Make Better 3D Prints. Newloop Tech and Gadgets. YouTube. Jul. 11, 2014. https://www.youtube.com/watch?v=MpzPWURWfZk.
The Red, White & Blue Way to Improve Your Smile!, Allesee Orthodontic Appliances-Pro Lab product information for patients, 2 pages (1992).
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Appl. No. 14/609,970, filed Jan. 30, 2015.
U.S. Appl. No. 14/610,027, filed Jan. 30, 2015.
U.S. Appl. No. 14/610,060, filed Jan. 30, 2015.
U.S. Appl. No. 14/610,108, filed Jan. 30, 2015.
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993.
Varady et al., "Reverse Engineering of Geometric Models—An Introduction," Computer-Aided Design, 29(4):255-268, 1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 388-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987).
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
Written opinion of the international preliminary examining authority dated Jan. 14, 2016 for PCT/IB2015/000112.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL(http://wscg.zcu.cz/wscg98/wscg98.h).
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III—The General Concept of the D.P. Method and Its Therapeutic Effect, Part 2. Skeletal Reversed Occlusion Case Reports," Nippon Dental Review, 458:112-129 (Dec. 1980).
You May Be a Candidate for This Invisible No-Braces Treatment, Allesee Orthodontic Appliances-Pro Lab product information for patients, 2 pages (2002).

* cited by examiner

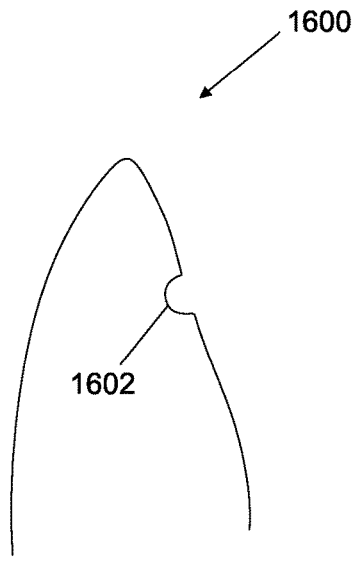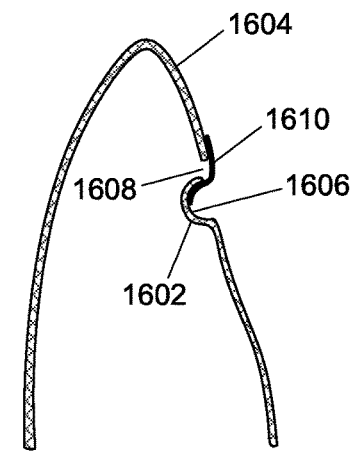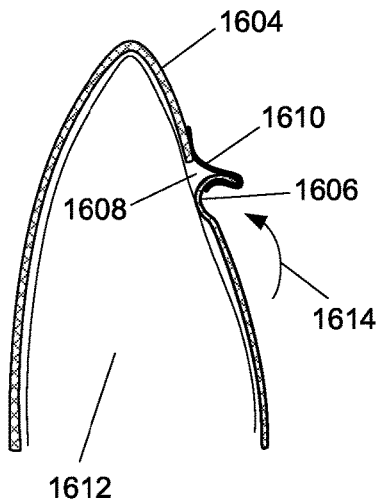
FIG. 16A  FIG. 16B  FIG. 16C
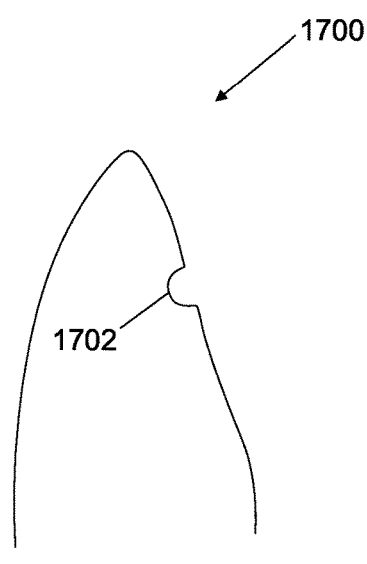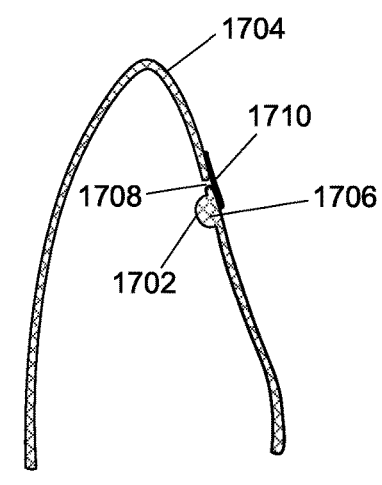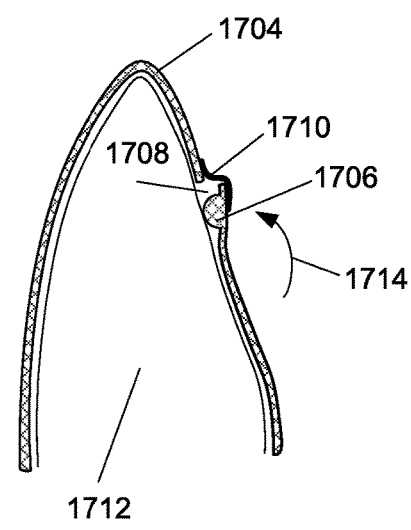
FIG. 17A  FIG. 17B  FIG. 17C

ORTHODONTIC APPLIANCES AND SYSTEMS WITH ELASTIC MEMBERS

CROSS-REFERENCE

This application is a continuation of U.S. application Ser. No. 14/609,970, filed Jan. 30, 2015, which claims the benefit of U.S. Provisional Application No. 61/934,657, filed Jan. 31, 2014, which applications are incorporated herein by reference in their entirety.

BACKGROUND

Orthodontic procedures typically involve repositioning a patient's teeth to a predetermined arrangement in order to correct malocclusions and/or improve aesthetics. To achieve these objectives, orthodontic appliances such as braces, retainers, shell aligners, and the like can be applied to the patient's teeth by an orthodontic practitioner. Typically, the appliance is configured to exert force on one or more teeth in order to effect desired tooth movements. The application of force can be periodically adjusted by the practitioner (e.g., by altering the appliance or using different types of appliances) in order to incrementally reposition the teeth to a desired arrangement.

In some instances, however, current orthodontic appliances may not be able to effectively generate the forces needed to achieve the desired tooth repositioning, or may not afford sufficient control over the forces applied to the teeth. Additionally, the rigidity of some existing appliances may interfere with the ability of the appliance to be coupled to the patient's teeth and may increase patient discomfort.

SUMMARY

Improved orthodontic appliances, as well as related systems and methods, are provided. In many embodiments, an orthodontic appliance configured to be worn on a patient's teeth includes a discontinuity and an elastic member interacting or configured to interact with the discontinuity. The appliances described herein provide enhanced control over forces exerted onto the teeth, thus enabling improved orthodontic treatment procedures.

Accordingly, in one aspect, an orthodontic appliance is provided. The appliance includes a shell having a plurality of cavities shaped to receive teeth and a discontinuity formed in the shell. In many embodiments, an elastic member is directly coupled to the shell at first and second attachment points and positioned to interact with the discontinuity.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 16A is a cross-sectional view of the internal surface profile of an orthodontic appliance including a protrusion, in accordance with many embodiments;

FIG. 16B is a cross-sectional view of a shell of the appliance of FIG. 16A;

FIG. 16C illustrates the shell of FIG. 16B when placed over a tooth;

FIG. 17A is a cross-sectional view of the internal surface profile of another exemplary orthodontic appliance including a protrusion, in accordance with many embodiments;

FIG. 17B is a cross-sectional view of a shell of the appliance of FIG. 17A;

FIG. 17C illustrates the shell of FIG. 17B when placed over a tooth;

DETAILED DESCRIPTION

Figure 1A:
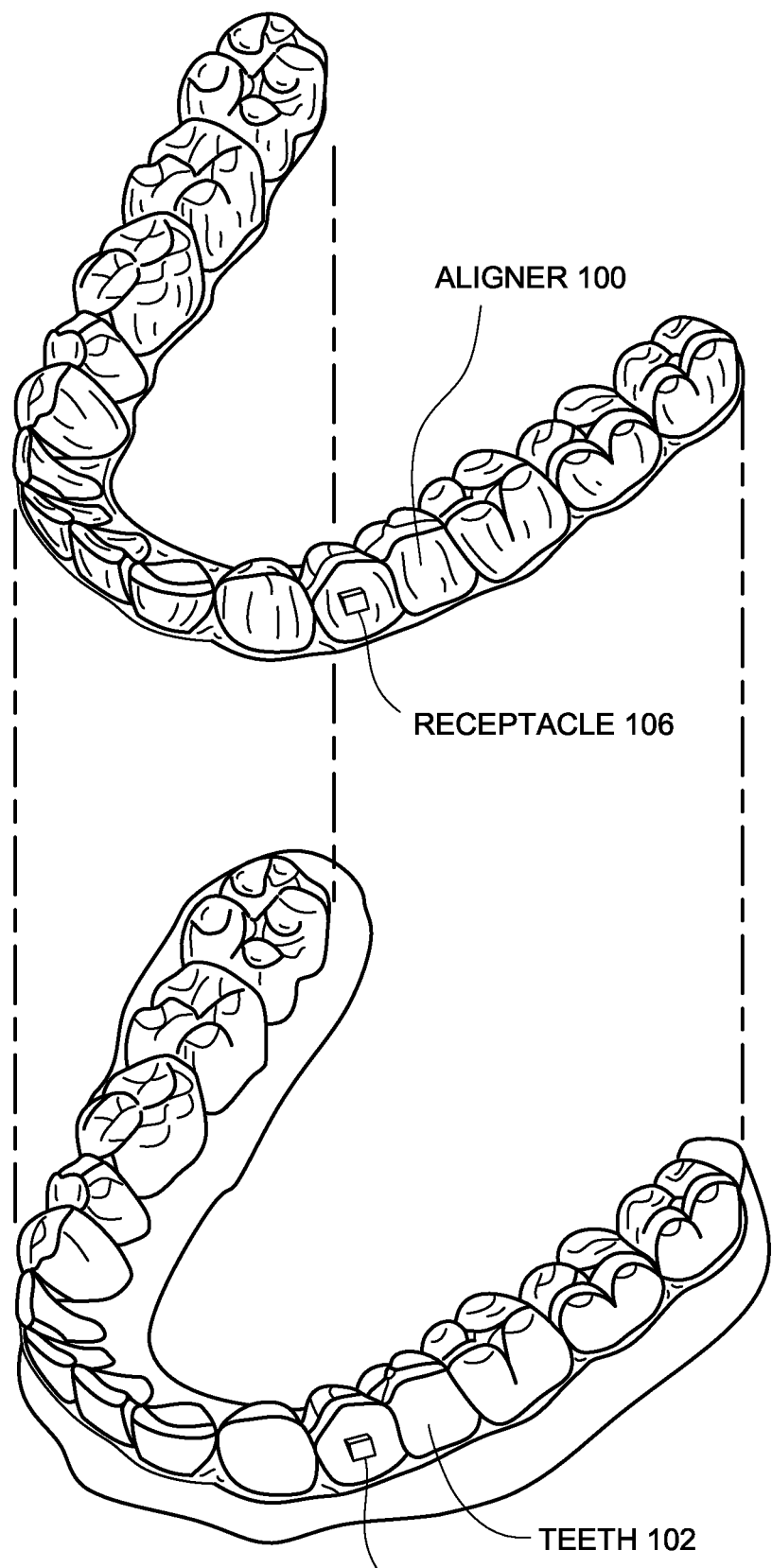
FIG. 1A illustrates a tooth repositioning appliance, in accordance with many embodiments.

The orthodontic appliances described herein, along with related systems and methods, can be employed as part of an orthodontic treatment procedure in order to reposition one or more teeth, maintain a current position of one or more teeth, or suitable combinations thereof. Such appliances can include a shell shaped to receive the patient's teeth, with the geometry of the shell being selected to exert appropriate forces on the teeth in order to achieve the desired positioning of teeth. In many embodiments, the orthodontic appliances described herein utilize one or more elastic members (also referred to herein as "elastics") acting in conjunction with one or more discontinuities formed in the shell to apply orthodontic forces to the teeth. The geometry and configuration of the one or more discontinuities and/or the one or more elastic members can be selected to control the magnitude and direction of the applied forces. In contrast to existing approaches, in which one or more elastics are fastened to the teeth or to one or more attachments mounted onto the teeth, the appliances disclosed herein employ one or more elastic members directly coupled to the shell and exerting force on the teeth via interaction with the discontinuity. Such appliances may be used to generate larger and/or more precisely controlled forces for orthodontic applications. Furthermore, the geometry and configuration of the one or more discontinuities and/or the one or more elastics can be used to adjust the local compliance of the appliance, thus improving appliance fit and reducing patient discomfort. Additionally, by locally controlling the compliance of the shell, the techniques described herein can be used to ensure that some or all points on the appliance intended to exert forces on the teeth (also known as "active points") maintain sufficient contact with the teeth throughout the treatment process, thus improving the precision and efficiency of repositioning. The amount of force exerted on the teeth at each active point can vary based on the compliance of the shell, as well as on the configuration of the discontinuities and/or elastics.

Thus, in one aspect, an orthodontic appliance can include a shell having a plurality of cavities shaped to receive teeth, and a discontinuity formed in the shell. The appliance also includes an elastic member having a first portion directly coupled to the shell at a first attachment point and a second portion directly coupled to the shell at a second attachment point. The elastic member can be positioned to interact with the discontinuity. For example, the elastic member can interact with regions of the shell on opposing sides of the discontinuity, thereby accommodating changes in configuration and/or size of the discontinuity during mounting of the appliance onto teeth and/or during resulting repositioning of one or more teeth.

An orthodontic appliance can be configured to accommodate an attachment coupled to a tooth. A portion of the elastic member between the first and second attachment points can be engaged or engageable with the attachment.

An orthodontic appliance can be configured to reduce one or more spaces between teeth. For example, an orthodontic appliance can include one or more elastic members and one or more discontinuities that are configured to elicit a movement of the teeth that reduces the size of an interproximal space between the teeth when the appliance is worn on the teeth.

Any suitable configuration and/or number of discontinuities can be employed. For example, the discontinuity can be or include an aperture in the shell, a cut in the shell, or a deformation of the shell.

In many embodiments, a portion of the elastic member between the first and second attachment points extends along a surface of the shell such that the portion spans a plurality of the cavities. The discontinuity can include a plurality of openings in the shell disposed between the first and second attachment points. Each of the plurality of openings can be adjacent to or near an interproximal region of the teeth when the appliance is worn on the teeth.

In many embodiments, a mesial-distal arch length of the shell is shorter or adapted to be shorter when the appliance is not being worn on the teeth and is longer or adapted to be longer when the appliance is being worn on the teeth. For example, the orthodontic appliance can include one or more discontinuities and one or more elastics such that the arch length of the shell depends on whether or not the appliance is being worn on the teeth. As another example, the discontinuity can divide the shell into discrete segments with one or more elastics coupling the segments, such that the segments are movable relative to each other to enable the arch length of the shell to change depending on whether or not the appliance is being worn on the teeth.

The orthodontic appliance may include one or more elastics that span a discontinuity. For example, an orthodontic appliance can include a discontinuity in the form of an elongate opening in the shell, with a portion of the elastic member between the first and second attachment points spanning the elongate opening.

In many embodiments, the first and second attachment points are disposed on the shell, such that a portion of the elastic member between the first and second attachment points is adjacent to or near an interproximal region of the teeth when the appliance is worn on the teeth. For example, the first attachment point can be disposed on a lingual surface of the shell and the second attachment point can be disposed on a buccal surface of the shell. In another example, the first and second attachment points can each be disposed on a lingual surface of the shell. As a further example, the first and second attachment points can each be disposed on a buccal surface of the shell.

In many embodiments, an appliance includes one or more guide features formed in the shell and configured to guide relative movement between portions of the shell, wherein the relative movement results from a force applied by the elastic member. The one or more guide features can affect at least one of magnitude or direction of the force applied by the elastic member. In some instances, the one or more guide features can include telescopic features formed in the shell.

The appliance may include one or more retention features formed in the shell and configured to retain a portion of the elastic member at a specified position relative to the shell. The one or more retention features can include a groove formed in the shell, with the portion of the elastic member retained within the groove.

In many embodiments, at least one of the first and second attachment points includes a hook formed in the shell, the hook being configured to fasten the elastic member to the shell. A portion of the elastic member can extend between the first and second attachment points.

In many embodiments, the discontinuity forms a flap in a location of the shell configured to accommodate an attachment mounted on a tooth received or receivable within a cavity of the shell. A portion of the elastic member between the first and second attachment points can extend around the flap to engage the attachment, such that the elastic member imparts a force directly on the attachment. As another example, a portion of the elastic member extending between the first and second attachment points can span the flap, such that the elastic member imparts a force on the attachment through the flap.

In another aspect, a method of orthodontic treatment includes providing an orthodontic appliance including a shell having a plurality of cavities shaped to receive teeth and a discontinuity formed in the shell. An elastic member can be directly coupled to the shell in a position interacting with the discontinuity, wherein a first portion of the elastic member is directly coupled to the shell at a first attachment point and a second portion of the elastic member is directly coupled to the shell at a second attachment point. The appliance can be placed on a patient's teeth. Force can be applied to the teeth via the interaction of the elastic member with the discontinuity.

In many embodiments, the elastic member and the discontinuity are configured to elicit a movement of the teeth reducing the size of an interproximal space between the teeth. The discontinuity can be an aperture in the shell, a cut in the shell, or a deformation of the shell. In some instances, a portion of the elastic member between the first and second attachment points extends along a surface of the shell such that the portion spans a plurality of cavities.

In many embodiments, a mesial-distal arch length of the shell is shorter or adapted to be shorter when the appliance is not being worn on the teeth and is longer or adapted to be longer when the appliance is being worn on the teeth. One or more guide features can be formed in the shell and configured to guide movement of a portion of the shell, wherein the movement results from a force applied to the portion by the elastic member.

In another aspect, an orthodontic system includes a plurality of orthodontic appliances each having a shell including a plurality of cavities shaped to receive teeth. The appliances can be adapted to be successively worn by a patient to move one or more teeth from a first arrangement to a second arrangement. At least one of the appliances includes a discontinuity formed in the shell and an elastic member positioned to interact with the discontinuity. The elastic member can have a first portion directly coupled to the shell at a first attachment point and a second portion directly coupled to the shell at a second attachment point.

In many embodiments, the discontinuity includes an elongate opening in the shell, with a portion of the elastic member between the first and second attachment points spanning the elongate opening. The first and second attachment points can be disposed on the shell, such that a portion of the elastic member between the first and second attachment points is adjacent to or near an interproximal region of the teeth when the appliance is worn on the teeth.

In many embodiments, one or more retention features are formed in the shell and configured to retain a portion of the elastic member at a specified position relative to the shell. In some instances, at least one of the first and second attachment points includes a hook formed in the shell, the hook being configured to fasten the elastic member to the shell.

In many embodiments, a portion of the elastic member extends between the first and second attachment points. The discontinuity can form a flap in a location of the shell configured to accommodate an attachment mounted on a tooth received or receivable within a cavity of the shell.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a polymeric shell) having teeth-receiving cavities that receive and resiliently reposition the teeth. In many embodiments, a polymeric appliance can be formed from a sheet of suitable layers of polymeric material. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments 104 or other anchoring elements on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com").

In the depiction of FIG. 1A, the appliance 100 is designed to fit over a single arch of a patient's dentition 102, which may be represented by a positive model of the dentition. The appliance 100 includes a receptacle 106 formed in the shell and configured to accommodate an attachment 104 such as a bracket mounted onto a tooth of the patient (which can correspond to an identical attachment on the tooth of the positive model). When engaged by the appliance 100 (e.g., via the receptacle 106), the attachment 104 can transmit repositioning forces exerted by the shell onto the tooth. Additional examples of brackets and other tooth-mounted attachments suitable for use with orthodontic appliances are described in U.S. Pat. Nos. 6,309,215 and 6,830,450.

Figure 1B:
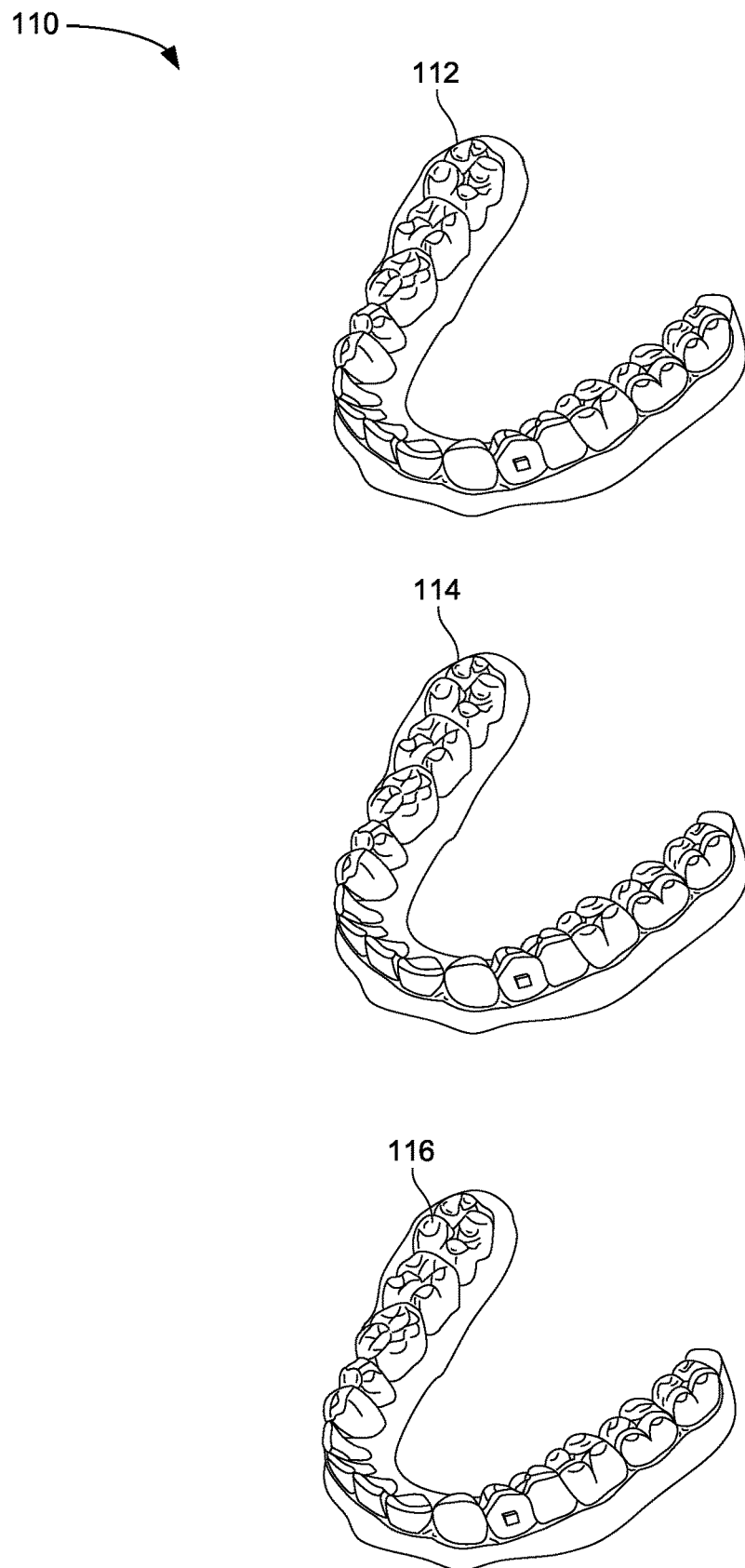
FIG. 1B illustrates a tooth repositioning system, in accordance with many embodiments.

FIG. 1B illustrates a tooth repositioning system 110 including a plurality of appliances 112, 114, 116. Any of the appliances described herein can be designed and/or provided as part of a set of a plurality of appliances. In such an embodiment, each appliance may be configured so that a tooth-receiving cavity has a geometry corresponding to an intermediate or final tooth arrangement intended to be achieved with the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment, which may include where surgery is recommended, where interproximal reduction (IPR) is appropriate, where a progress check is scheduled, where anchor placement is best, where palatal expansion is desirable, etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
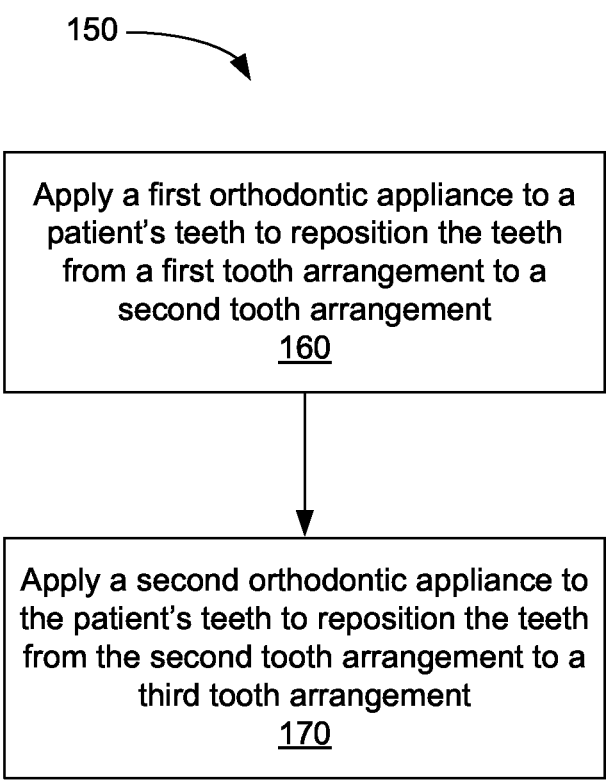
FIG. 1C illustrates a method of orthodontic treatment using a plurality of appliances, in accordance with many embodiments.

FIG. 1C illustrates a method 150 of orthodontic treatment using a plurality of appliances, in accordance with many embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

In many embodiments, an orthodontic appliance includes one or more elastic members. The elastic member can be a band, cord, strip, loop, wire, spring, mesh, membrane, scaffold, layer, or any other suitable elastic connecting element, and can be fabricated from materials such as one or more polymers, one or more metals, or composites. In many embodiments, the elastic member can be fabricated by extrusion, rapid prototyping, spraying, thermoforming, or suitable combinations thereof. The elastic member can be fabricated from a single type of elastic material, or a plurality of different elastic material types. The characteristics of the elastic material (e.g., length, width, thickness, area, shape, cross-section, stiffness, etc.) can be selected based on the desired properties for the elastic member, e.g., magnitude and/or direction of forces to be applied by the elastic member.

An orthodontic appliance can include a shell having teeth receiving cavities as previously described herein and one or more elastic members coupled to the shell. Various configurations for coupling an elastic member to a shell are possible. One or more portions of the elastic member (e.g., portions at or near each end of the elastic member) can be coupled to the shell at a suitable number of attachment points (e.g., one, two, three, four, or more). Alternatively or in addition, one or more portions of the elastic member can be coupled to the shell over a continuous attachment region. Any description herein pertaining to attachment points can also be applied to attachment regions, and vice-versa. Each of the attachment points can be situated on any suitable portion of the shell, such as on a buccal surface, lingual surface, occlusal surface, gingival surface, internal surface (e.g., surface adjacent to or near the teeth), external surface (e.g., surface away from the teeth), or suitable combinations thereof. The position of the attachment points can be selected in order to control the forces (e.g., force magnitude and/or trajectory) applied to the teeth. In many embodiments, the elastic member is directly coupled to the attachment points on the shell without utilizing intervening attachment elements or fasteners. For example, the elastic member can be directly coupled to the shell by adhesives and/or bonding. As another example, the attachment points on the shell can be formed (e.g., integrally formed as a unitary or monolithic piece) with or into one or more hooks, protrusions, apertures, tabs, or other such features suitable for directly fastening the elastic member to the shell. In alternative embodiments, the elastic member may be indirectly coupled to the shell (e.g., via attachment elements or fasteners that are not integrally formed with the shell as a unitary or monolithic piece). In some instances, the elastic member is permanently affixed to the shell. Conversely, the elastic member can be removably coupled or otherwise detachable from the shell. In many embodiments, the elastic member is coupled only to the shell, and not to the teeth of the patient or an attachment mounted on the teeth.

The orthodontic appliance described herein can include one or more discontinuities formed in the shell. The one or more discontinuities can include one or more cuts, flaps, apertures (e.g., openings, windows, gaps, notches), and/or deformations (e.g., protrusions, indentations, reliefs) formed in any suitable portion of the shell (e.g., in a buccal, lingual, occlusal, and/or gingival surface). Exemplary geometries for such discontinuities are described in further detail herein. The discontinuities provided herein can be used to control the forces applied to a patient's teeth by an orthodontic appliance. In many embodiments, one or more discontinuities are used in combination with one or more elastic members in order to produce the desired forces. In alternative embodiments, an orthodontic appliance can include one or more discontinuities without using any elastic members, such that the forces applied to the teeth are modulated through the use of discontinuities alone.

In many embodiments, one or more elastic members are positioned to interact with one or more discontinuities in the appliance shell. In some instances, a discontinuity is located between two or more attachment points for an elastic member, such that a portion of the elastic member extending between the attachment points spans the discontinuity (or at least a part of the discontinuity). Alternatively or additionally, a portion of an elastic member between attachment points can extend around the discontinuity (e.g., around the periphery of an aperture or flap of the discontinuity). An elastic member can interact with a discontinuity by exerting forces directly on the discontinuity (e.g., pressing or pulling against a flap, deformation, etc.), as well as by exerting forces on portions of the shell adjacent to the discontinuity (e.g., applying force to portions of the shell surrounding a cut, aperture). Such interactions may comprise, for example, the elastic member applying a force on or in the region of the discontinuity when the appliance is worn (e.g., such that the resulting force is in a direction suitable to change the form of the discontinuity) and/or the elastic member applying a force on the discontinuity when the appliance is not being worn. In many embodiments, the applied force is at least partially generated by deformation (e.g., stretching, compressing, bending, flexing) of the elastic member. In some instances, the deformation of the elastic member can be caused by deformations of the corresponding discontinuity and/or shell, such as deformations occurring when the appliance is placed over teeth, as described in further detail below.

The interaction of the elastic member with the discontinuity can result in the application of forces on portions of the appliance shell. Associated resulting forces can be transmitted to the underlying teeth via the shell to elicit tooth movements (e.g., extrusion, intrusion, rotating, torqueing, tipping, and/or translating) towards a specified tooth arrangement. As the teeth move towards the specified arrangement, the deformation of the discontinuity may decrease, until the teeth reach the arrangement and the discontinuity fully reverts to its undeformed state (also known as the "fully expressed" state). In many embodiments, the shell includes a predetermined amount of internal space (e.g., in the teeth-receiving cavities of the shell) to accommodate tooth movements from an arrangement to a subsequent specified arrangement. The size of the internal space can be used to control the extent to which the teeth move. For example, the teeth can be prevented from moving further once they have traversed the available internal space and come into contact with an internal surface of the shell (e.g., the wall of a tooth-receiving cavity). Additionally, the geometry of the discontinuity (e.g., size) can also influence the extent of tooth movement, in that no more tooth movements are produced once the discontinuity has been fully expressed. In some instances, one or more portions of the internal surface can be fabricated from a more rigid material than the rest of the shell to ensure that the teeth are retained at the desired configuration.

The magnitude and/or direction of the forces applied to the teeth can be at least partially controlled by, influenced by, or based on the geometry of the discontinuity, as well as its positioning relative to the elastic member. The dimensions (e.g., length, width, depth, surface area, etc.) and/or the shape of the discontinuity can be calculated, for instance, to achieve a specified degree of appliance compliance. For example, portions of the shell adjacent to the discontinuity may be more compliant, while portions of the shell away from the discontinuity may be more rigid. In many embodiments, the discontinuity is configured to be deformable (e.g., changeable in shape, size) and/or displaceable, thereby increasing the local compliance of the appliance. The local compliance of various portions of the shell can be used to control the resulting forces exerted on the underlying teeth.

The forces applied to the teeth can also be influenced by characteristics of the elastic member (e.g., length, width, thickness, area, shape, cross-section, number, elastic coefficient and other material properties, etc.). Any suitable combination of characteristics can be used in order to elicit the desired tooth movements, and such characteristics can be homogeneous or variable within the elastic. In many embodiments, the elasticity of the elastic member can vary based on the direction of deformation of the elastic member (anisotropic elasticity). For example, an elastic member can be configured to be more compliant when deformed along one or more specified directions (e.g., longitudinal, lateral, etc.), and less compliant (or noncompliant) when deformed along all other directions, or vice-versa. The directionality of the elasticity can be used to control the resultant forces applied to the teeth.

Optionally, the elastic member can be deformed before being coupled to the appliance and/or before the appliance is worn by the patient (e.g., due to the placement of the attachment points and/or discontinuity), such that there is an initial "pre-loading" force or tension in the elastic member. The use of pre-loading can be used to produce a substantially constant force on the teeth throughout the treatment duration. Moreover, the use of pre-loading can ensure that sufficient force is applied to the teeth, e.g., in accordance with a desired treatment plan. Alternatively, the elastic member can be relaxed prior to attachment to the appliance and/or wearing of the appliance, such that there is no pre-loading force before the appliance is placed on the teeth.

Figure 2A:
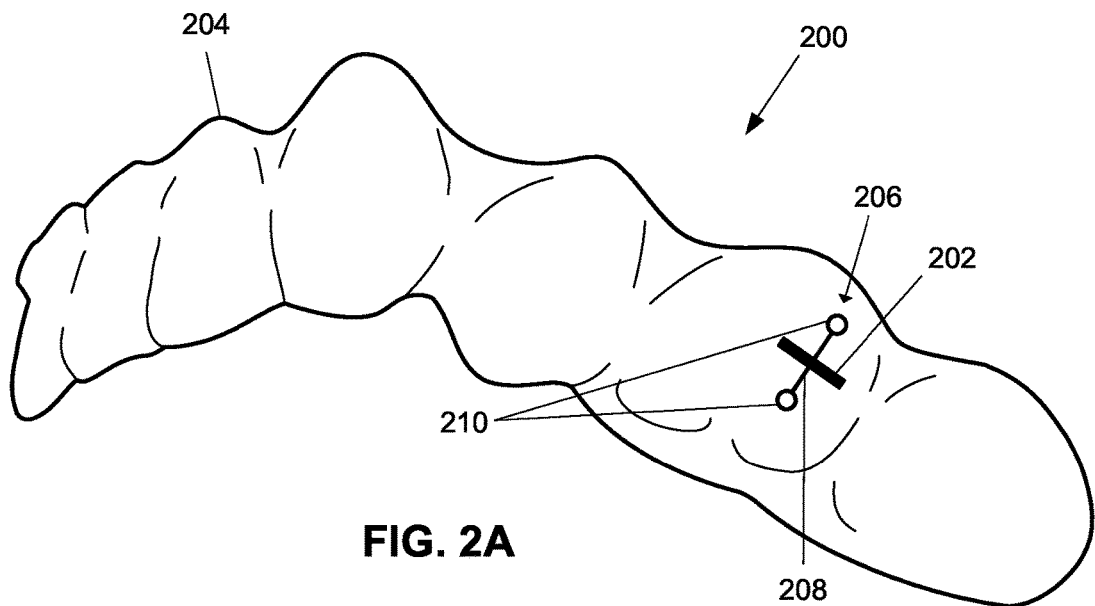
FIG. 2A illustrates an exemplary orthodontic appliance with a coupled elastic member and a discontinuity, in accordance with many embodiments.
Figure 2B:
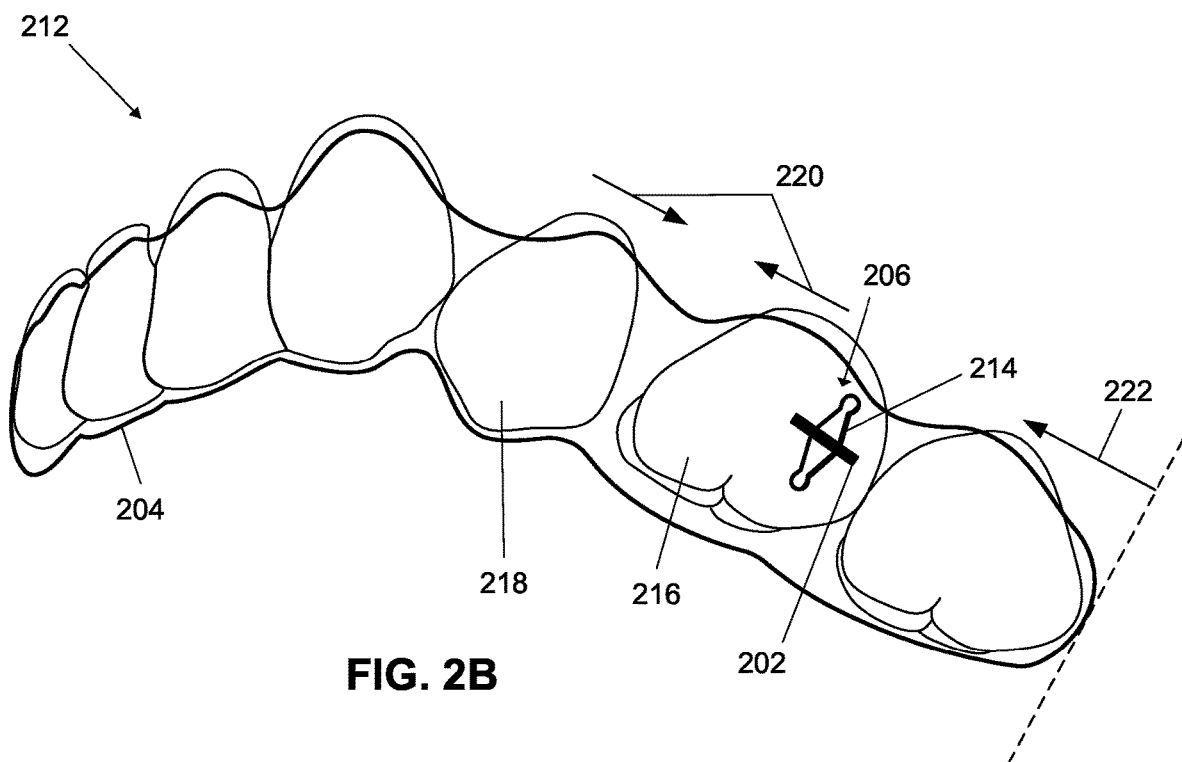
FIG. 2B illustrates the appliance of FIG. 2A when placed over the teeth.

FIG. 2A and FIG. 2B illustrate an orthodontic appliance 200 with a coupled elastic member 202, in accordance with many embodiments. The elastic member 202 is depicted as an elongate band or strip having two opposing ends. The ends of the elastic member 202 are attached to the exterior of a shell 204 shaped to receive teeth of a single dental arch. In FIG. 2A and FIG. 2B, the elastic member 202 spans a discontinuity 206 formed in the shell 204, with the ends of the elastic member 202 attached to the shell 204 on either side of the discontinuity 206. The discontinuity 206 includes an elongate cut 208 which optionally terminates at either end in a circular aperture 210. The circular apertures 210 can be used to prevent undesirable lengthening of the cut 208 when force is applied on the shell 204. In alternative embodiments, other types of aperture shapes (e.g., oval apertures) can be used instead of circular apertures. In many embodiments, when the appliance 200 is placed on the teeth of a patient's dental arch 212 (as illustrated in FIG. 2B), at least some portions of the shell 204 are deformed by the forces generated by the deliberately designed mismatch between the patient's current tooth configuration and the tooth arrangement specified by the geometry of the appliance 200, resulting in a corresponding deformation of the discontinuity 206. For example, stretching of the shell 204 can cause the elongate cut 208 to widen into an elongate aperture 214. The deformation of the discontinuity causes the geometry of the appliance to more easily comply with the current positions of the patient's teeth, thereby reducing the discomfort experienced by the patient when wearing the appliance. Additionally, the deformation of the discontinuity can enable the appliance to accommodate the patient's teeth even in situations where the teeth are not in an ideal arrangement relative to the configuration of the appliance (e.g., due to inaccuracies in appliance fabrication, inaccurate measurement data of the initial teeth arrangement, tooth movements lagging behind or not conforming to the treatment plan, etc.). Furthermore, the deformation can allow the appliance to effect larger tooth movements, thus enabling the appliance to be used for a longer time.

The deformation of the discontinuity 206 and/or shell 204 generally results in deformation of the elastic member 202. For example, the elastic member 202 can be stretched by the widening of the discontinuity 206. The tension in the elastic member 202 generated by such deformation can be reacted to as a continuous force by portions of the shell 204, such as portions of the shell 204 adjacent the discontinuity 206, in many embodiments. Associated resulting forces can be transmitted by the shell 204 to the underlying teeth so as to elicit tooth movements repositioning the teeth to a desired predetermined arrangement. For example, since the discontinuity 206 is situated adjacent the tooth 216, the appliance 200 can exert forces on the tooth 216 and its neighbor 218, causing them to move towards each other (see, e.g., arrows 220). This movement can reduce the interproximal space between the teeth 216, 218, thereby shortening the mesial-distal length of the arch 212 (see, e.g., arrow 222). The deformation of the shell 204, discontinuity 206, and/or elastic member 202 can decrease as the repositioning of the teeth reduces the mismatch between the tooth arrangement and appliance geometry, thus diminishing the amount of force expressed on the teeth by the appliance 200.

Figure 2C:
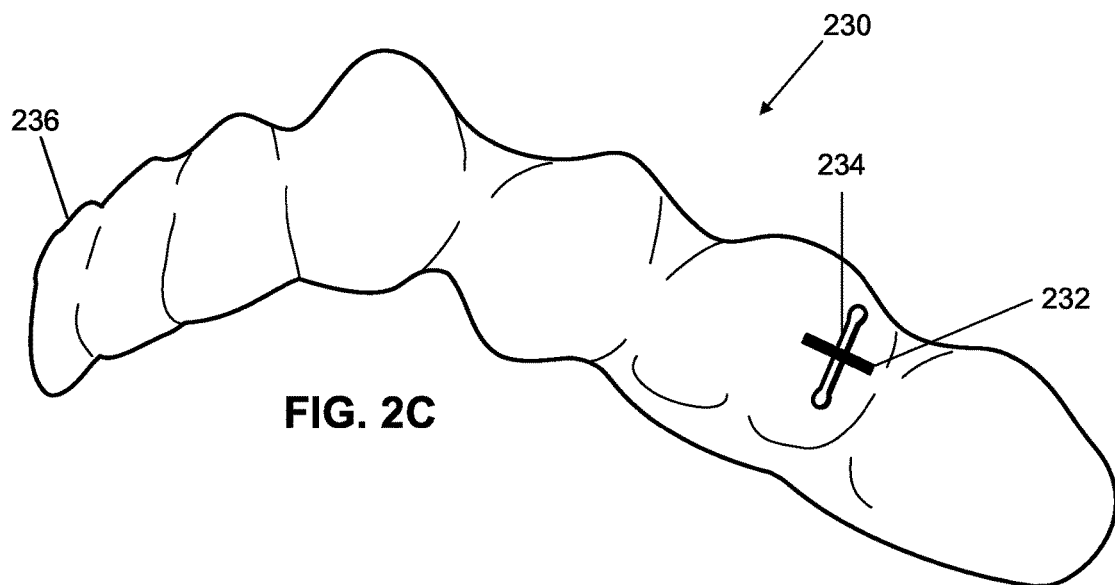
FIG. 2C illustrates another example of an orthodontic appliance with a coupled elastic member and a discontinuity, in accordance with many embodiments.
Figure 2D:
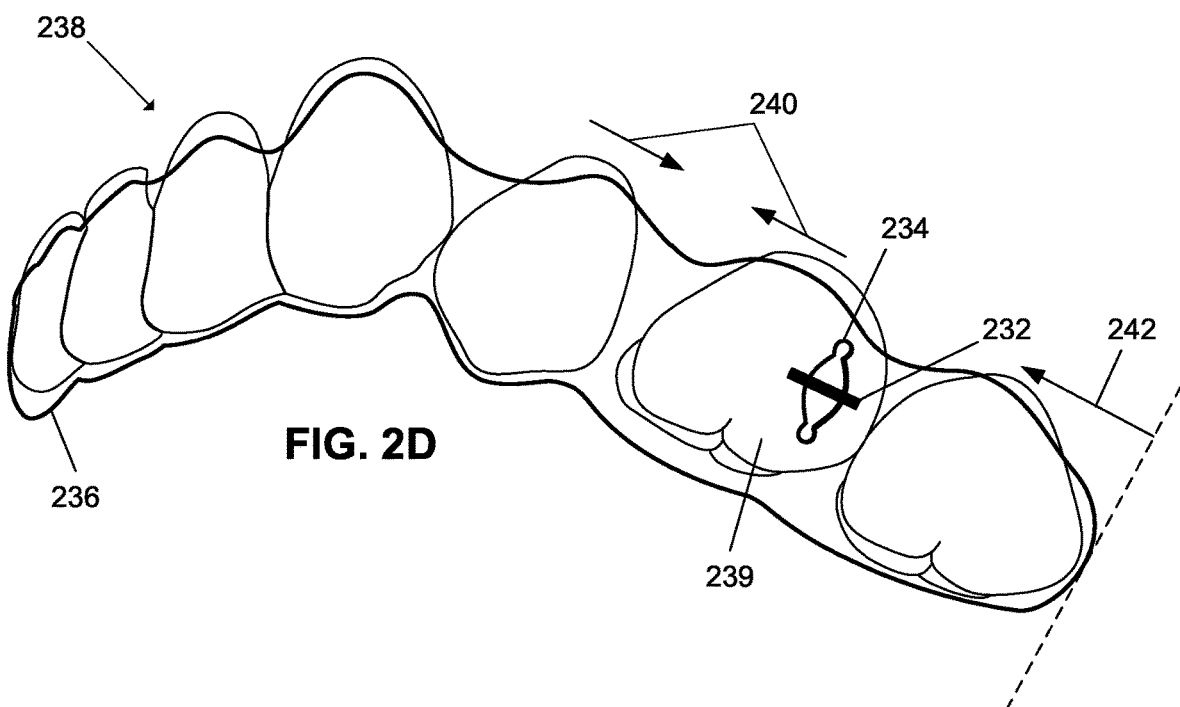
FIG. 2D illustrates the appliance of FIG. 2C when placed over the teeth.

FIG. 2C and FIG. 2D illustrate an orthodontic appliance 230 with a coupled elastic member 232 and a discontinuity 234 formed within a shell 236, in accordance with many embodiments. The discontinuity 234 is similar to the discontinuity 206 of FIG. 2A, except that the cut 208 is replaced with a narrow elongate aperture, which can be formed in any suitable manner, such as by removing material from the shell 236. As used herein, narrow may mean, for example, that the aperture has an extension in one direction of more than twice, e.g., more than four times, its dimension in a second, e.g., perpendicular, direction. When placed on a patient's arch 238, as depicted in FIG. 2D, the discontinuity 234 and the elastic member 232 are situated adjacent to a tooth 239. The elongate aperture of the discontinuity 234 can be deformed when worn (e.g., the size of the aperture increases), generating tension in the elastic member 232 and causing it to exert forces on portions of the shell 236 disposed on opposite sides of the discontinuity 234. Associated resulting forces can be applied to the underlying teeth to close an interproximal space (see, e.g., arrows 240) and thereby reduce the overall arch length (see, e.g., arrow 242).

Figure 2E:
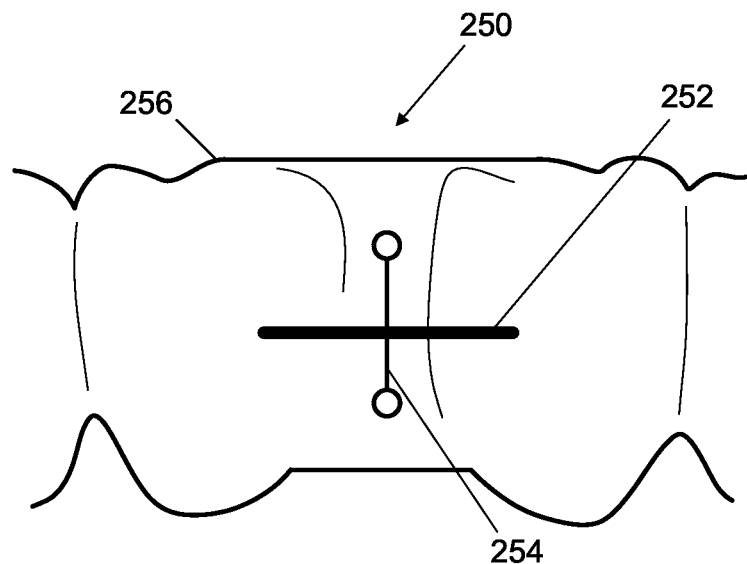
FIG. 2E illustrates yet another example of an orthodontic appliance with a coupled elastic member and a discontinuity, in accordance with many embodiments.
Figure 2F:
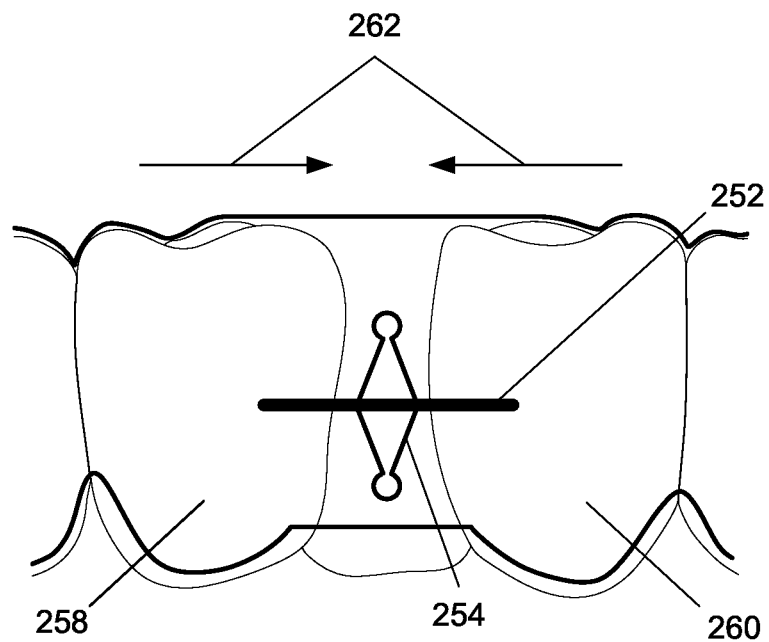
FIG. 2F illustrates the appliance of FIG. 2E when placed over the teeth.

FIG. 2E and FIG. 2F illustrate an orthodontic appliance 250 with a coupled elastic member 252 and a discontinuity 254, in accordance with many embodiments. The discontinuity 254 can be formed as an elongated cut in the shell 256, similar to the discontinuity 206 of the appliance 200. When the appliance 250 is worn (as depicted in FIG. 2F), the discontinuity 254 can be situated adjacent the interproximal space between tooth 258 and tooth 260. The elastic member 252 can be attached to the shell 256 at attachment points adjacent the teeth 258, 260 when the appliance 250 is worn. The principle of operation of the appliance 250 is similar to that of the appliances 200, and 230, in that the elastic member 252 interacts with the discontinuity 254 to elicit tooth movements (see, e.g., arrows 262) that reduce the interproximal space between the teeth 258, 260.

Figure 2G:
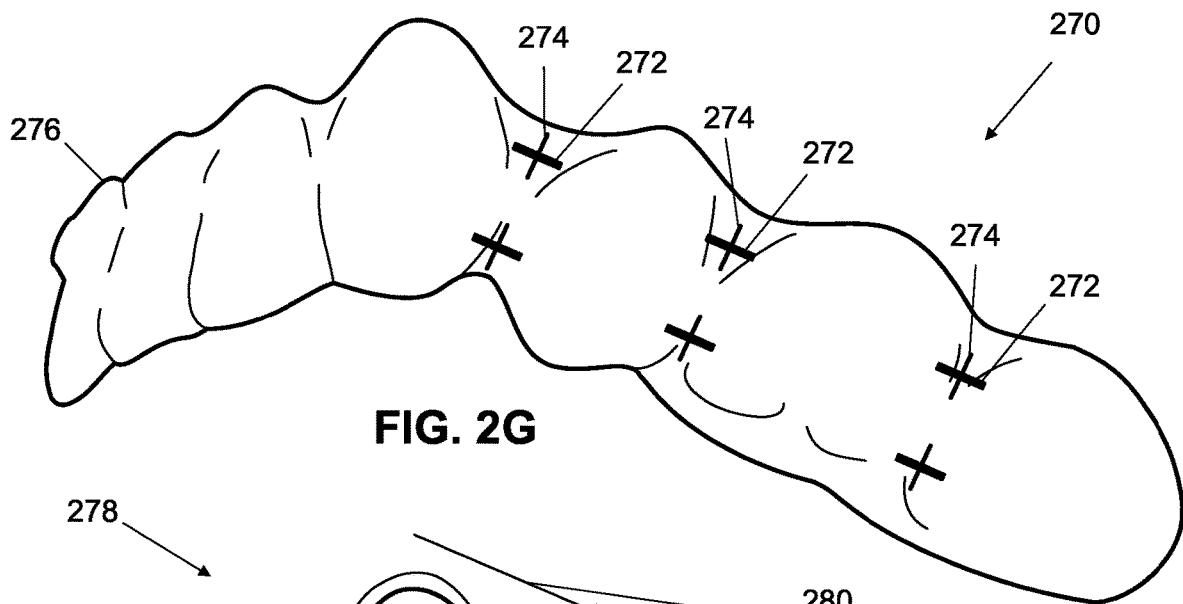
FIG. 2G illustrates an example of an orthodontic appliance having a plurality of elastic members and discontinuities, in accordance with many embodiments.
Figure 2H:
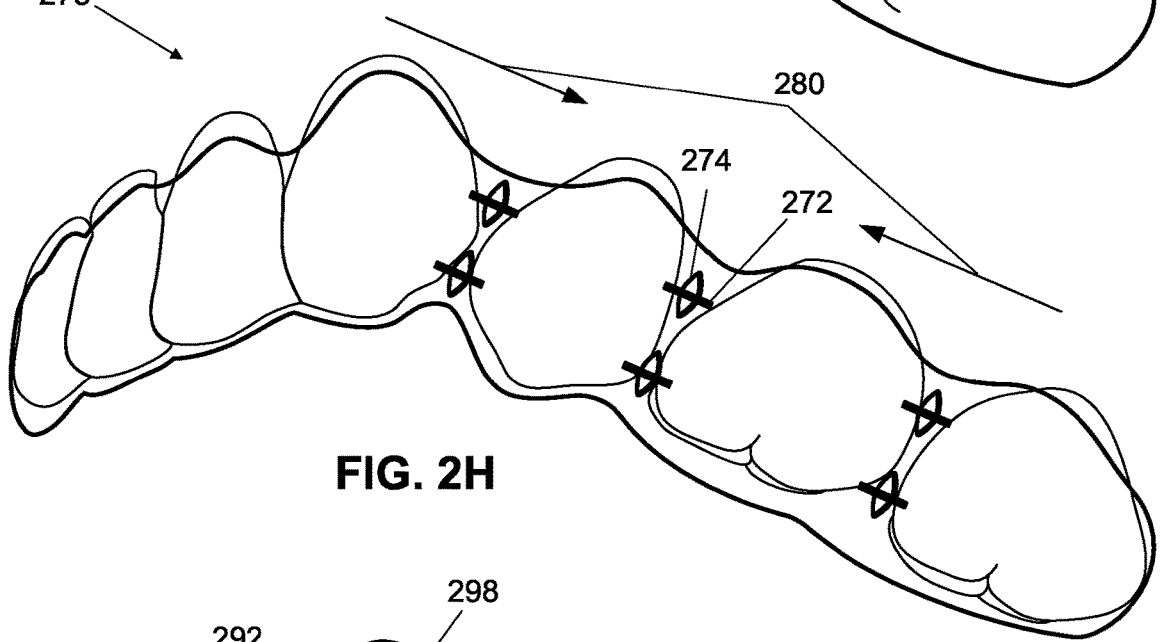
FIG. 2H illustrates the appliance of the FIG. 2G when placed over the teeth.

FIG. 2G and FIG. 2H illustrate an example of an orthodontic appliance 270 having a plurality of elastic members 272 and discontinuities 274 formed within a shell 276. Each elastic member 272 is positioned to span one of the plurality of discontinuities 274, which are depicted as cuts in the shell 276. The discontinuities 274 are disposed adjacent to the interproximal regions when the appliance 270 is worn over the arch 278 (as illustrated in FIG. 2H). The interactions between the elastic members 272 and discontinuities 274 can produce forces for repositioning the teeth to reduce an interproximal space (see, e.g., arrows 280). Although the elastic members 272 and discontinuities 274 are depicted in FIG. 2G and FIG. 2H as situated solely on the buccal surface of the appliance, they can also be situated on other surfaces, such as on the lingual surface or on the occlusal surface, as well as combinations of any these surfaces. For example, an appliance can include some discontinuities and elastics situated on a lingual surface and some discontinuities and elastics situated on a buccal surface. In this configuration, forces are applied to the underlying teeth via both surfaces of the shell, thereby increasing the repositioning efficiency.

One, two, three or more discontinuities may additionally or alternatively be disposed in other regions than the regions adjacent to the interproximal regions, and each discontinuity may optionally be spanned by none, one, or more elastic members.

Figure 2I:
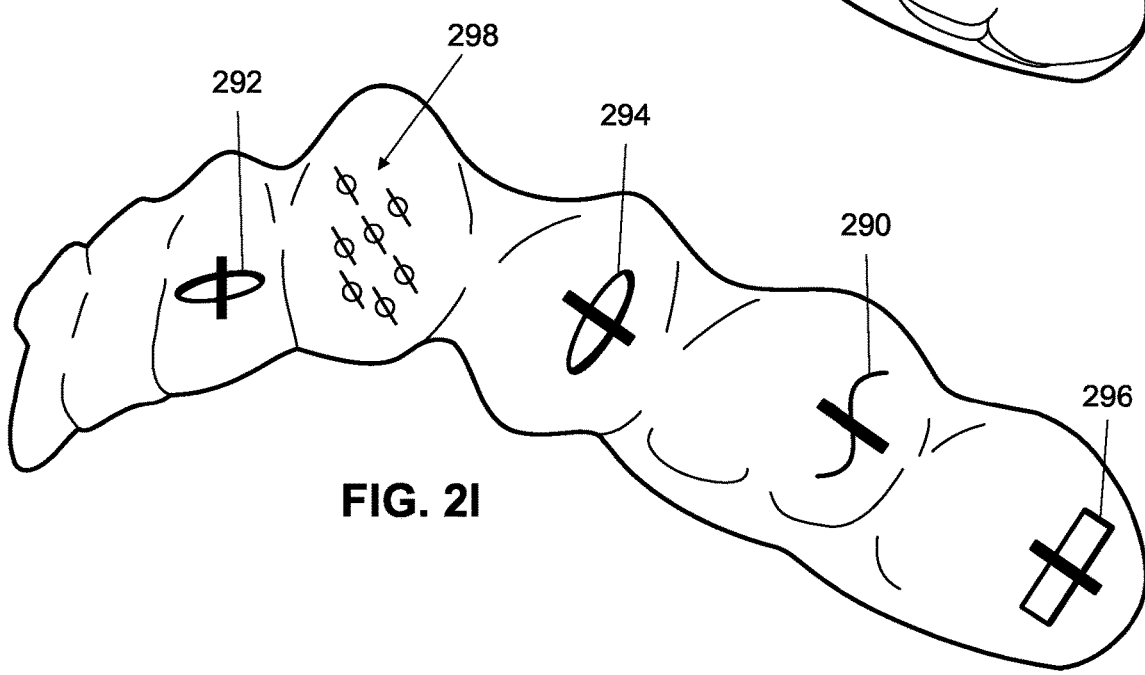
FIG. 2I illustrates additional exemplary geometries for a discontinuity in an orthodontic appliance, in accordance with many embodiments.

FIG. 2I illustrates additional example geometries for one or more discontinuities in an orthodontic appliance shell, in accordance with many embodiments. As previously mentioned, a discontinuity can have any suitable configuration, for example, such as a cut, flap, aperture, deformation, and the like. For example, a discontinuity can include a cut in the shell, and the cut can include linear portions and/or curved portions (e.g., curvilinear cut 290). As another example, the discontinuity can include an aperture formed in a suitable shape, such as a circle, ellipse (e.g., elliptical apertures 292, 294), triangle, square, rectangle (e.g., rectangular aperture 296), or other polygonal shape, and/or suitable combinations thereof. The discontinuities and/or elastics can be positioned in any suitable orientation. For example, the elastic member can extend vertically (along a occlusal-gingival direction), horizontally or longitudinally (along a mesial-distal direction), or any other suitable orientation. Similarly, the discontinuity may extend vertically (e.g., discontinuities 290, 294, 296), horizontally or longitudinally (e.g., discontinuity 292), or any other suitable orientation. The orientation of the elastic member and/or discontinuity can be selected based on the desired tooth movements. In some instances, different orientations can be used to produce different types of movements.

In many embodiments, a discontinuity can be composed of a plurality of individual elements arranged in a suitable configuration (e.g., plurality of circular apertures 298). An appliance can incorporate any suitable number and type of discontinuities, and the discontinuities can interact with any suitable number of elastic members. For example, a single elastic member can be paired with a single discontinuity. Alternatively, a plurality of elastic members can interact with a single discontinuity. Conversely or additionally, a single elastic member can interact with a plurality of discontinuities. The discontinuities described herein, along with their corresponding elastic member(s), can be arranged on the shell in any suitable manner relative to the underlying dentition (e.g., adjacent to one or more teeth, one or more interproximal regions, etc.) and to each other.

Figure 3A:
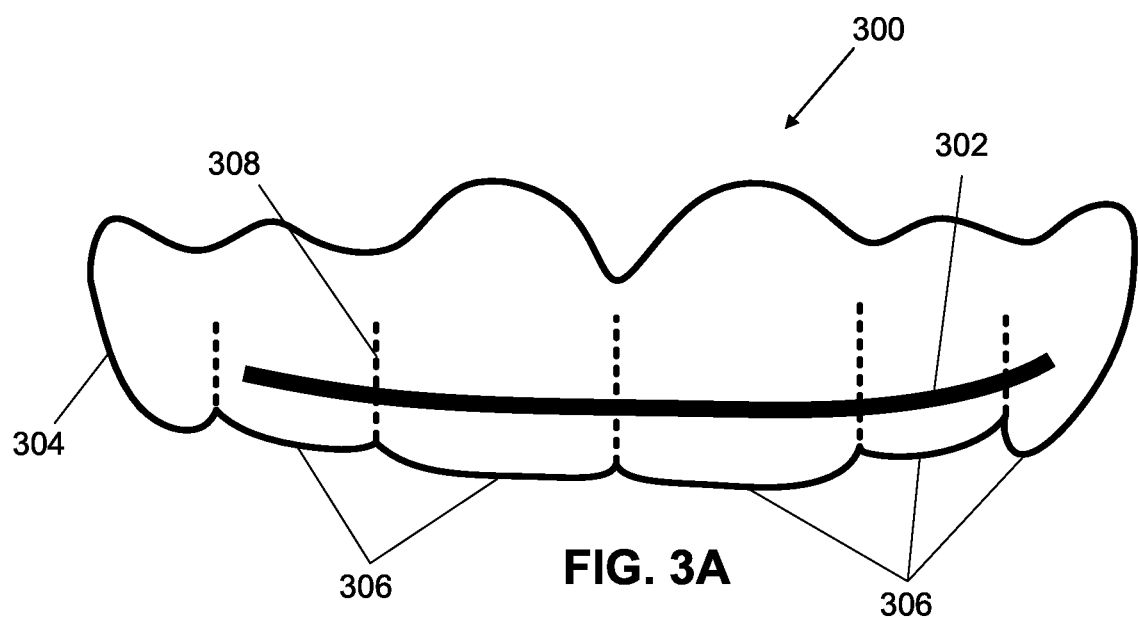
FIG. 3A illustrates an orthodontic appliance for repositioning teeth, in accordance with many embodiments.
Figure 3B:
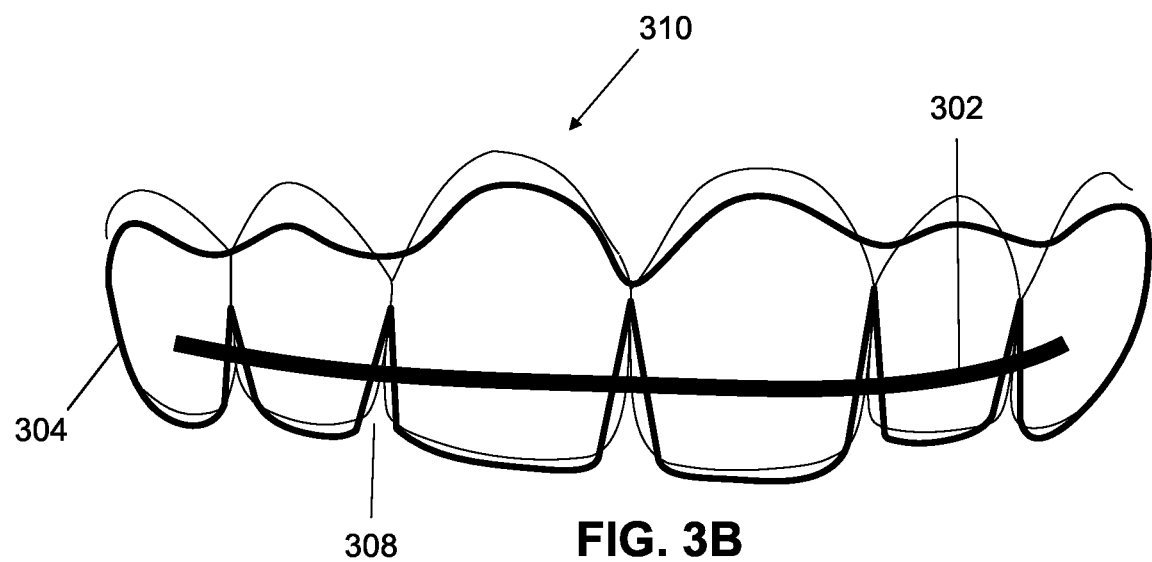
FIG. 3B illustrates the appliance of FIG. 3A when placed over the teeth.

FIG. 3A and FIG. 3B illustrate an orthodontic appliance 300 for repositioning teeth 310, in accordance with many embodiments. For example, the appliance 300 can be used to reduce interproximal space between the teeth 310. The orthodontic appliance 300 includes a shell 304 and an elastic member 302 coupled with the shell 304. The shell 304 has a plurality of discontinuities 308 formed in the shell. The length of the elastic member 302 extends along the surface of the shell 304 spanning a plurality of teeth-receiving cavities 306. The elastic member 302 spans the discontinuities 308, depicted herein as cuts, although other geometries can also be used. When placed on the teeth 310 of the patient as depicted in FIG. 3B, the discontinuities 308 can deform to form a plurality of openings. The orthodontic appliance 300 can be configured such that each of the openings of discontinuities 308 is positioned over or adjacent to a respective interproximal region of the teeth 310. The elastic member 302 can exert forces on the shell 304 such that resulting associated forces are applied to the teeth 310, thereby eliciting tooth movements to reduce the size of the interproximal space(s) between the teeth 310.

In many embodiments, the appliance includes one or more retention features that are formed in the shell (e.g., grooves, ridges, protrusions, indentations, etc.) to retain the elastic member (or suitable portions thereof) at a specified position relative to the shell. The retention features may be beneficial in instances where the elastic member is relatively long and therefore more prone to slippage relative to the shell 304. For instance, the shell 304 of the appliance 300 can include a groove (not shown) configured to constrain the elastic member 302 to a configuration spanning the teeth-receiving cavities 306 and the discontinuities 308. Such retention features can be used to prevent the accidental displacement or release of the elastic member from the desired position, thereby ensuring that the appropriate therapeutic force is maintained.

Figure 4A:
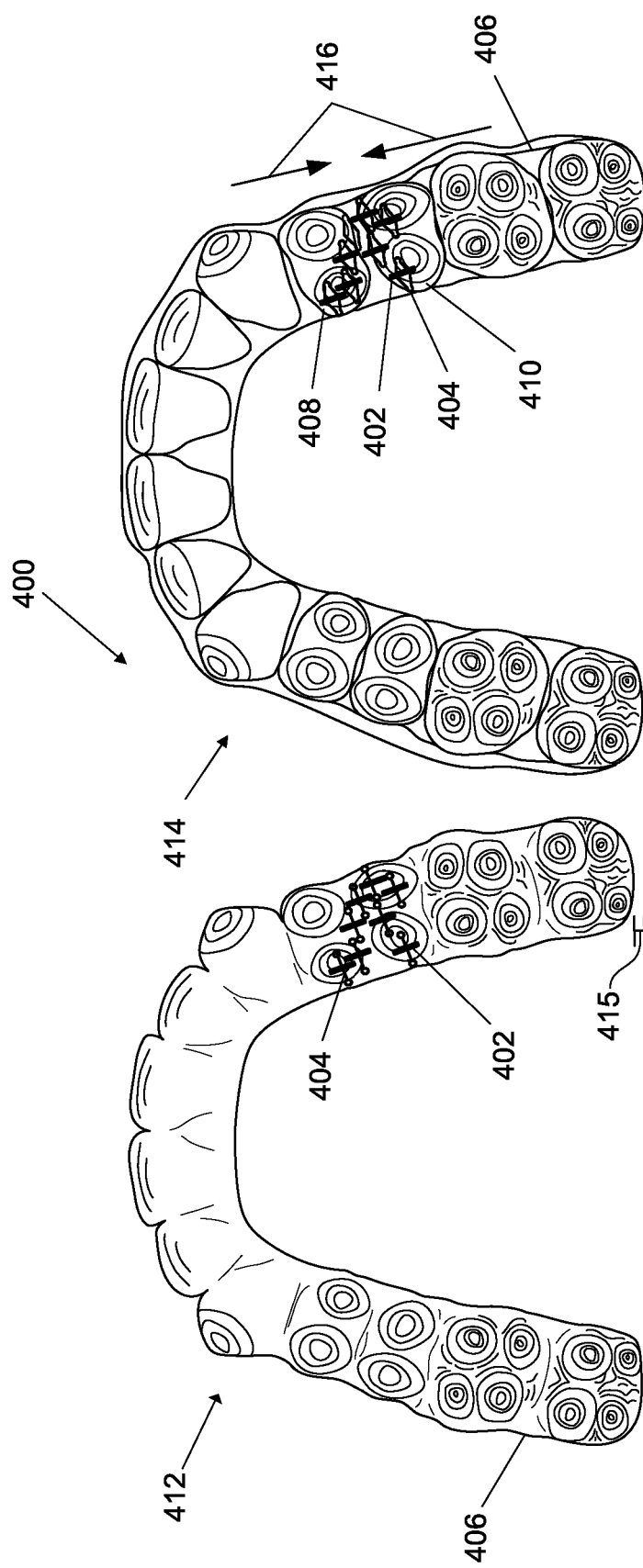
FIG. 4A illustrates an orthodontic appliance for repositioning teeth, in accordance with many embodiments.

FIG. 4A illustrates configurations of an orthodontic appliance 400 for repositioning teeth, in accordance with many embodiments. For example, the appliance 400 can be used to reduce interproximal space between teeth. The appliance 400 includes a shell 406, a plurality of elastic members 402, each of which spans one of a plurality of discontinuities 404 (depicted as cuts terminating in circular apertures) formed in the shell 406. The elastic members 402 and discontinuities 404 are situated on the occlusal surface of the shell 406 near the interproximal region between teeth 408 and 410. The appliance 400 is configured to reduce the size of the interproximal space between teeth 408, 410. In many embodiments, the mesial-distal arch length of the shell 406 is shorter when the appliance is not being worn by a patient (configuration 412) compared to when it is being worn (configuration 414), e.g., by an amount 415, due to the increased interproximal space in the patient's initial tooth arrangement versus the tooth positions of the appliance 400. The discontinuities 404 can be deformable to contribute to the compliance of the appliance 400 and relieve some of the initial forces generated by the mismatch between the geometry of the patient's teeth and the geometry of the appliance 400. Similar to the other embodiments described herein, the elastic members 402 can apply a continuous force between portions of the shell 406 to elicit tooth movements (see, e.g., arrows 416) that reduce and may eliminate the interproximal space between teeth 408, 410.

Figure 4B:
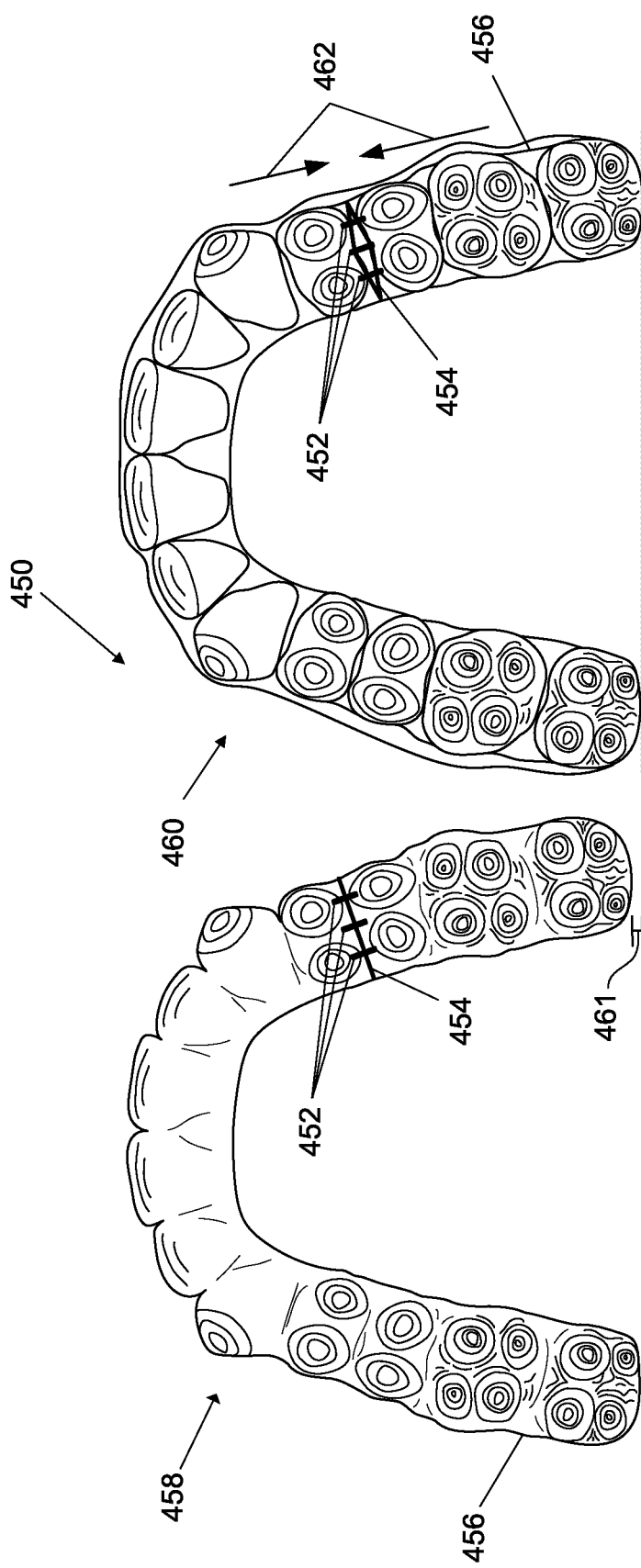
FIG. 4B illustrates another orthodontic appliance for repositioning teeth, in accordance with many embodiments.

FIG. 4B illustrates configurations of an orthodontic appliance 450 for reducing an interproximal space between teeth, in accordance with many embodiments. The appliance 450 includes a shell 456 and a plurality of elastic members 452 spanning a single discontinuity 454 (depicted as a single cut) formed in the shell 456. The discontinuity 454 can be a complete cut in the shell 456 separating it into discrete segments, or it can be a partial cut such that the shell 456 remains a single segment. Similar to the appliance 400, the discontinuity 454 can be deformed (e.g., widened from a cut into an elongate aperture) when the appliance 450 is placed on the teeth of a patient, such that the mesial-distal arch length of the shell 456 is shorter in the unworn configuration 458 than in the worn configuration 460, e.g., by an amount 461. As previously described, the elastic members 452 exert repositioning forces causing closure of the interproximal space (see, e.g., arrows 462).

Figure 5A:
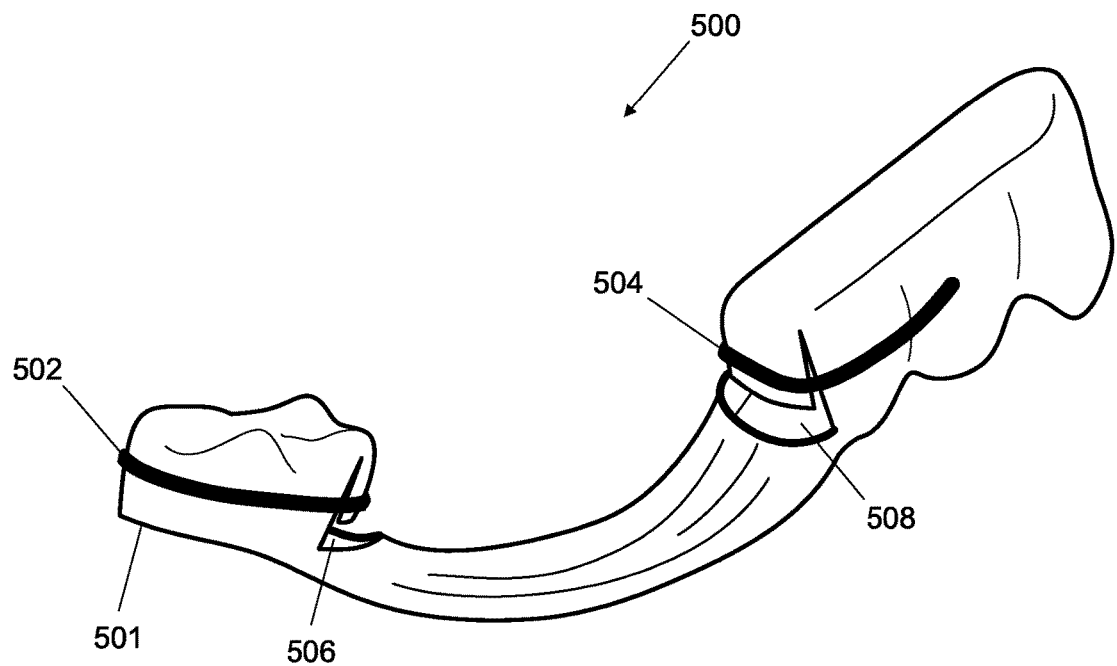
FIG. 5A illustrates an orthodontic appliance for repositioning teeth, in accordance with many embodiments.
Figure 5B:
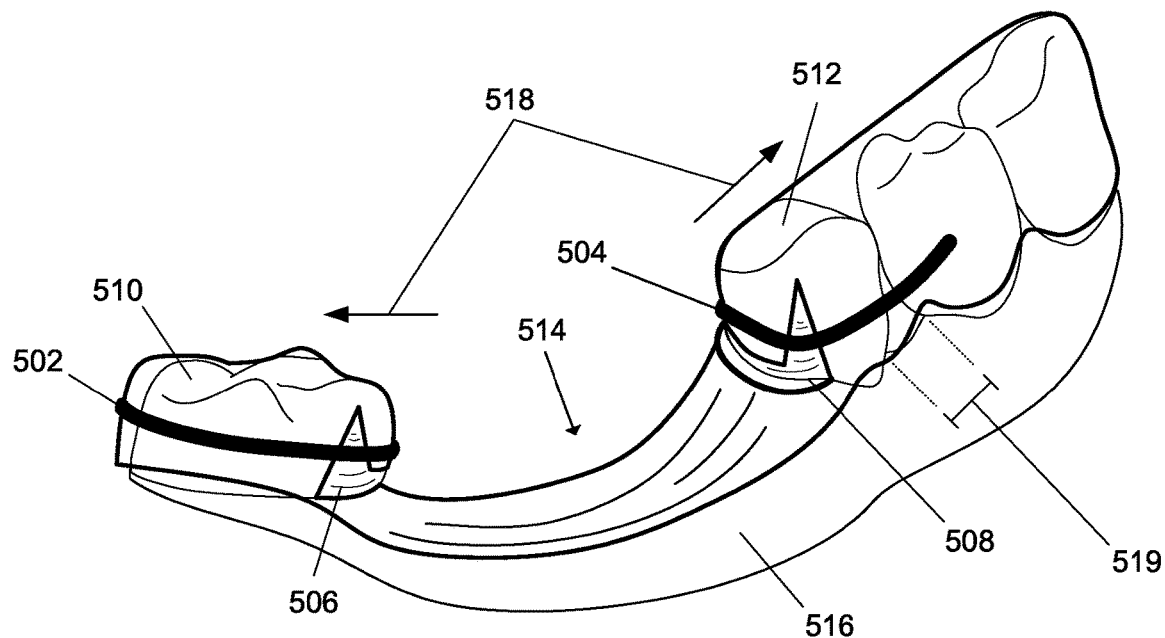
FIG. 5B illustrates the appliance of FIG. 5A when placed over the teeth.
Figure 5C:
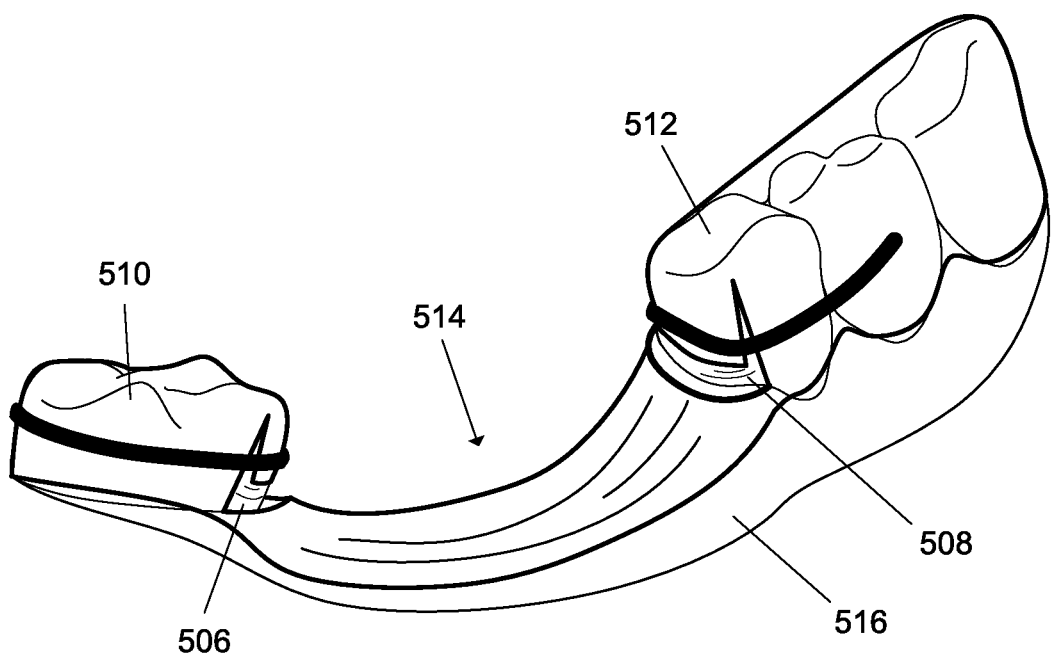
FIG. 5C illustrates the appliance of FIG. 5B after tooth repositioning has occurred.

FIG. 5A through FIG. 5C illustrate an orthodontic appliance 500 for repositioning teeth of a dental arch, in accordance with many embodiments. In the depiction of FIG. 5A through FIG. 5C, the appliance 500 is configured to increase a space between teeth of a lower dental arch, although the concepts presented herein can also be applied to space expansions in the upper dental arch. Space expansion (which can involve expansion of interproximal spaces between adjacent teeth, as well as expansion of spaces resulting from tooth removal) can be beneficial for various dental procedures (e.g., implants, treatment of impacted teeth). The techniques disclosed herein, however, can also be used for other applications, such as decreasing a space between teeth, moving a tooth, tipping a tooth, rotating a tooth, and so on. Any description herein referring to space expansion can also be applied to other types of orthodontic repositioning, and vice-versa. The appliance 500 includes a shell 501 and first and second elastic members 502, 504, interacting respectively with first and second discontinuities 506, 508 formed in the shell 501. In alternative embodiments, instead of one elastic member per discontinuity, two or more elastic members may be used for each discontinuity. The elastic members 502, 504 and associated respective discontinuities 506, 508 can be situated over teeth 510, 512 immediately adjacent to a space 514 when the appliance 500 is placed on a patient's lower arch 516 (depicted in FIG. 5B). The elastic members and the discontinuities can be configured in any manner suitable for producing space-expanding tooth movements. For example, as illustrated in FIG. 5A through FIG. 5C, the discontinuities 506, 508 can each be configured as an aperture positioned over the tooth surfaces adjacent to the space 514. Each aperture extends towards the crown of each tooth and is spanned by the elastic member. The respective elastic member can extend around the entire circumference of the tooth and be attached to the shell over the same tooth (see, e.g., elastic member 502), or extend partially around the circumference of the tooth and be attached to the shell over an adjacent tooth (see, e.g., elastic member 504). In either case, the ends of the elastic member 504 can be respectively attached to the buccal and lingual sides of the shell 501 such that the teeth 510, 512 are moved to increase the space between the teeth 510, 512 (e.g., in the direction indicated by arrows 518). For example, the tooth 512 can be moved so as to reduce and often eliminate an interproximal space 519 between the tooth 512 and the adjacent tooth so as to reposition the teeth as illustrated in FIG. 5C.

When the appliance 500 is placed over the arch 516, the elastic members 502, 504 interact with the discontinuities 506, 508 to apply forces on the teeth 510, 512, thereby moving the teeth 510, 512 in desired directions (see, e.g., arrows 518) so as to expand the space 514. In many embodiments, the extent of the movement can be varied based on the size of the discontinuities 506, 508. FIG. 5C illustrates the tooth configuration of the lower arch 516 after repositioning, with an expanded space 514. The repositioning of the teeth 510, 512 reduces the mismatch between the patient's teeth arrangement and the appliance geometry, thereby causing the deformation of the discontinuities 506, 508 to be reduced relative to the previous configuration depicted in FIG. 5B.

Figure 6:
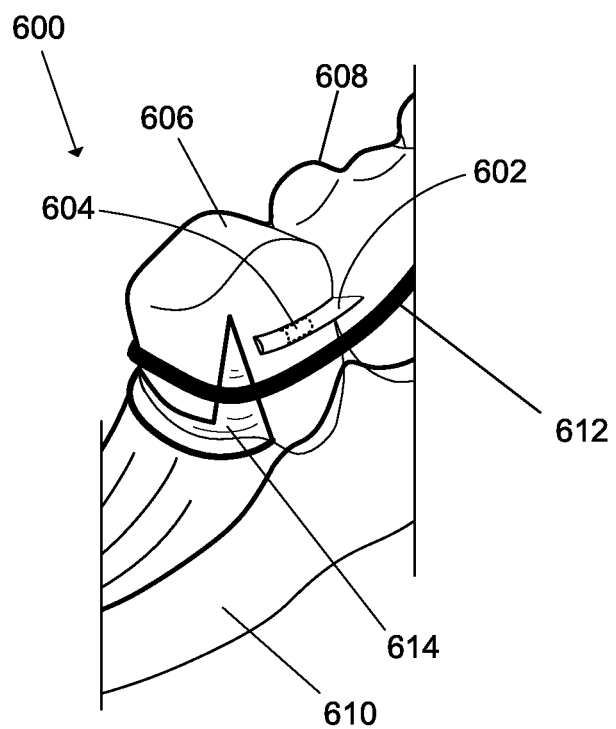
FIG. 6 illustrates an orthodontic appliance including a channel accommodating an attachment on a tooth, in accordance with many embodiments.

FIG. 6 illustrates an orthodontic appliance 600 including a channel 602 accommodating an attachment 604 mounted on a tooth 606, in accordance with many embodiments. The channel 602 can be formed within the internal cavity of the shell 608 of the appliance 600, such that the attachment 604 is received within the channel 602 when the appliance 600 is placed over the patient's arch 610. The channel 602 can be configured to guide the movement of the tooth 606 as it is repositioned due to forces applied by the elastic member 612 on and/or near the discontinuity 614. For example, the geometry of the channel 602 can be used to constrain the movement of the tooth 606 along a predetermined trajectory (e.g., a trajectory substantially parallel to the channel 602). Additionally, the channel 602 can be used to produce intrusion or extrusion of the tooth as it moves along the trajectory. Although the channel 602 is depicted herein as extending along a mesial-distal direction, other orientations can also be used, such as an occlusal-gingival direction (e.g., to produce intrusion, extrusion, leveling, etc.). In many embodiments, an appliance may include a plurality of channels receiving a plurality of corresponding attachments, such as a buccal channel and a lingual channel respectively accommodating a buccal attachment and a lingual attachment on the underlying tooth. The use of multiple channel-attachment pairs can be used to increase the efficiency and accuracy of tooth repositioning. Furthermore, the materials of the channels and attachments can be selected to optimize force expression and tooth repositioning. For example, the channel and the attachment can each be fabricated from different materials. In many embodiments, the materials can be selected to minimize the frictional coefficient between the channel and attachment, so that the attachment can be moved freely within the channel.

Figure 7A:
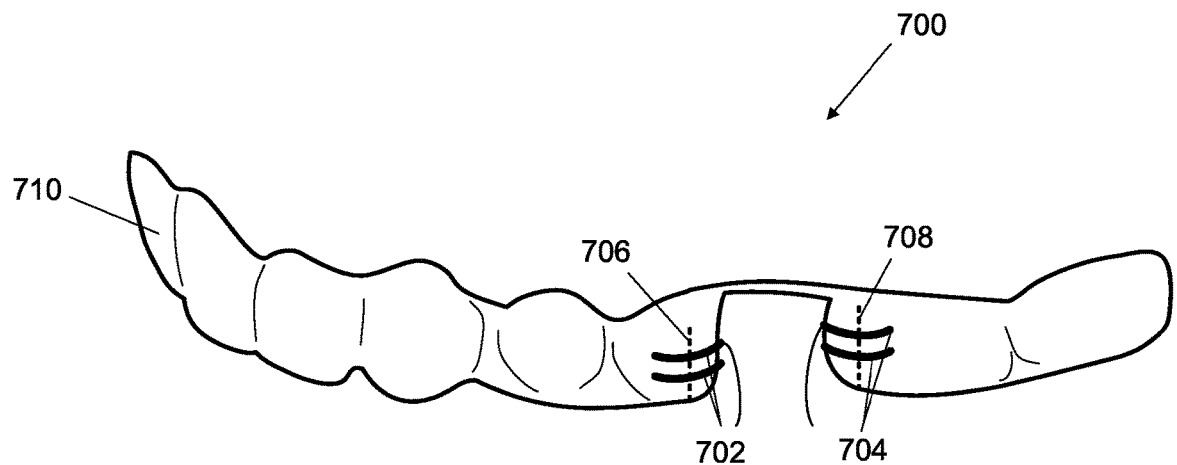
FIG. 7A illustrates another example of an orthodontic appliance for repositioning teeth, in accordance with many embodiments.
Figure 7B:
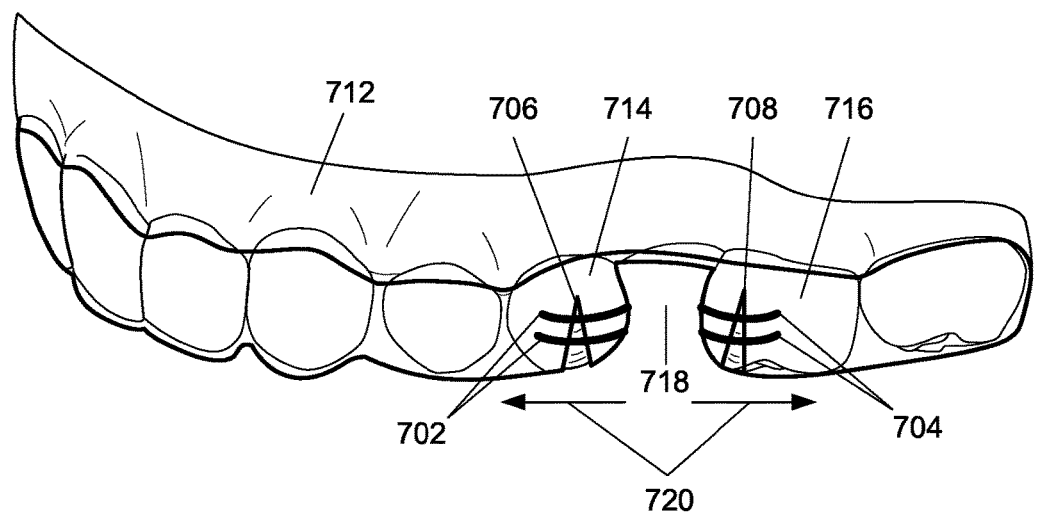
FIG. 7B illustrates the appliance of FIG. 7A when placed over the teeth.
Figure 7C:
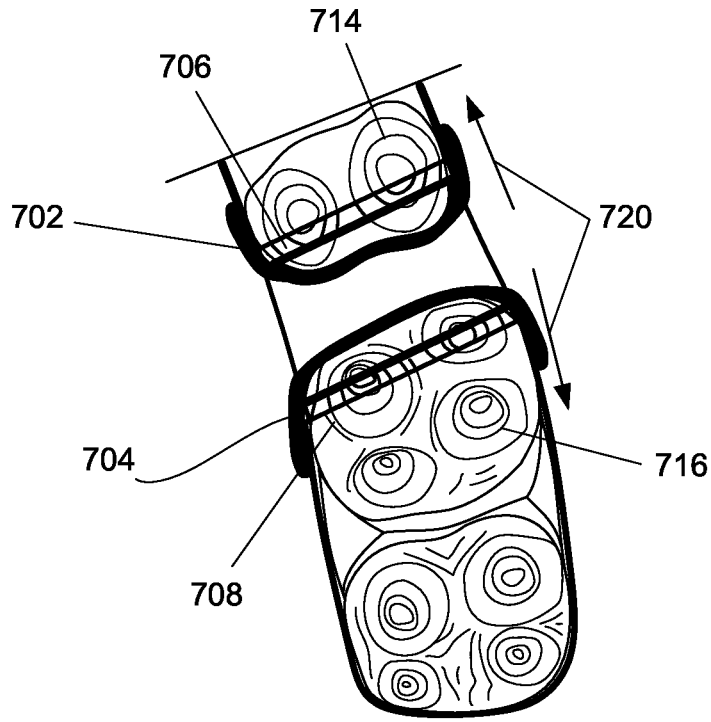
FIG. 7C illustrates the occlusal surface of the appliance of FIG. 7A.
Figure 7D:
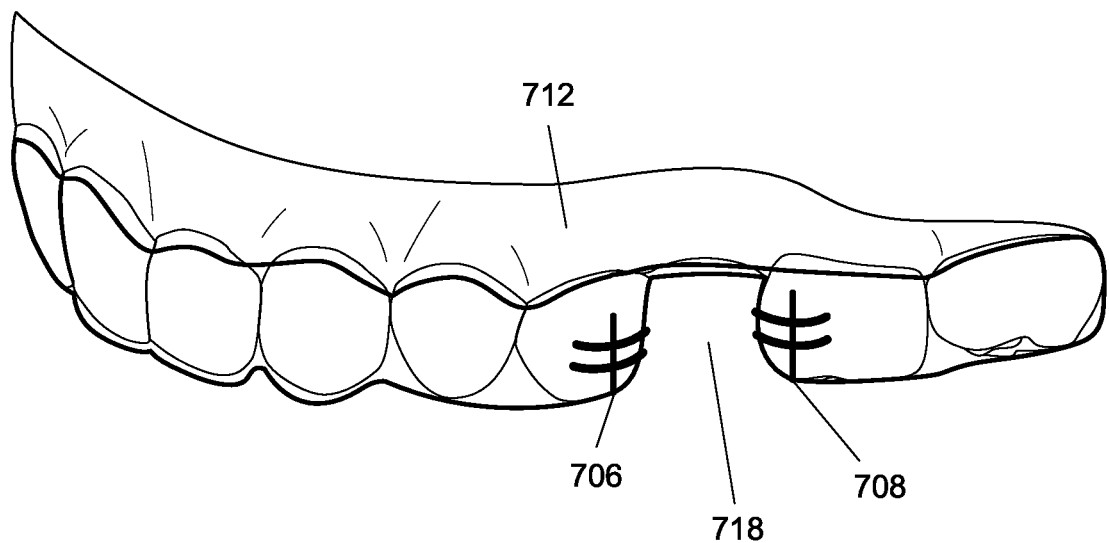
FIG. 7D illustrates the appliance of FIG. 7B after tooth repositioning has occurred.

FIG. 7A through FIG. 7D illustrate an orthodontic appliance 700 for repositioning teeth of a dental arch, in accordance with many embodiments. The appliance 700 includes a shell 710 and first and second pairs of elastic members 702, 704, which interact respectively with the first and second discontinuities 706, 708 formed in the shell 710. In alternative embodiments, a different number of elastic members can be used for each discontinuity, e.g., a single elastic member, or more than two elastic members. When the appliance 700 is placed on the arch 712 (depicted in FIG. 7B), the elastic member pairs 702, 704 and the discontinuities 706, 708 are situated on the teeth 714, 716 immediately flanking the space 718. As illustrated in FIG. 7C, when the appliance 700 is worn, the discontinuities 706, 708 are deformed to form gaps in the shell 710 extending over the occlusal surfaces of the teeth 714, 716, and the elastic members 702, 704 extend from the lingual surfaces to the buccal surfaces of the teeth 714, 716. The interaction between the elastic members 702, 704 and the discontinuities 706, 708 result in tooth movements (see, e.g., arrows 720) expanding the size of the space 718. As previously described, the magnitude of the tooth movements can be influenced by the size of the discontinuities 706, 708. FIG. 7D illustrates the repositioned arch 712, in which the space 718 has been expanded and the discontinuities 706, 708 have reverted to their respective undeformed configuration (the fully expressed state).

In many embodiments, the orthodontic appliances presented herein can include a shell that is separated into two or more discrete segments, which may be referred to as "segmented orthodontic appliances." A shell can be separated into any suitable number of segments, e.g., two, three, four, five, or more. The shell can be separated into two or more horizontal (mesial-distal) segments. Alternatively or in addition, the shell can be separated into two or more vertical (occlusal-gingival) segments. Each shell segment can receive a different subset of the patient's teeth. Different segments can receive different numbers of teeth. Alternatively, some or all of the segments can receive the same number of teeth. The shell segments can be joined to each other via one or more elastic members so as to form a single orthodontic appliance. The elastic members can permit movement of the shell segments relative to each other, and the direction of permitted movement can be determined based on the desired tooth movements to be achieved (e.g., extrusion, intrusion, translation, etc.). In many embodiments, the segments can move relative to each other along a plurality of different directions. Alternatively, the segments may be constrained to move along a single direction. For example, the shell segments can be movable relative to each other only along a horizontal (mesial-distal) direction , only along a vertical (occlusal-gingival) direction, or any suitable intermediate angle. Constrained movement can be achieved using various techniques, such as guide features that define the permissible direction(s) of motion. In many embodiments, such guide features include a first element (e.g., a channel or groove) located on a first shell segment and a second element (e.g., a protrusion that first into the channel or groove) located on a second shell segment, such that the shell segments are only permitted to move along certain directions (e.g., along the length of the channel) when the two elements are engaged with each other. Moreover, the guide features can include elastic elements (e.g., spring elements) that apply forces on the segments to displace them relative to each other (e.g., towards each other or away from each other).

FIG. 8A through FIG. 8C and FIG. 8G illustrate an orthodontic appliance 800 that includes a first shell segment 806 and a second shell segment 808, which can be viewed as being separated by a discontinuity 804 (e.g., the separation between the two segments 806, 808). As depicted herein, the segments 806, 808 of the appliance 800 are horizontal (mesial-distal) segments. The first and second shell segments 806, 808 have guide features 802. The first and second segments 806, 808 are movable relative to each other. A plurality of elastic members 810 spans the discontinuity 804 and is coupled to the first and second segments 806, 808. In many embodiments, the first and second segments 806, 808 are configured to overlap, with a portion of the first segment 806 positioned over a portion of the second segment 808, such that the two segments 806, 808 can telescopically slide relative to each other.

The guide features 802 formed in the segments 806, 808 are configured to guide the movement of the segments 806, 808 relative to each other. For example, the guide features can include mating telescopic features (e.g., protrusions 812 sliding within channels 814) that constrain the relative motion between the segments 806, 808 along a specified direction. FIG. 8H and FIG. 8I illustrate a top view and side view, respectfully, of an exemplary telescopic guide feature 870 including a piston element 872 and spring element 874, in accordance with many embodiments. The piston 872 can slide telescopically within a channel 876. The spring 874 can be any suitable elastic piece or element. In many embodiments, the spring 874 is disposed within the channel 876, with its ends coupled respectively to the interior of the channel 876 and one end of the piston 872, such that the elasticity of the spring 874 controls the amount of force needed to displace the piston 872 relative to the channel 876 (e.g., inwards and/or outwards).

The guide features described herein can be integrally formed with the appliance shell, or provided as separate elements that are attached to the shell. In many embodiments, the guide feature 870 can be installed within the channels 814 of the appliance 800. Alternatively or in addition, the guide feature 870 can be installed on the shell segments 806, 808 of the appliance 800 without requiring the channels 814. For example, the guide feature 870 may be provided as a separate element and fastened to the appliance 800 using one or more fasteners 878 (e.g., rivets, screws, pins, etc.). Any suitable configuration and/or number of telescopic features (or other guide features) can be used in conjunction with any suitable configuration and/or number of elastic members and discontinuities. FIG. 8G illustrates a cross-section of segment 806 in which the telescopic channels 814 and the elastic members 810 are interspersed with each other. The guide features and the elastic members can be situated on any suitable portion of the appliance, such as the lingual, occlusal, and/or buccal surfaces of the appliance.

Figure 8A:
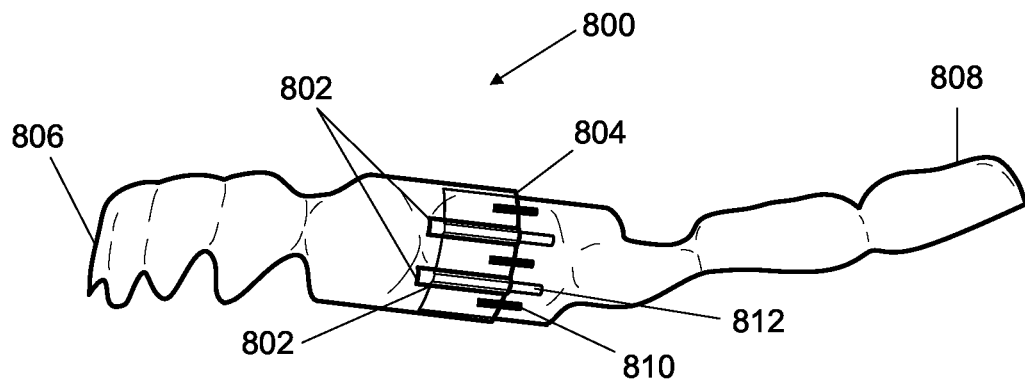
FIG. 8A illustrates an orthodontic appliance having elastics and associated guide features, in accordance with many embodiments.
Figure 8B:
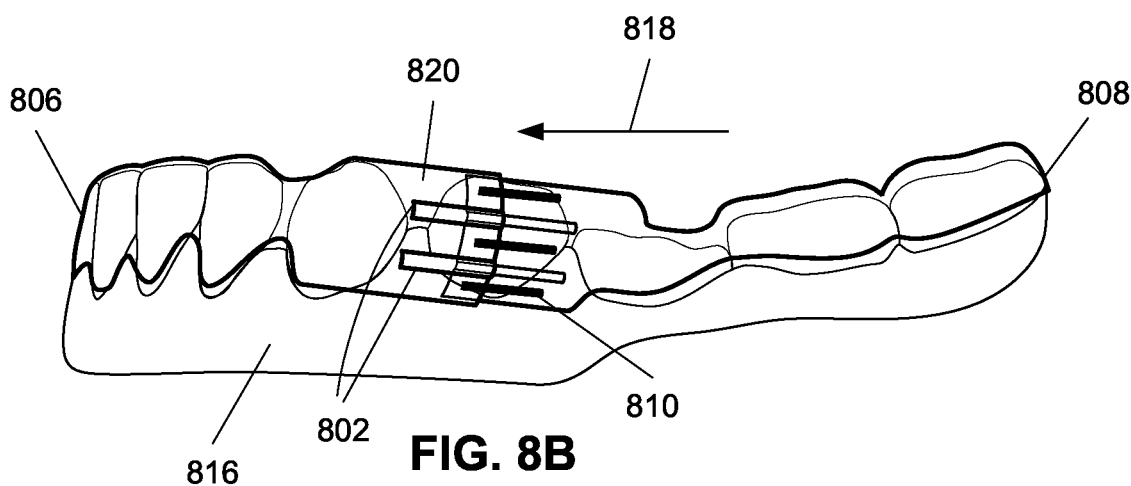
FIG. 8B illustrates the appliance of FIG. 8A when placed over the teeth.
Figure 8C:
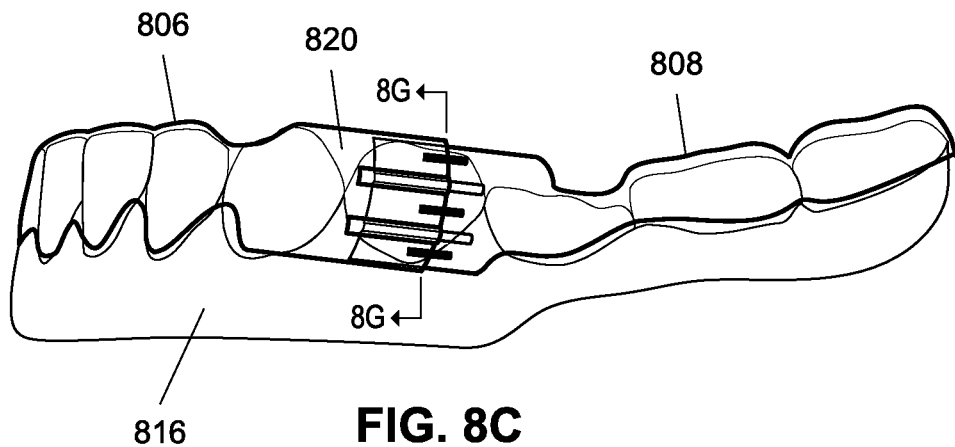
FIG. 8C illustrates the appliance of FIG. 8B after tooth repositioning has occurred.

When the appliance 800 is placed over an arch 816 (as illustrated in FIG. 8B), the segments 806, 808 may be displaced relative to each other (e.g., moved apart). The elastic members 810 can exert a force on the segments 806, 808 resisting the displacement and pulling the segments 806, 808 toward each other. The resulting associated forces applied to the teeth induce repositioning of the teeth of the arch 816 (see, e.g., arrow 818) so as to reduce the arch length (e.g., by closing the interproximal space 820). The guide features 802 can act in parallel with the elastic members 810 to control the magnitude and/or direction of the forces expressed on the teeth. FIG. 8C illustrates the teeth of the arch 816 after repositioning, with the space 820 closed and the two segments 806, 808 returned to the original configuration of FIG. 8A.

Figure 8D:
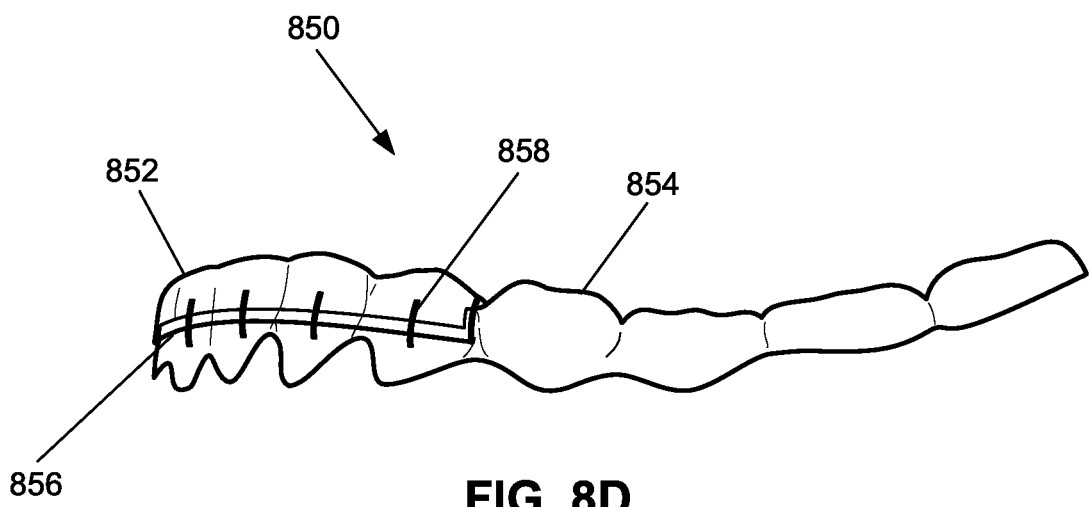
FIG. 8D illustrates an orthodontic appliance having telescopic shell segments, in accordance with many embodiments.
Figure 8E:
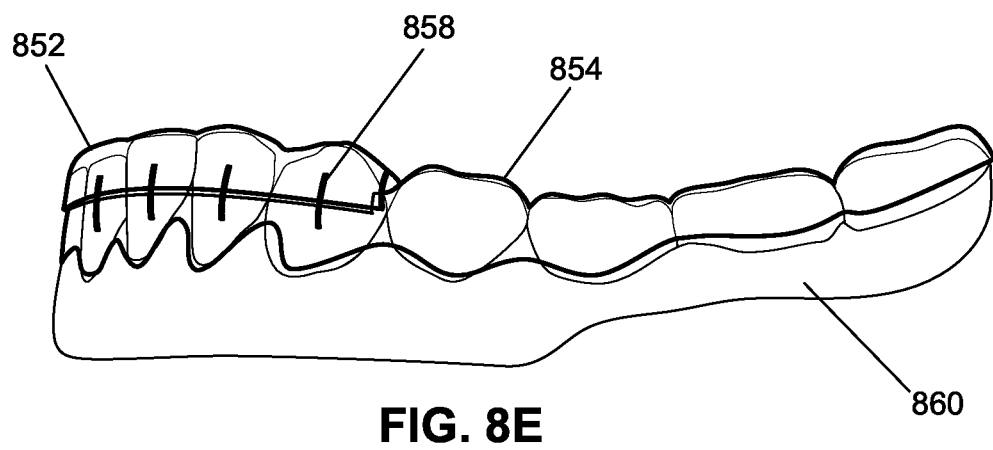
FIG. 8E illustrates the appliance of FIG. 8D when placed over the teeth.
Figure 8F:
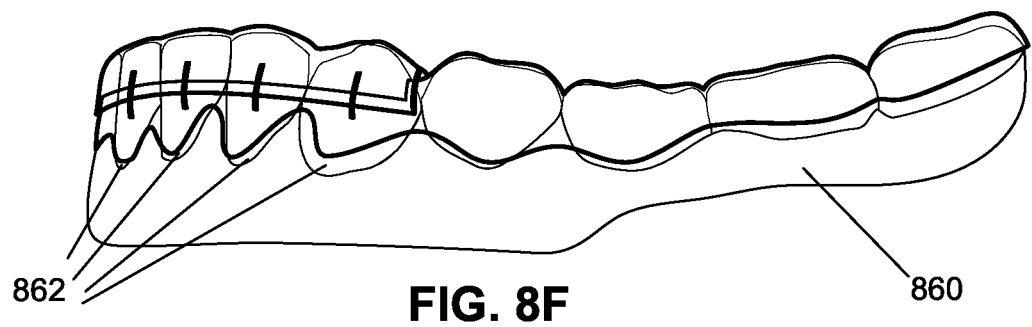
FIG. 8F illustrates the appliance of FIG. 8E after tooth repositioning has occurred.
Figure 8G:
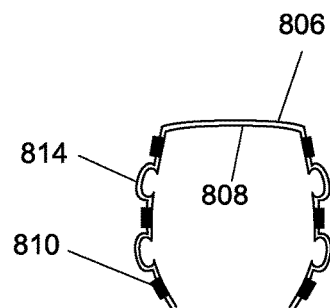
FIG. 8G is a cross-sectional view of a segment of the appliance of FIG. 8C.
Figure 8H:
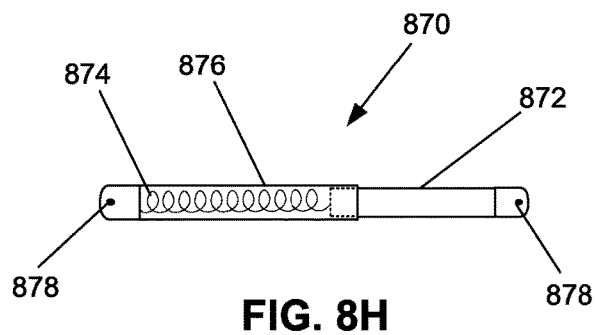
FIG. 8H is a top view of a telescopic guide feature, in accordance with many embodiments.
Figure 8I:
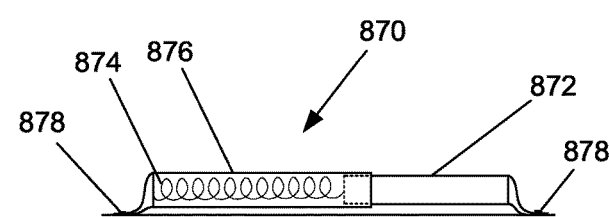
FIG. 8I is a side view of the telescopic guide feature of FIG. 8H.

FIG. 8D through FIG. 8F illustrate an orthodontic appliance 850 with telescopic shell segments 852, 854, in accordance with many embodiments. The shell segments 852, 854 are depicted herein as being vertical (occlusal-gingival) segments. The first shell segment 852 and the second shell segment 854, which can be viewed as being separated by a discontinuity 856, are movable relative to each other, such that the first segment 852 overlaps and slides telescopically over the second segment 854. A plurality of elastic members 858 spans the discontinuity 856 and is coupled to the first and second segments 852, 854. When the appliance 850 is placed over an arch 860 (as illustrated in FIG. 8E), the segments 852, 854 may be displaced relative to each other (e.g., moved apart). The elastic members 858 can resist the displacement and pull the segments 852, 854 towards each other, causing repositioning of the teeth of the arch 860 (e.g., intrusion of the teeth, as illustrated in FIG. 8F). In many embodiments, the orthodontic appliance 850 can include one or more of the guide features described herein in order to more precisely direct the relative movements of the segments 852, 854.

Figure 25A:
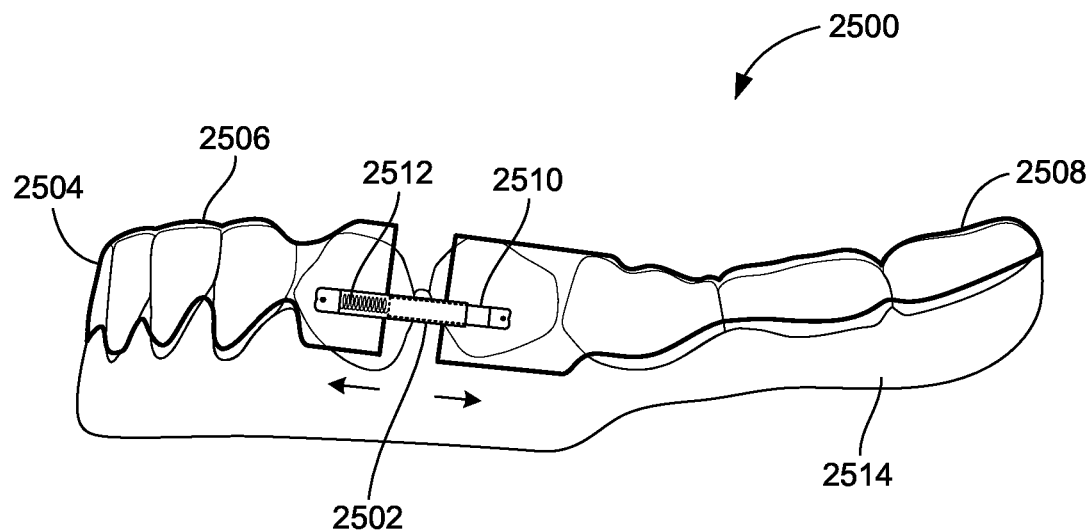
FIGS. 25A and 25B illustrate orthodontic appliances having telescopic guide features, in accordance with many embodiments.

FIG. 25A illustrates an orthodontic appliance 2500 having a telescopic guide feature 2502, in accordance with many embodiments. The appliance 2500 includes a shell 2504 that is separated into discrete segments 2506, 2508, with the guide feature 2502 joining the two segments, 2506, 2508. The two segments 2506, 2508 can be configured to move relative to each other without sliding telescopically over each other. In alternative embodiments, the segments 2506, 2508 can be configured for telescopic sliding, similar to the embodiments of FIGS. 8A through 8F. The guide feature 2502 can be used to constrain the relative movement of the shell segments 2506, 2508 along a specified direction of motion. In many embodiments, the guide feature 2502 includes an elastic member (e.g., a spring element) that provides the force for eliciting tooth movements. For example, the guide feature 2502, can include a slidable piston element 2510 coupled to an elastic spring element 2512, similar to the guide features previously described herein with respect to FIGS. 8H and 8I. The guide feature 2502 can be arranged such that when the appliance 2500 is placed on the teeth 2514, the spring element 2512 is compressed by the piston 2510, and thus exerts forces (indicated by arrows) to displace the shell segments 2506, 2508 away from each other. The resultant forces exerted on the teeth 2514 can be used to move teeth apart, e.g., to increase a space between teeth.

Figure 25B:
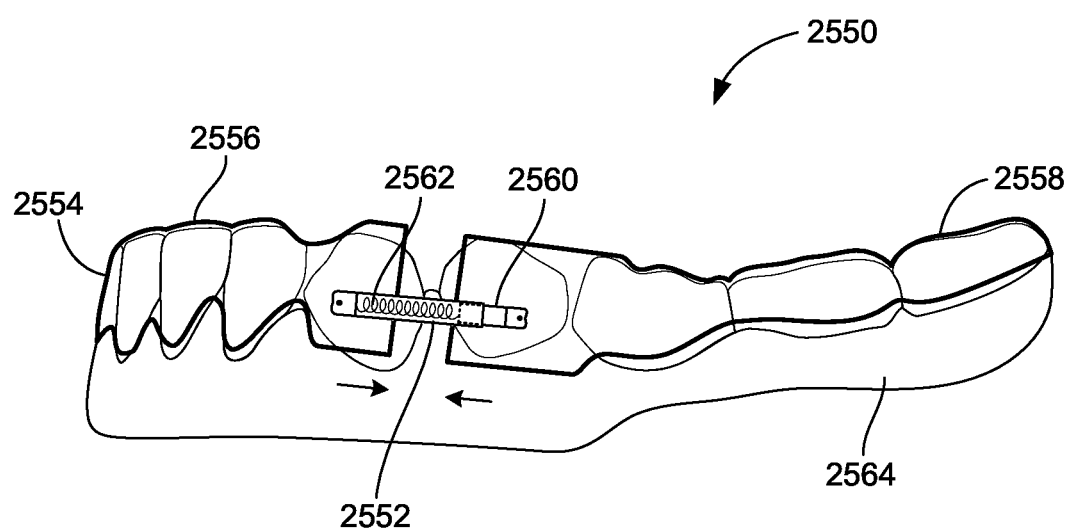

FIG. 25B illustrates an orthodontic appliance 2550 having a telescopic guide feature 2552, in accordance with many embodiments. Similar to the appliance 2500, the appliance 2550 includes a shell 2554 having discrete segments 2556, 2558 joined by the guide feature 2552. The guide feature can include a slidable piston element 2560 coupled to a spring element 2562. The guide feature 2552 can be arranged such that when the appliance 2550 is placed on the teeth 2564, the spring element 2562 is stretched by the piston 2560, and thus exerts forces (indicated by arrows) to displace the shell segments 2556, 2558 towards each other. The resultant forces exerted on the teeth 2564 can be used to move teeth together, e.g., to reduce a space between teeth.

In many embodiments, the orthodontic appliances described herein can be configured to maintain a current position of a patient's teeth, rather than repositioning the teeth. Such tooth retaining appliances, also known as retainers, are generally similar to the tooth repositioning appliances described herein, except that the appliance geometry is selected to exert forces on the teeth without causing repositioning of the teeth. In such embodiments, the tooth arrangement specified by the appliance geometry can be substantially similar to the current tooth arrangement of the patient. A retaining appliance may be worn by a patient, for instance, after orthodontic treatment is complete, in order to reduce or prevent movement of the teeth away from the corrected configuration. Any description herein relating to tooth repositioning appliances can also be applied to tooth retaining appliances, and vice-versa.

Figure 9:
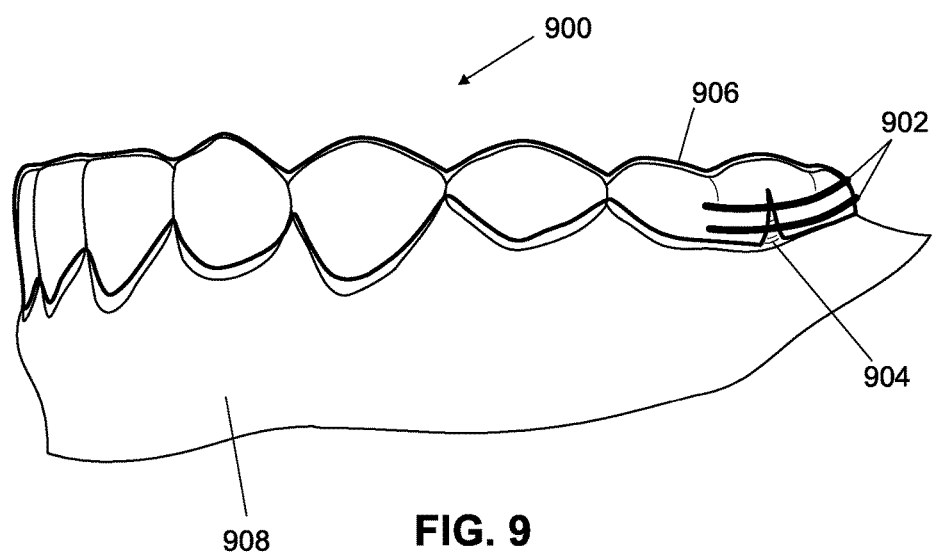
FIG. 9 illustrates an orthodontic appliance for maintaining a current position of the patient's teeth, in accordance with many embodiments.

FIG. 9 illustrates an orthodontic appliance 900 configured to maintain a current position of the patient's teeth, in accordance with many embodiments. The appliance 900 includes a shell 906 and one or more elastic members 902 interacting with a discontinuity 904 formed in the shell 906. For example, the discontinuity 904 can include one or more cuts in the shell 906. The discontinuity 904, e.g., cuts, may extend to a peripheral edge of the shell 906 (e.g., a gingival edge). As illustrated in FIG. 9, the elastic members 902 can be attached on the lingual and buccal surfaces of the shell 906 and span the discontinuity 904. When worn on an arch 908, the appliance 900 can exert a continuous force on one or more teeth to prevent the teeth from moving out of their current arrangement. The magnitude of such forces can be smaller than the magnitude of forces for eliciting tooth movements. Furthermore, the elastic members 902 can function as clasps to prevent the appliance 900 from moving or becoming dislodged from the teeth. The configuration of the shell, elastic members and/or the discontinuity can be selected to prevent inadvertent tooth repositioning.

In many embodiments, in order to improve control over the forces applied to teeth by an orthodontic appliance, the appliance shell can include features such as dimples, ridges, protrusions, etc. that contact teeth at a specified point or region so as to selectively apply force to that point or region. This approach can increase control over the magnitude and/or direction of force application to the teeth, thereby producing more controlled tooth movements and enabling the application of more complex force systems.

Figure 10A:
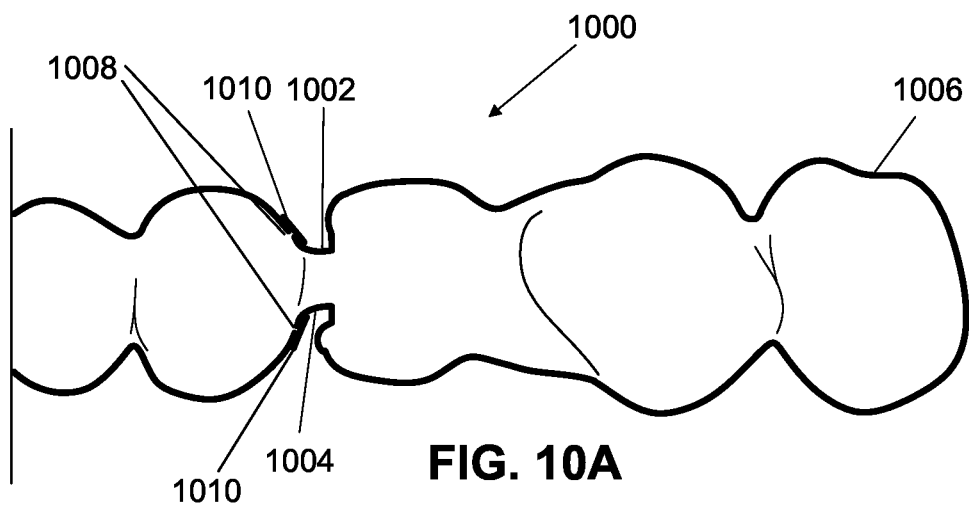
FIG. 10A illustrates an orthodontic appliance with protrusions, in accordance with many embodiments.
Figure 10B:
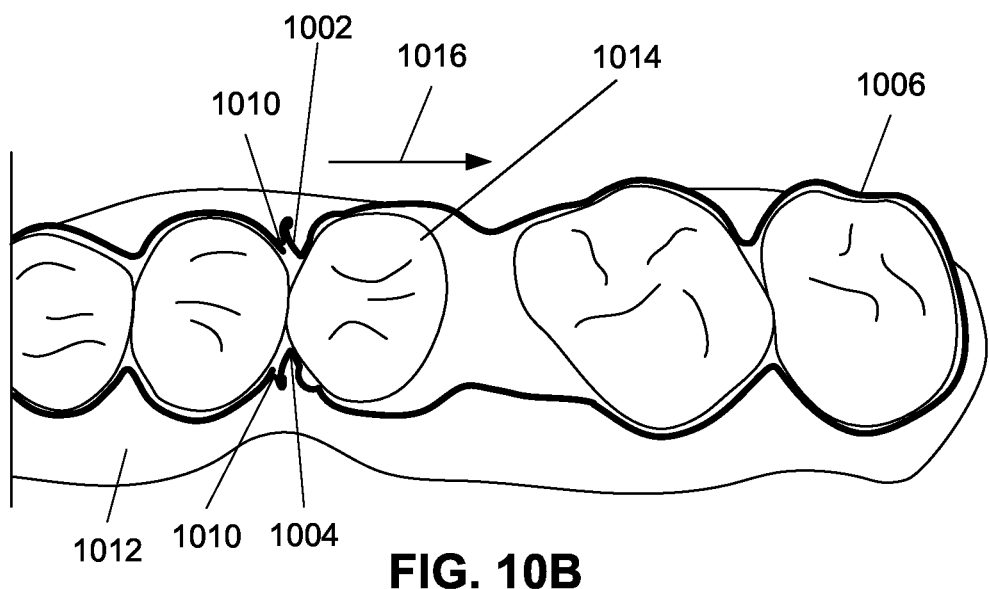
FIG. 10B illustrates the appliance of FIG. 10A when placed over the teeth.
Figure 10C:
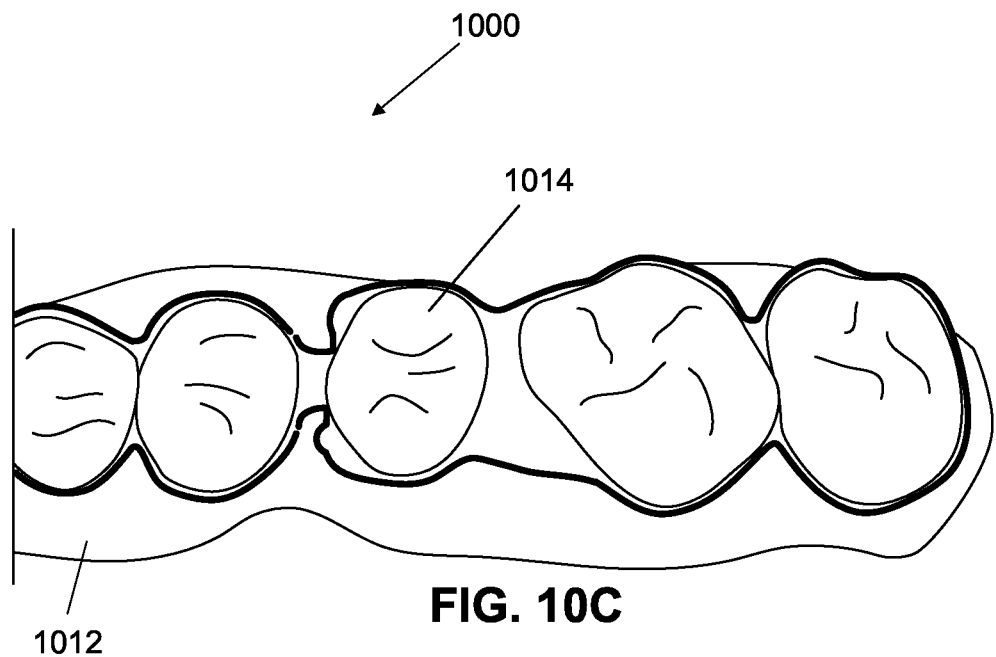
FIG. 10C illustrates the appliance of FIG. 10B after tooth repositioning has occurred.

FIG. 10A through FIG. 10C illustrate an orthodontic appliance 1000 with a lingual 1002 and buccal protrusion 1004, in accordance with many embodiments. The lingual protrusion 1002 and buccal protrusion 1004 are formed as curved surfaces on the lingual and buccal surfaces of the shell 1006, respectively, and protrude into the internal cavity of the shell 1006. The shell 1006 can include a pair of discontinuities 1008 formed on the lingual and buccal surfaces, respectively. Each of the discontinuities 1008 can be formed as a cut in the shell 1006 defining a flap surrounding the corresponding protrusion (as illustrated in FIG. 10G) and can be spanned by a pair of elastic members 1010. When placed on an arch 1012 of a patient (as illustrated in FIG. 10B), the protrusions 1002, 1004 are deflected outwards by the underlying tooth 1014. The elastic members 1010 can resist the deflection by exerting forces that are applied inwards against the tooth 1014 by the protrusions 1002, 1004, thereby causing tooth movement (see, e.g., arrow 1016). FIG. 10C illustrates the appliance 1000 and the arch 1012 after repositioning of the tooth 1014 has occurred.

Figure 10D:
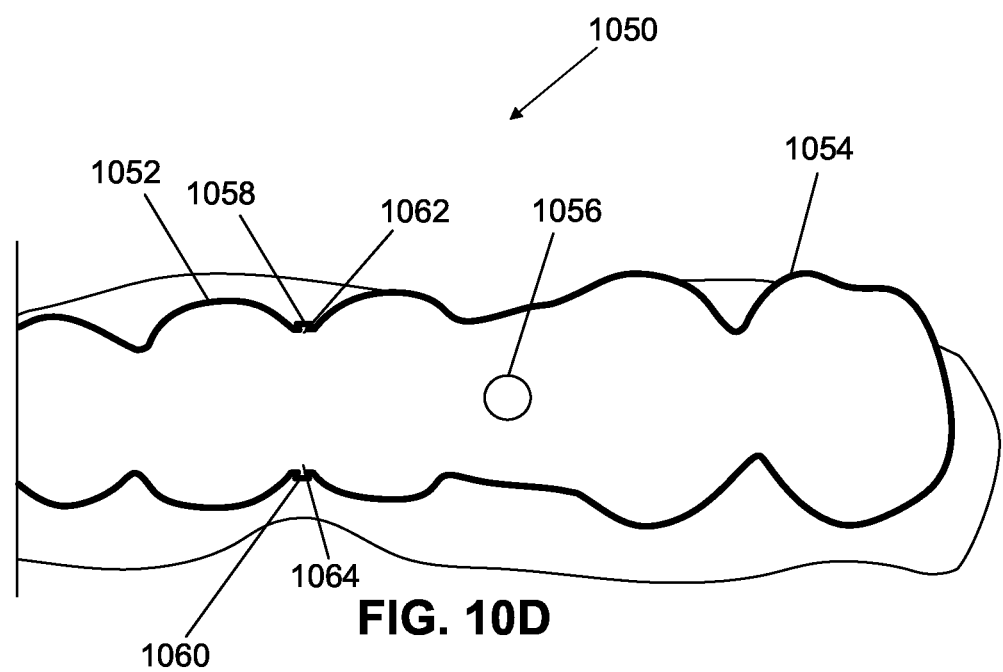
FIG. 10D illustrates an appliance divided into discrete shell segments, in accordance with many embodiments.
Figure 10E:
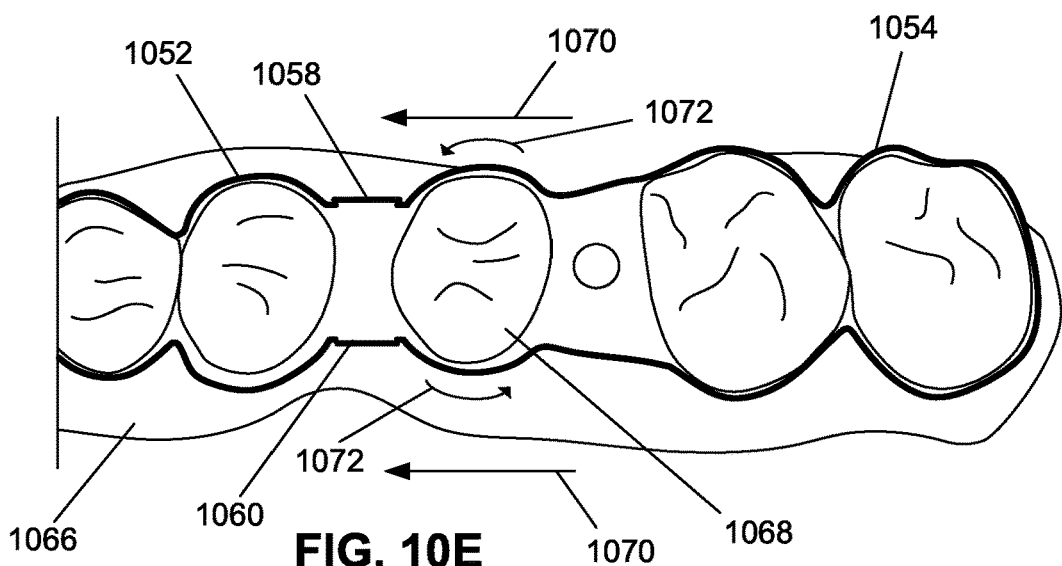
FIG. 10E illustrates the appliance of FIG. 10D when placed over the teeth.
Figure 10F:
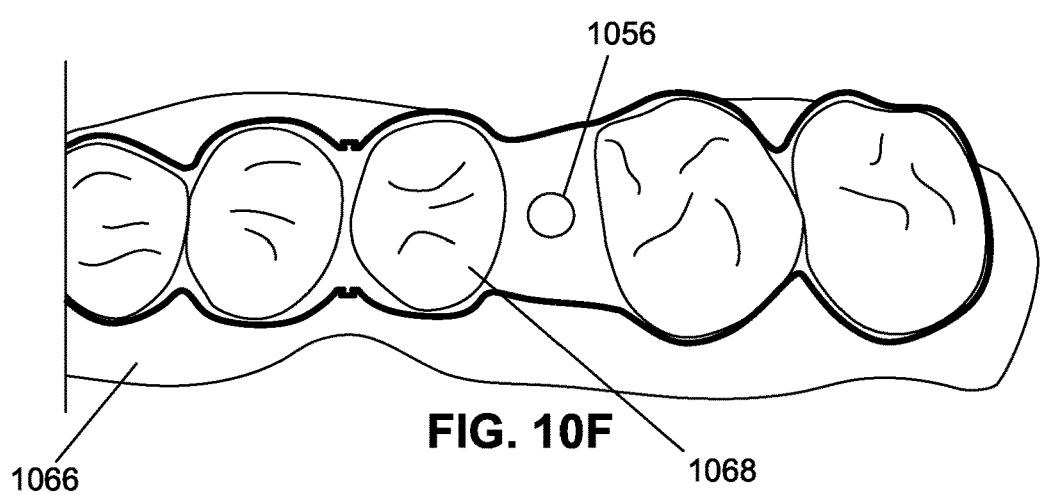
FIG. 10F illustrates the appliance of FIG. 10E after tooth repositioning has occurred.
Figure 10G:
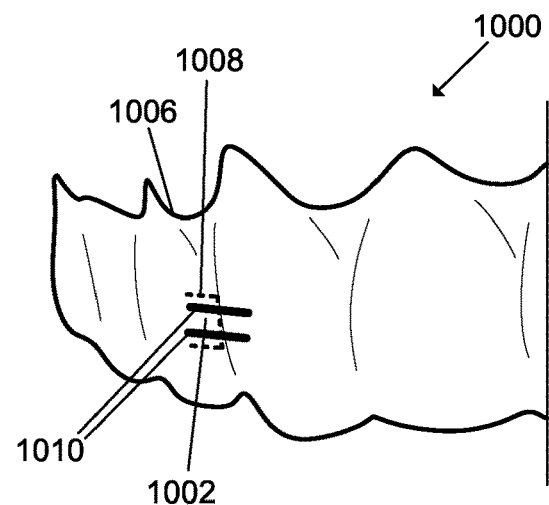
FIG. 10G is a perspective view of the appliance of FIG. 10C.

FIG. 10D through FIG. 10F illustrate an orthodontic appliance 1050 divided into discrete shell segments 1052, 1054, in accordance with many embodiments. The appliance 1050 can be used to increase the size of a space between teeth, for instance, to accommodate installation of a dental prosthesis such as an implant 1056. The shell segments 1052, 1054 are coupled to each other by elastic members 1058, 1060 spanning the discontinuities 1062, 1064, respectively. When placed on an arch 1066 (as illustrated in FIG. 10E), the segments 1052, 1054 are moved apart from each other due to the arrangement of the underlying teeth, thereby stretching the elastics 1058, 1060. The tension in the elastics 1058, 1060 can result in application of repositioning forces to the teeth. For example, the tooth 1068 can be repositioned to increase space for the implant 1056. In many embodiments, the shell segments, discontinuities, and elastic members can be configured to reposition the tooth 1068 in a plurality of phases. In a first phase, the tooth 1068 can be translated along a mesial direction (see, e.g., arrows 1070). In a second phase, the tooth 1068 can be rotated (see, e.g., arrows 1072). The phases may occur sequentially, such that the tooth 1068 is first translated then rotated, or vice-versa. Alternatively, in some instances, the first and second phases can overlap or occur simultaneously, such the tooth 1068 is translated and rotated at the same time. FIG. 10F illustrates the arch 1066 after repositioning, in which the tooth 1068 has been moved to expand the space available for the implant 1056.

FIG. 16A through FIG. 16C illustrate an orthodontic appliance 1600 including a protrusion 1602 for applying force to a tooth, in accordance with many embodiments. As illustrated in FIG. 16A, the internal surface profile of the appliance 1600 has a curved surface that forms the protrusion 1602, which extends into the interior of the appliance. FIG. 16B illustrates a cross-sectional view of a shell 1604 of the appliance 1600, in which the protrusion 1602 is implemented as a curved portion 1606 of the shell 1604. The curved portion 1606 is situated adjacent to or near a discontinuity 1608 in the shell 1604, depicted herein as a cut formed in the shell 1604. An elastic member 1610 is coupled to the shell 1604 spanning the discontinuity 1608, such that one end of the elastic member 1610 is attached to or near the curved portion 1606. FIG. 16C illustrates a tooth 1612 received within the shell 1604 and displacing the curved portion 1606 outward relative to its initial configuration. The elastic member 1610 can exert force on the curved portion 1606 resisting the displacement (see, e.g., arrow 1614). In many embodiments, the exerted force results in associated force being transmitted to the tooth 1612 at a contact point by the curved portion 1606. Application of force to the contact point can be used, for example, to elicit a tipping movement of the tooth 1612.

FIG. 17A through FIG. 17C illustrate an orthodontic appliance 1700 including a protrusion 1702 for applying force to a tooth, in accordance with many embodiments. FIG. 17A illustrates the internal surface profile of the appliance 1700, including the curved protrusion 1702, and is similar to the embodiment of FIG. 16A. FIG. 17B illustrates a cross-sectional view of a shell 1704 of the appliance 1700 in which the protrusion 1702 is implemented as a knob or button 1706 formed on the interior of the shell 1704. Similar to the appliance 1600, the appliance 1700 includes a discontinuity 1708 (e.g., a cut) adjacent to or near the knob 1706, and an elastic member 1710 spanning the discontinuity 1708 and attached at one end to or near the knob 1706. When the appliance receives a tooth 1712, the elastic member 1710 can apply force to the tooth 1712 (see, e.g., arrow 1714) at a contact point via the knob 1706.

Figure 18A:
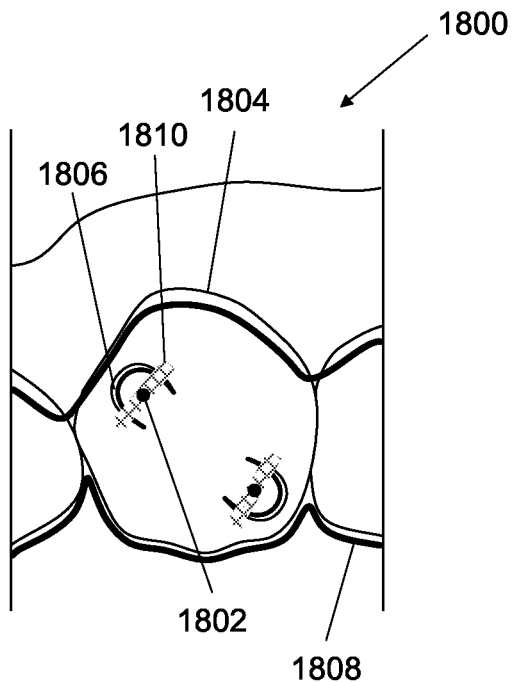
FIGS. 18A through 18C illustrate exemplary orthodontic appliances including protrusions and elastics, in accordance with many embodiments.
Figure 18B:
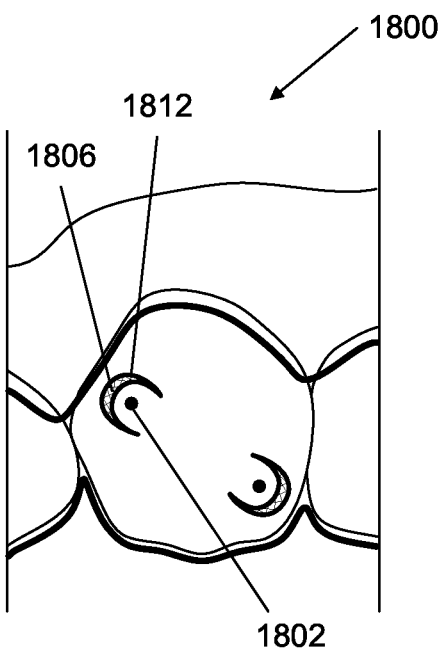
Figure 18C:
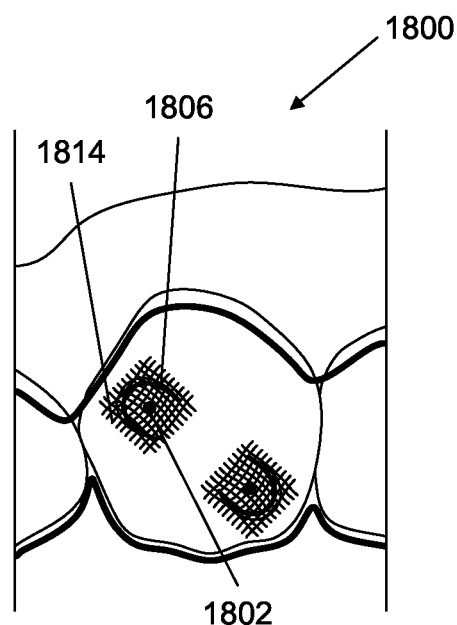
Figure 19:
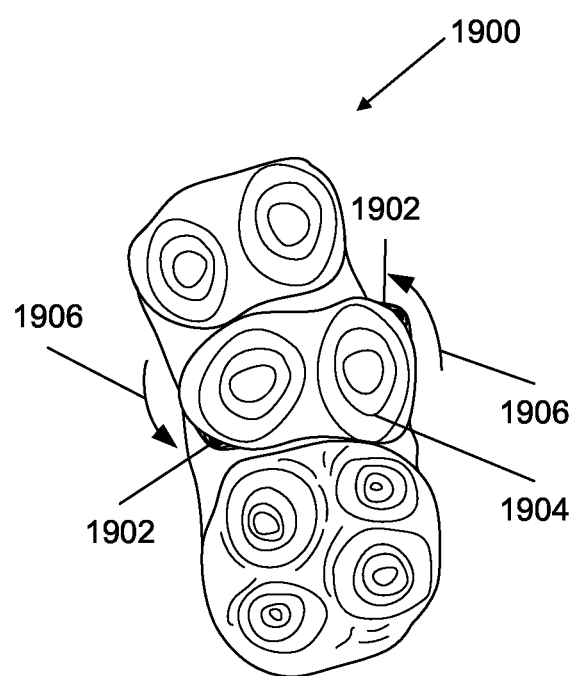
FIG. 19 illustrates another exemplary orthodontic appliance including protrusions, in accordance with many embodiments.

FIG. 18A through FIG. 18C and FIG. 19 illustrate orthodontic appliances that include protrusions for applying forces to teeth, in accordance with many embodiments. The protrusions can be any suitable feature extending from the shell surface to apply force to a tooth via contact between the protrusion and the tooth, such as the embodiments previously described herein (e.g., curved surface 1606, knob 1706). FIG. 18A illustrates an appliance 1800 including a pair of protrusions 1802 situated over a tooth 1804. Each of the protrusions 1802 is positioned near a discontinuity, depicted herein as a cut forming a curved flap 1806 in the shell 1808, such that the protrusion is disposed on the underside of the flap 1806 (extending into the interior of the shell 1808 towards the tooth 1804). An elastic member, depicted herein as a band or strip 1810, is attached to the shell 1808 on opposing sides of the flap 1806 and extends over the flap 1806. FIG. 18B illustrates an alternative configuration for the appliance 1800, in which the elastic member is implemented as an elastic membrane or elastic mesh 1812 that connects the edges of the flap 1806 to the adjacent edges of the shell 1804. FIG. 18C illustrates another exemplary configuration for the appliance 1800, in which the elastic member includes an elastic membrane or elastic mesh 1814 that is positioned over the entirety of the flap 1806 and a portion 1804 of the shell adjacent to the flap 1806. In each of the previous examples, the elastic member can generate forces that are applied to the flap 1806 and thereby generate forces that are applied by the protrusion 1802 against the tooth 1804. The positioning of the protrusions 1802 can be configured to control the tooth movements resulting from the application of these forces. For example, as depicted in FIG. 19, an appliance 1900 can include a pair of protrusions 1902 situated on different sides of a tooth 1904 (e.g., on a buccal surface and a lingual surface, respectively). The positioning of the protrusions 1902, when combined with a suitable set of elastic members and discontinuities (not shown), can be used, for instance, to elicit a rotational tooth movement (see, e.g., arrows 1906). The elastics described herein can be coupled to the shell and/or flap using any suitable method. For example, the elastics can be extruded, sprayed, or otherwise directly adhered onto the shell and/or flap.

Figure 20A:
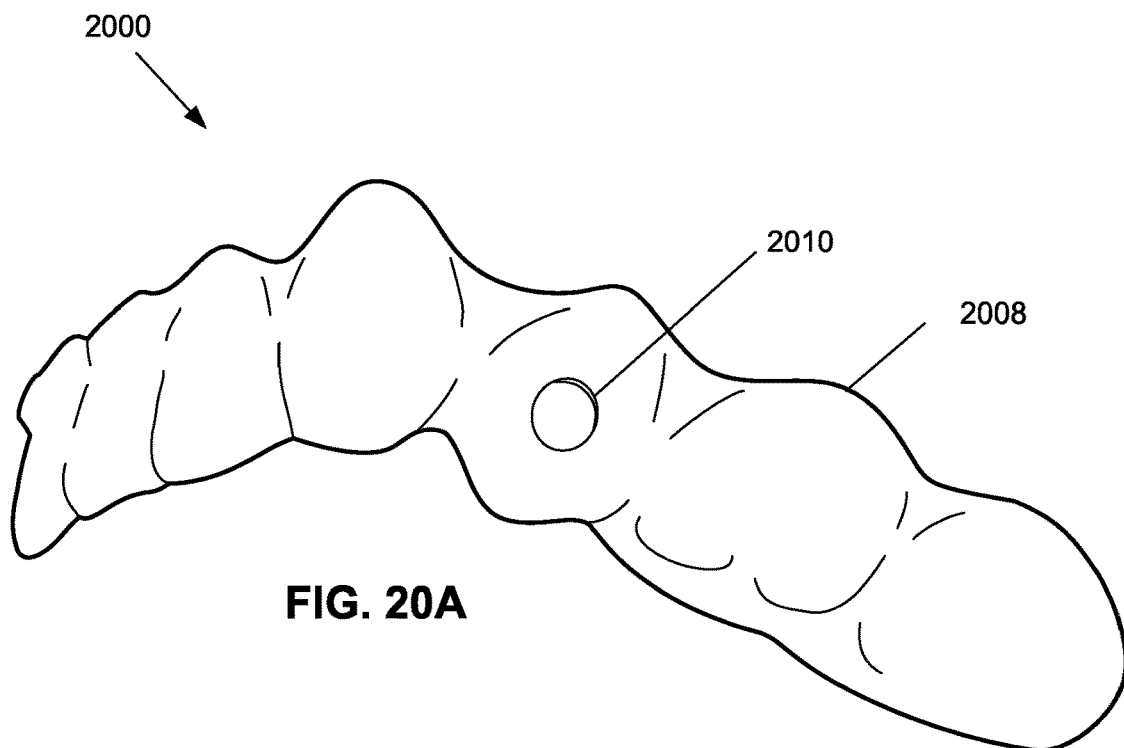
FIG. 20A illustrates an orthodontic appliance shell used with an elastic member and attachment, in accordance with many embodiments.
Figure 20B:
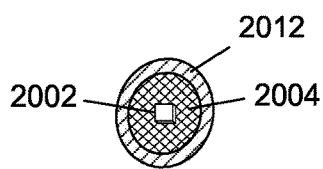
FIG. 20B illustrates an elastic member with an attachment, in accordance with many embodiments.
Figure 20C:
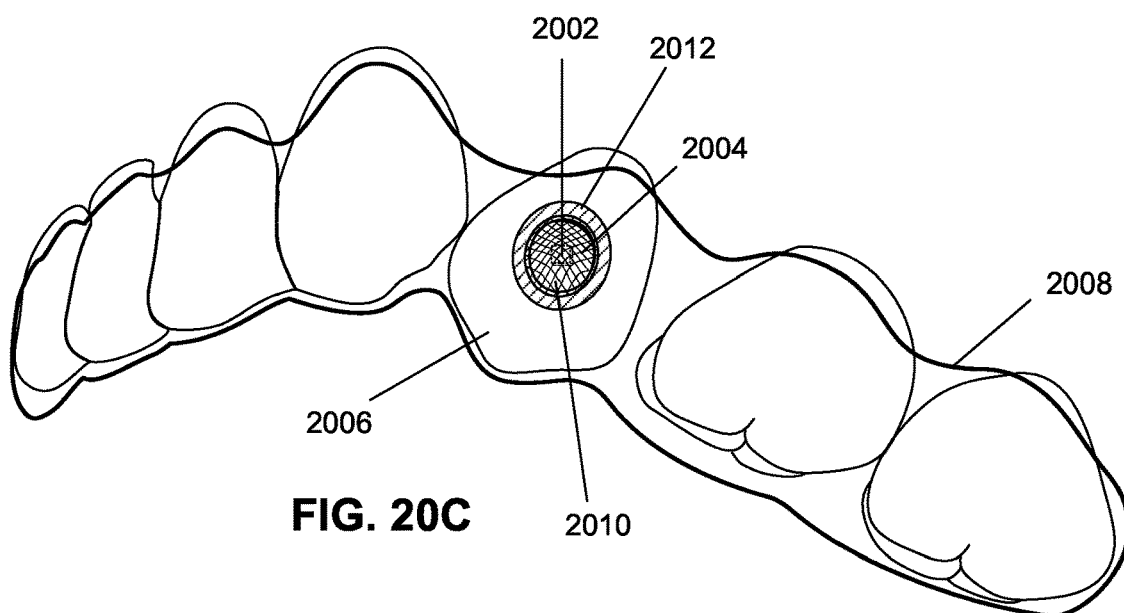
FIG. 20C illustrates the elastic member of FIG. 20B coupled to the appliance of FIG. 20A.

FIG. 20A through FIG. 20C illustrate an orthodontic appliance 2000 including an elastic member with an attachment 2002, in accordance with many embodiments. The elastic member, depicted herein as a mesh or membrane 2004, is formed with or coupled to an attachment 2002. The attachment 2002 (e.g., a protrusion, post, stud, button, etc.) is configured to engage and apply force to a tooth 2006. In many embodiments, the attachment 2002 contacts the tooth 2006 through a discontinuity formed in the shell 2008 of the appliance 2000, depicted herein as an aperture 2010. The attachment 2002 can contact the tooth 2006 directly, or indirectly (e.g., via an attachment mounted on the tooth). The elastic member can be coupled to the shell 2008 in a position spanning the discontinuity such that the attachment 2002 extends into the interior of the shell 2008 through the discontinuity. For example, the mesh 2004 is shaped to cover the aperture 2010 and includes an adhesive perimeter 2012 enabling the mesh 2004 to be directly coupled to the shell 2008. When the mesh 2004 is attached to the shell 2008, the attachment 2002 protrudes through the aperture 2010 towards the tooth 2006.

In many embodiments, the orthodontic appliance is configured to exert force on a tooth via one or more attachments mounted to the tooth. As previously described herein, an attachment can be coupled to the surface of one or more teeth to transmit forces exerted by the appliance onto the teeth. The geometry of the attachment and its position on the tooth can influence the magnitude and/or direction of the forces applied to the tooth. In many embodiments, the attachment is configured to elicit tooth movements that may be difficult to achieve with the appliance alone (e.g., extrusion).

The interactions between the appliance (e.g., an elastic member, a shell, a flap formed in the shell, etc.), attachment (e.g., mounted on a tooth), and teeth can be influenced by friction between these elements. In many embodiments, the frictional coefficient between the appliance and attachment is configured to be smaller than the frictional coefficient between the appliance and the tooth. This arrangement can enable the attachment to move freely relative to the appliance, while increasing the force applied onto the teeth by the appliance. The frictional coefficient can be a function of the material and/or surface properties. In many embodiments, the appliance and the attachment are fabricated using different types of materials, and such materials may be selected based on their material and/or surface properties. Furthermore, the frictional coefficient can be increased or decreased by application of suitable coatings, films, texturing, and the like.

Figure 11A:
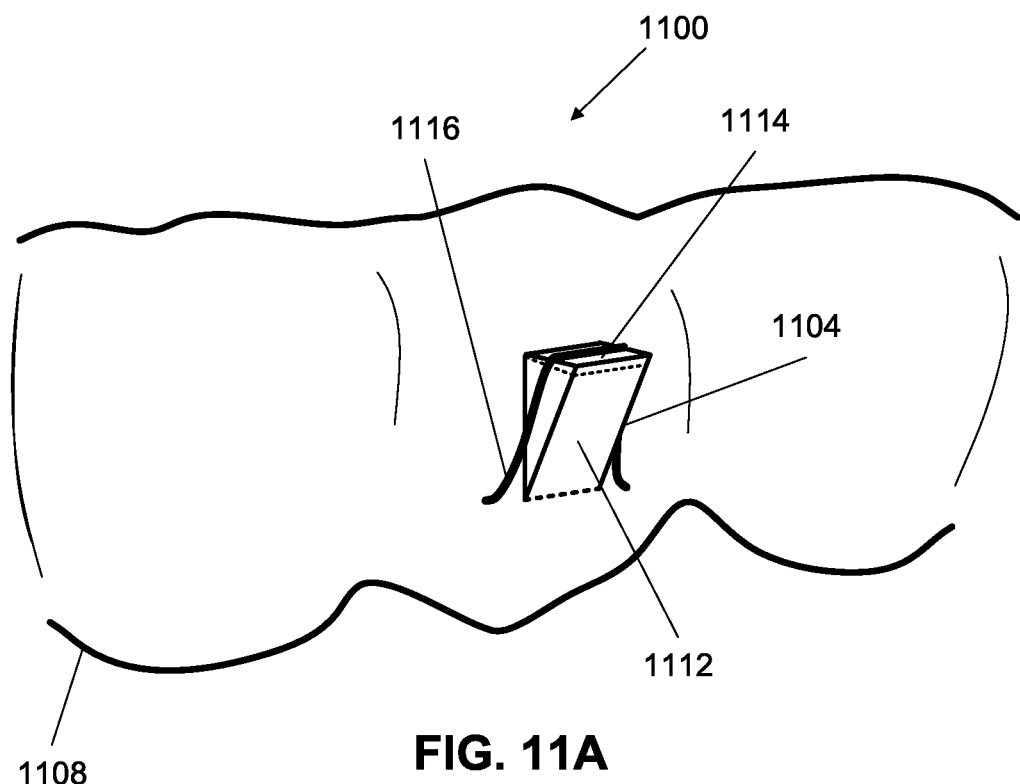
FIG. 11A illustrates an orthodontic appliance configured to engage an attachment, in accordance with many embodiments.
Figure 11B:
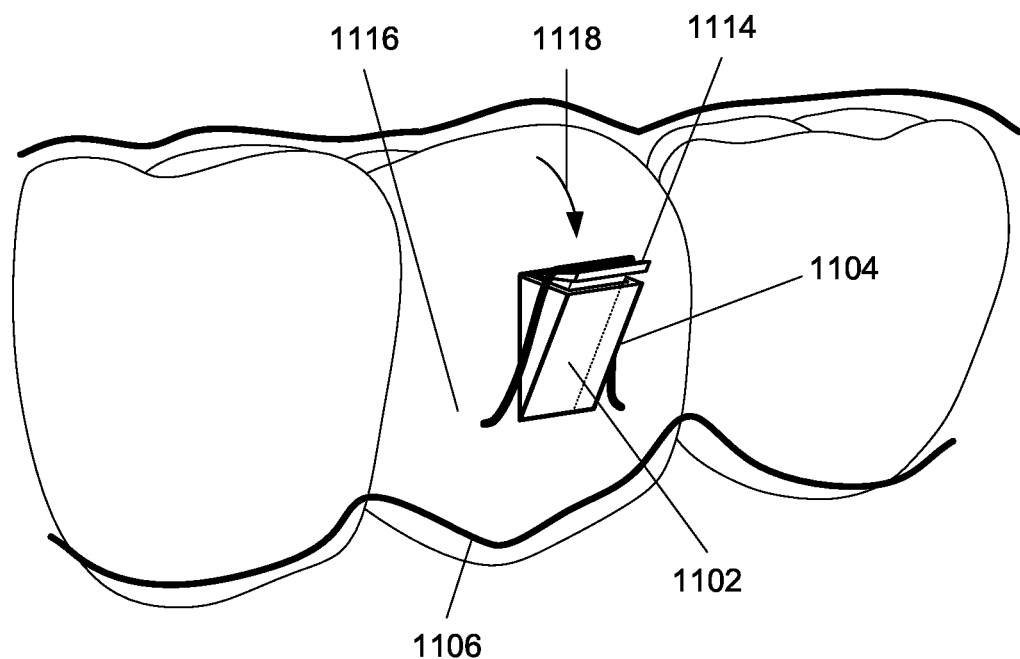
FIG. 11B illustrates the appliance of FIG. 11A when placed over the teeth.

FIG. 11A through FIG. 11B illustrate an orthodontic appliance 1100 configured to engage an attachment 1102 on a tooth 1106, in accordance with many embodiments. The appliance 1100 includes a receptacle 1104 that is configured to accommodate the attachment 1102 coupled to the tooth 1106. For example, the receptacle 1104 can be a protrusion extending outward from the surface of the shell 1108, with an interior space shaped to receive the attachment 1102. In many embodiments, the receptacle 1104 is also shaped to accommodate and/or guide the movement of the attachment relative to the shell 1108, such as movements corresponding to repositioning of the underlying tooth. The receptacle 1104 can include, for example, a sloped lateral wall 1112 along which the attachment 1102 can slide as the tooth 1106 moves upwards or downwards (along a gingival-occlusal axis).

The appliance 1100 further includes a discontinuity formed in the shell 1108, e.g., so as to form a flap 1114, which can be positioned over and/or against the open upper surface of the receptacle 1104. An elastic member 1116 is attached to the shell 1108 at attachment points, e.g., on either side of the receptacle 1104, and can extend over the top of the receptacle 1104 to hold the flap 1114 in place. When the appliance 1100 is placed over the teeth (as illustrated in FIG. 11B), the attachment 1102 is positioned within the receptacle 1104 and can protrude at least partially from the open upper surface, causing the flap 1114 to be displaced from its initial configuration. The elastic member 1116 can push against the flap 1114, thus imparting a downwards force on the attachment 1102 (see, e.g., arrow 1118) that is transmitted to the underlying tooth 1106, eliciting an intrusive tooth movement.

Figure 12A:
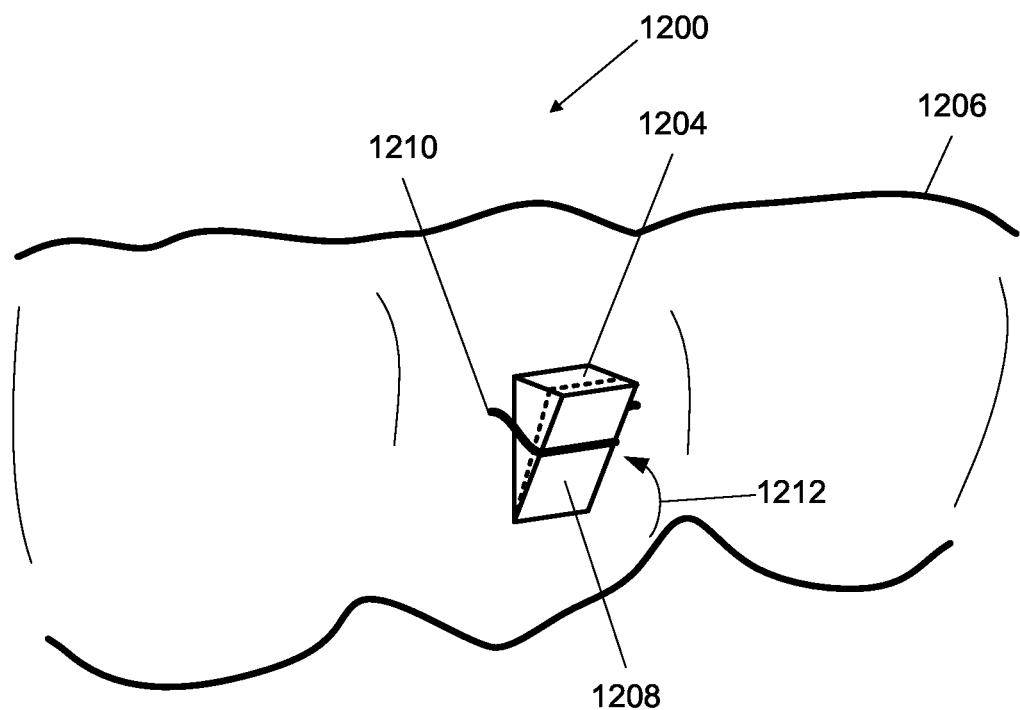
FIG. 12A illustrates another exemplary orthodontic appliance configured to engage an attachment, in accordance with many embodiments.
Figure 12B:
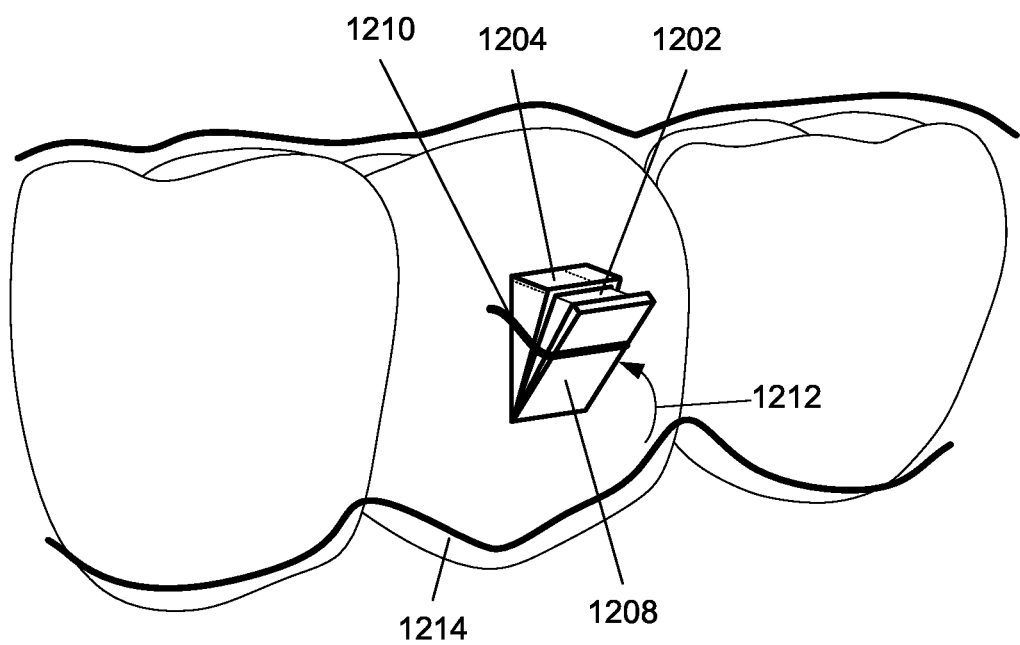
FIG. 12B illustrates the appliance of FIG. 12A when placed over the teeth.

FIG. 12A through FIG. 12B illustrate an orthodontic appliance 1200 configured to engage an attachment 1202, in accordance with many embodiments. The appliance 1200 includes a shell 1206 and a receptacle 1204 formed in the shell 1206 and shaped to receive the attachment 1202. The receptacle 1204 can include an open lateral surface from which the attachment 1202 can protrude. In many embodiments, the appliance 1200 includes a discontinuity that forms a flap 1208, which can be positioned over the open lateral surface of the receptacle 1204. An elastic member 1210 is coupled to the shell 1206 at attachment points situated on opposite sides of the receptacle 1204 and extends over the lateral surface of the receptacle 1204 to hold the flap 1208 in place. Similar to the appliance 1100, when the appliance 1200 is placed over the teeth, the attachment 1202 protrudes from the lateral surface of the receptacle 1204, displacing the flap 1208. The elastic member 1210 exerts a force against the flap 1208 to urge the flap 1208 to its closed configuration (see, e.g., arrow 1212), thereby imparting a force onto the attachment 1202 to elicit movement of the underlying tooth 1214.

Figure 13A:
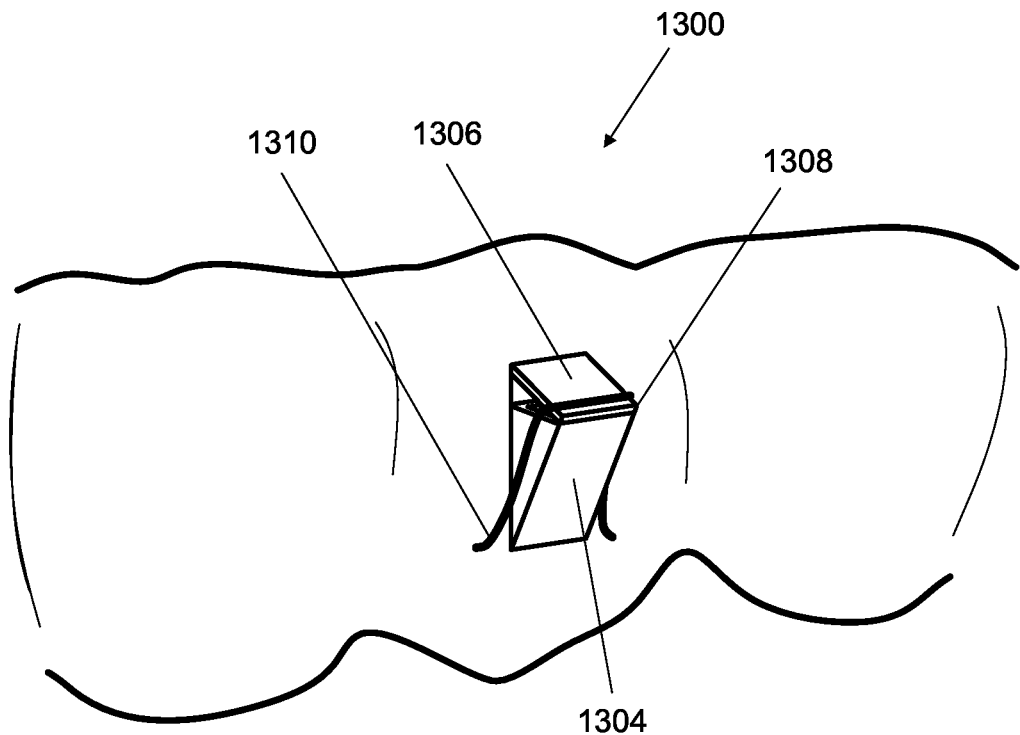
FIG. 13A illustrates yet another orthodontic appliance configured to engage an attachment, in accordance with many embodiments.
Figure 13B:
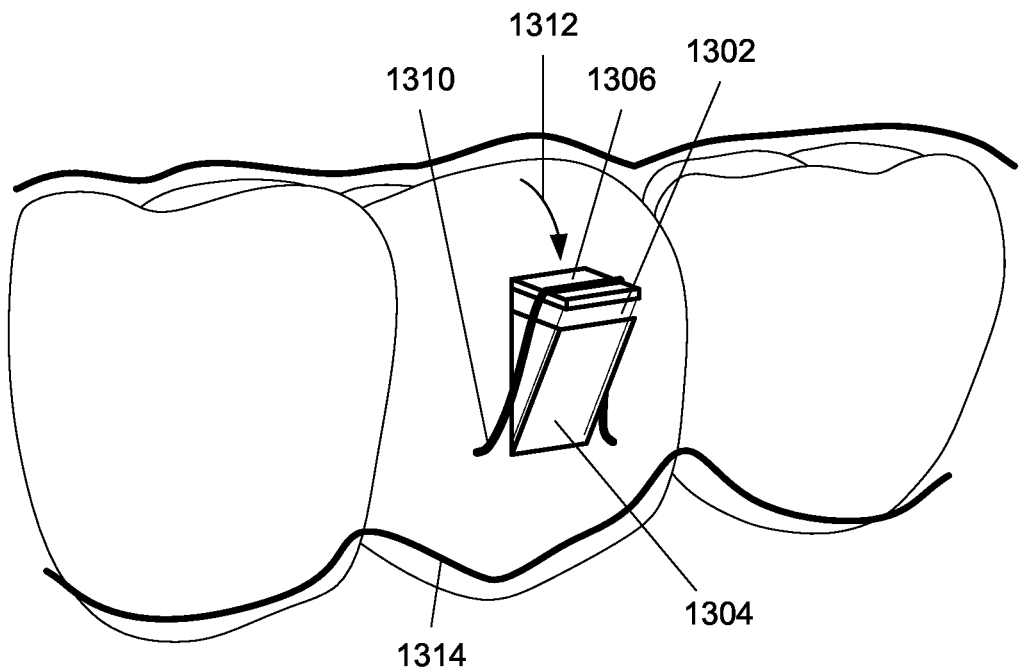
FIG. 13B illustrates the appliance of FIG. 13A when placed over the teeth.

FIG. 13A and FIG. 13B illustrate an orthodontic appliance 1300 configured to engage an attachment 1302, in accordance with many embodiments. Similar to the appliance 1100, the appliance 1300 includes a receptacle 1304 with an open upper surface for accommodating the attachment 1302. A discontinuity of the appliance 1300 can form a flap 1306 positioned over the upper surface of the receptacle 1304. The flap 1306 is vertically offset from the receptacle 1304 such that only the distal edge 1308 of the flap 1306 contacts the receptacle 1304 when the appliance 1300 is not placed over teeth. The elastic member 1310 is similar to the elastic member 1116 in that it extends over the top of the receptacle 1304 to hold the flap 1306 in place. When the appliance 1300 is placed over the teeth (as illustrated in FIG. 13B), the attachment 1302 is received in receptacle 1304 and protrudes from the upper surface of the receptacle 1304 to displace the flap 1306. The elastic member 1310 can impart a downwards force on the flap 1306 (see, e.g., arrow 1312), thereby imparting a downwards force on the attachment 1302 to reposition the tooth 1314.

Figure 14A:
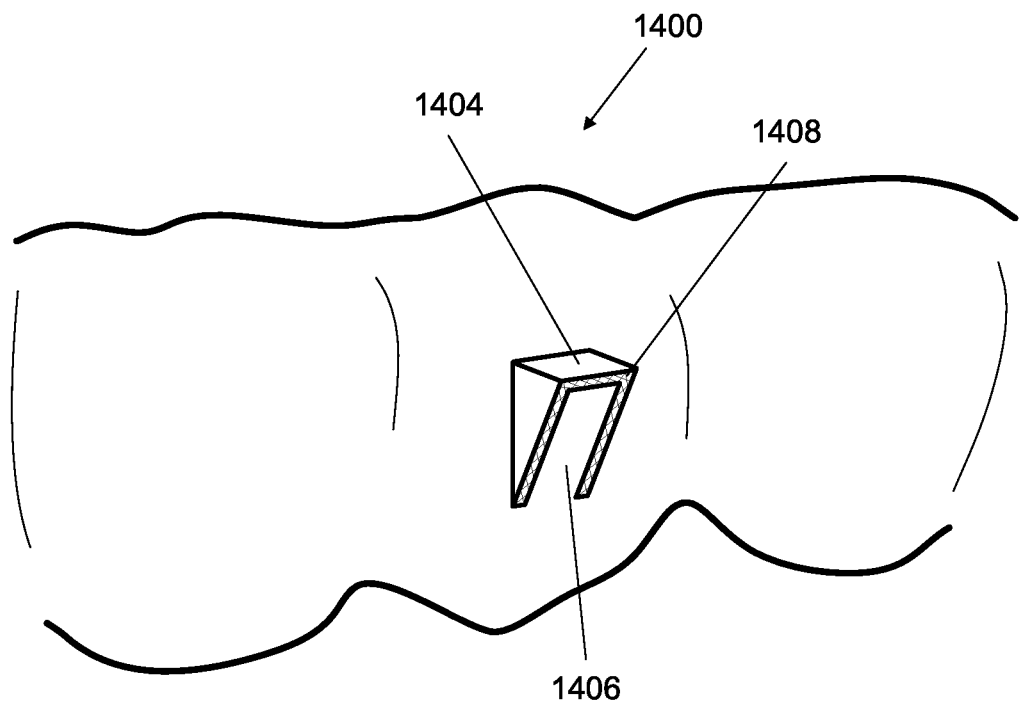
FIG. 14A illustrates an orthodontic appliance configured to engage an attachment, in accordance with many embodiments.
Figure 14B:
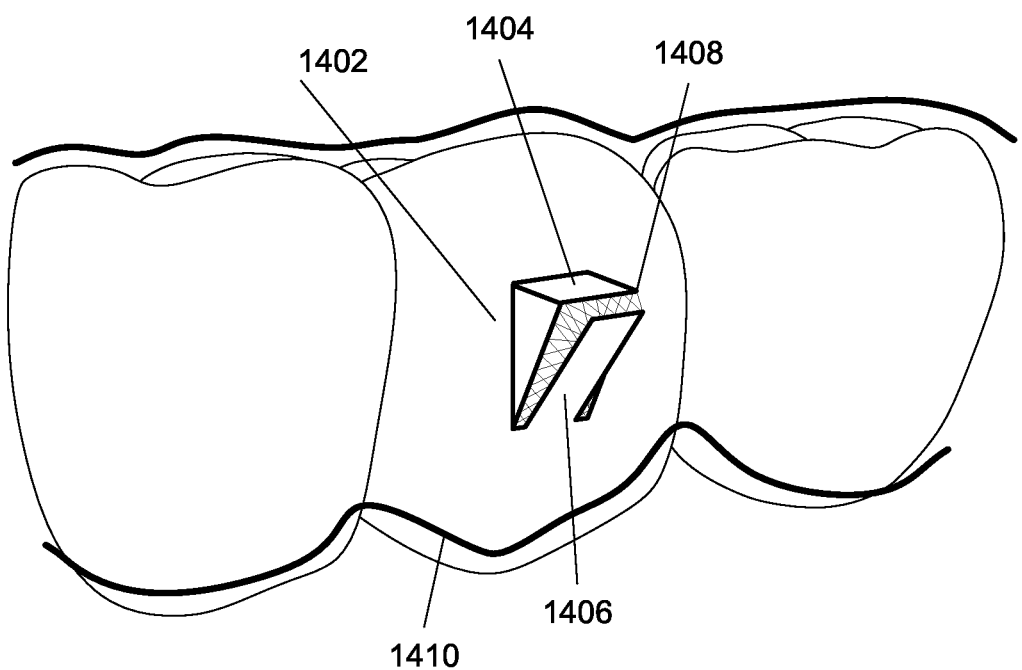
FIG. 14B illustrates the appliance of FIG. 14A when placed over the teeth.

FIG. 14A and FIG. 14B illustrate an orthodontic appliance 1400 configured to engage an attachment 1402, in accordance with many embodiments. Similar to the appliance 1200, the appliance 1400 includes a receptacle 1404 with an open lateral surface for accommodating the attachment 1402. The appliance 1400 includes a discontinuity that forms a flap 1406 positioned over the open lateral surface of the receptacle 1404. An elastic member 1408 of the appliance 1400 is configured as an elastic membrane or elastic mesh joining the edges of the flap 1406 to the corresponding edges of the lateral surface of the receptacle 1404. When the appliance 1400 is worn by the patient (as illustrated in FIG. 14B), the attachment 1404 protrudes through the lateral surface of the receptacle 1404, displacing the flap 1406. The resulting stretching of the elastic member 1408 generated by the displacement of the flap 1406 generates a tooth repositioning force that is applied to the tooth 1410 via the attachment 1404.

Figure 14C:
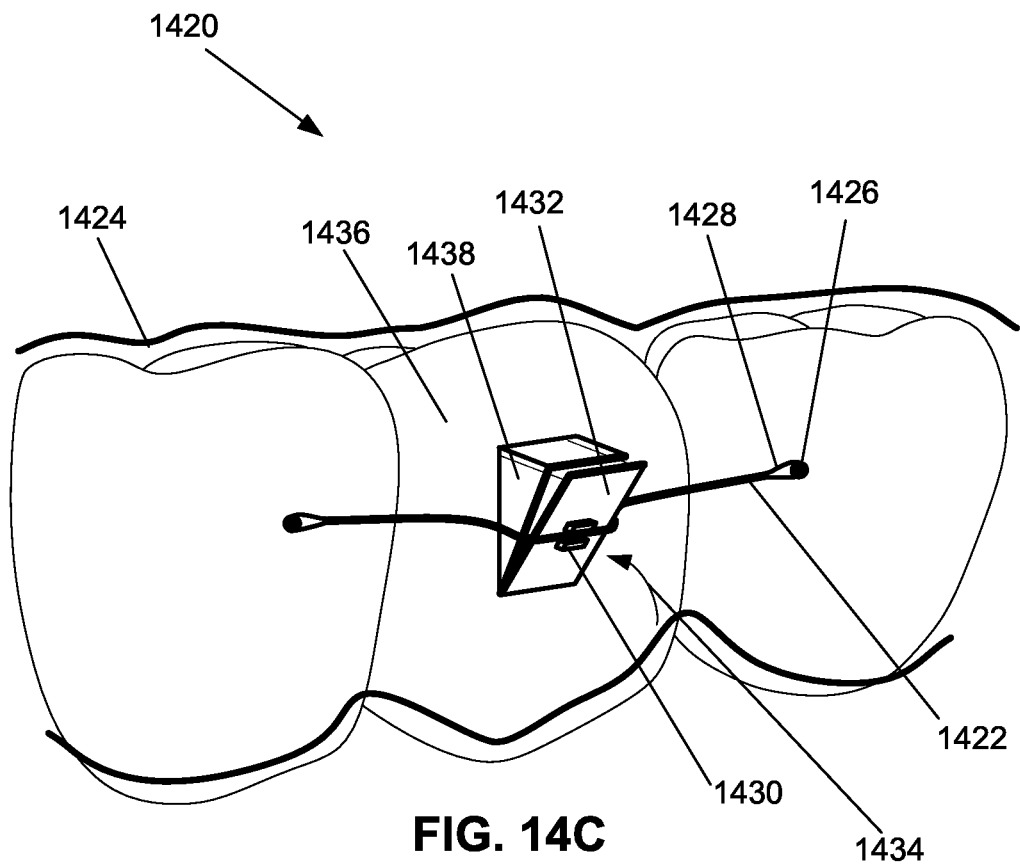
FIG. 14C illustrates an orthodontic appliance including features for securing an elastic member, in accordance with many embodiments.
Figure 14D:
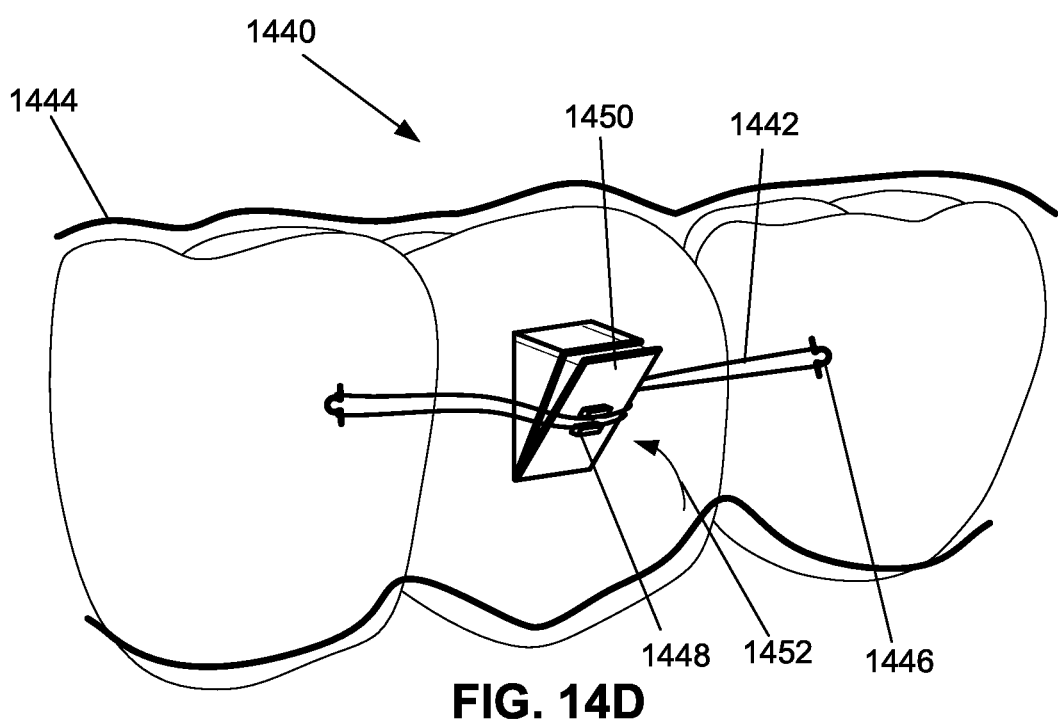
FIG. 14D illustrates another orthodontic appliance including features for securing an elastic member, in accordance with many embodiments.

FIG. 14C illustrates an orthodontic appliance 1420 including features for securing an elastic member 1422, in accordance with many embodiments. The appliance 1420 includes fastening features for coupling the elastic member 1422 to the shell 1424, exemplarily depicted herein as a pair of posts 1426. The elastic member 1422 can engage and be secured to the posts 1426 by loops 1428. The posts 1426 can be formed with the shell 1424, such that the elastic member 1422 is directly coupled to the shell 1424 by the posts 1426. The loops 1428 can be situated at any suitable portion of the elastic member 1422, such as at the ends. Furthermore, the appliance 1420 includes retention features for the elastic member 1422, depicted herein as a pair of tabs or protrusions 1430 situated on the flap 1432. As previously described, the retention features can secure the elastic member 1422 at a specified position relative to the shell 1424. For example, the protrusions 1430 can engage the elastic member 1422 to ensure that at least a portion of its length passes over the flap 1432, so that the appropriate force (see, e.g., arrow 1434) is exerted on the underlying tooth 1436 via the attachment 1438. FIG. 14D illustrates an orthodontic appliance 1440 including features for securing an elastic member 1442, in accordance with many embodiments. The elastic member 1442, depicted herein as an elastic loop, is coupled to the shell 1444 by hooks 1446 formed in the shell 1444. Similar to the appliance 1420, the appliance 1440 includes a pair of protrusions 1448 configured to retain the elastic member 1442 in a position spanning the flap 1450 to ensure that the desired force (see, e.g., arrow 1452) is applied.

Figures 15A, 15B, 15C:
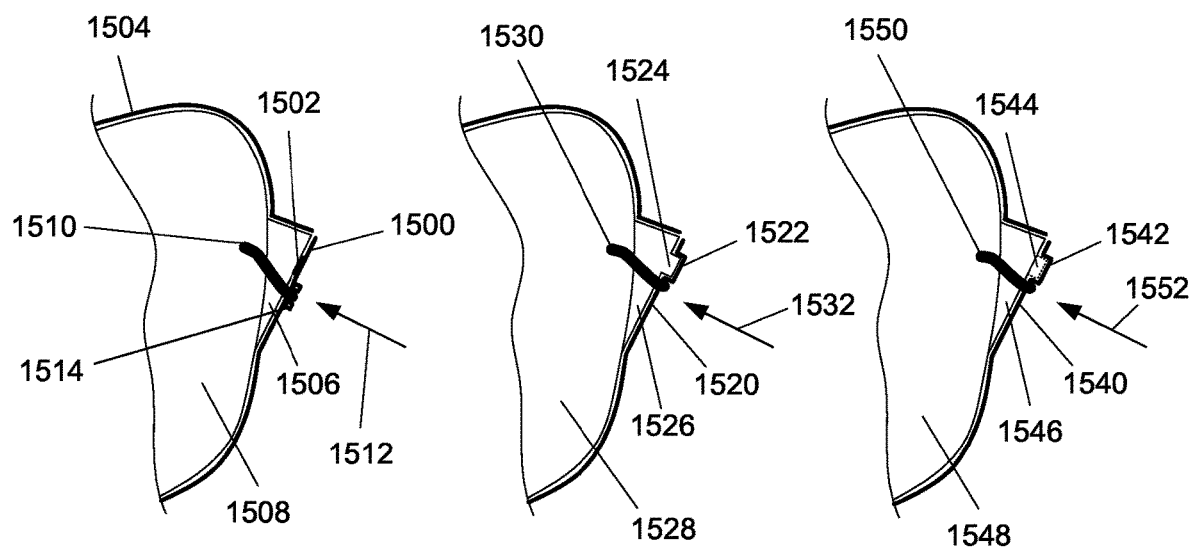
FIGS. 15A through 15D illustrate exemplary flap geometries for orthodontic appliances configured to engage an attachment, in accordance with many embodiments.
Figure 15D:
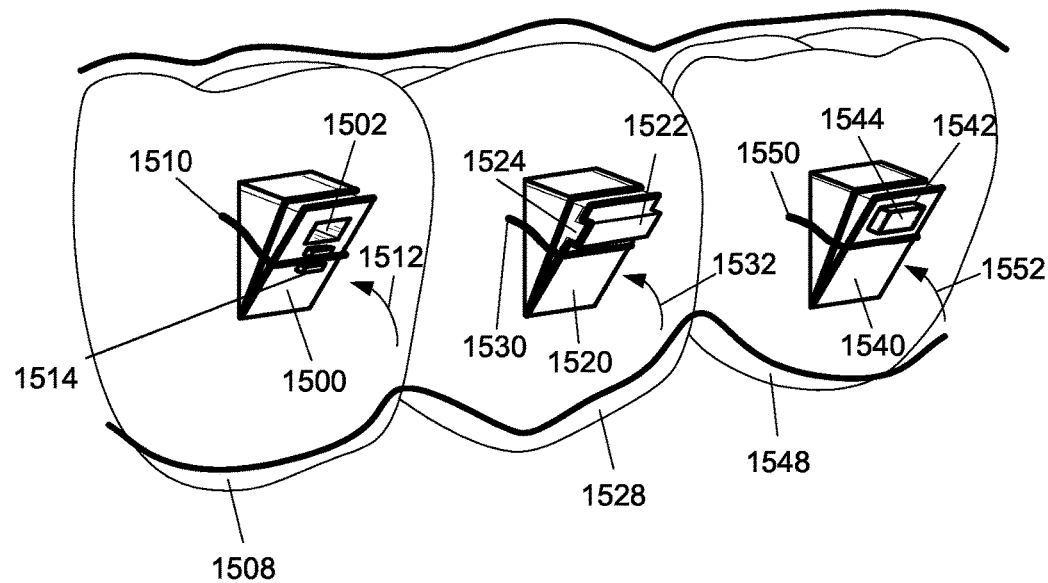

FIG. 15A through FIG. 15D illustrate example flap geometries for orthodontic appliances, in accordance with many embodiments. Similar to the embodiments discussed with respect to FIG. 11A through FIG. 14B, the flaps described herein can be formed via a discontinuity in a shell and positioned over an attachment. The flaps can include one or more features for engaging the attachment. For example, in FIG. 15A, a flap 1500 includes a protrusion 1502 extending towards the interior of a shell 1504 to contact an attachment 1506 mounted on a tooth 1508. The elastic member 1510 is held against the flap 1500 by retention features 1514 so that a repositioning force (see, e.g., arrow 1512) is applied to the attachment 1506 via the flap 1500. As another example, in FIG. 15B, a flap 1520 includes a relief 1522 shaped to accommodate a corresponding protrusion 1524 on an attachment 1526 of a tooth 1528. The ends of the elastic member 1530 can be positioned higher than the protrusion 1524, such that the middle portion of the elastic member 1530 engages the underside of the relief 1522 to apply a force (see, e.g., arrow 1532) to the attachment 1526 via the flap 1520. In a further example, in FIG. 15C, a flap 1540 includes an aperture 1542 into which a protrusion 1544 on an attachment 1546 of a tooth 1548 can extend. Similar to the elastic member 1530, the ends of the elastic member 1550 can be positioned such that the middle portion of the elastic member 1550 engages the protrusion 1544 of the attachment 1546, producing a corresponding force (see, e.g., arrow 1552) directly against the attachment 1546. Similar to other embodiments of flaps described herein, an appliance can include any suitable number and configuration of flaps. For example, as depicted in FIG. 15D, a single appliance can include a plurality of different flap geometries interacting with various types of attachments.

Figure 15E:
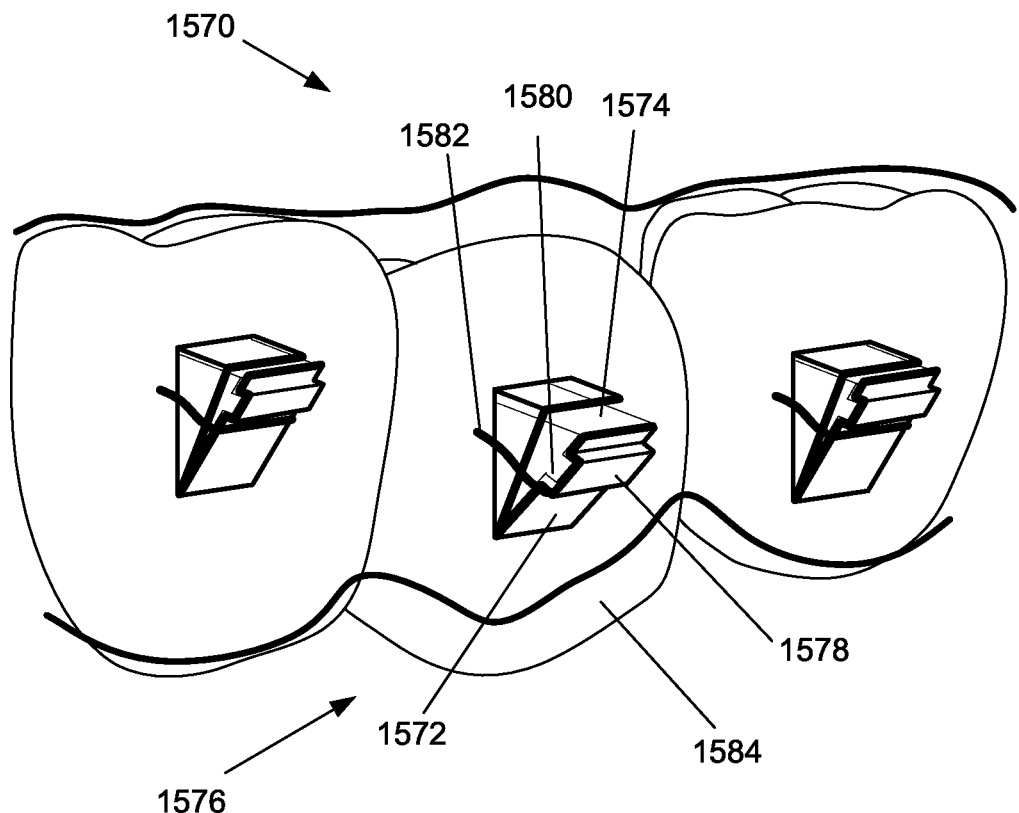
FIG. 15E illustrates an orthodontic appliance including a plurality of flaps for engaging a plurality of attachments on teeth, in accordance with many embodiments.
Figure 15F:
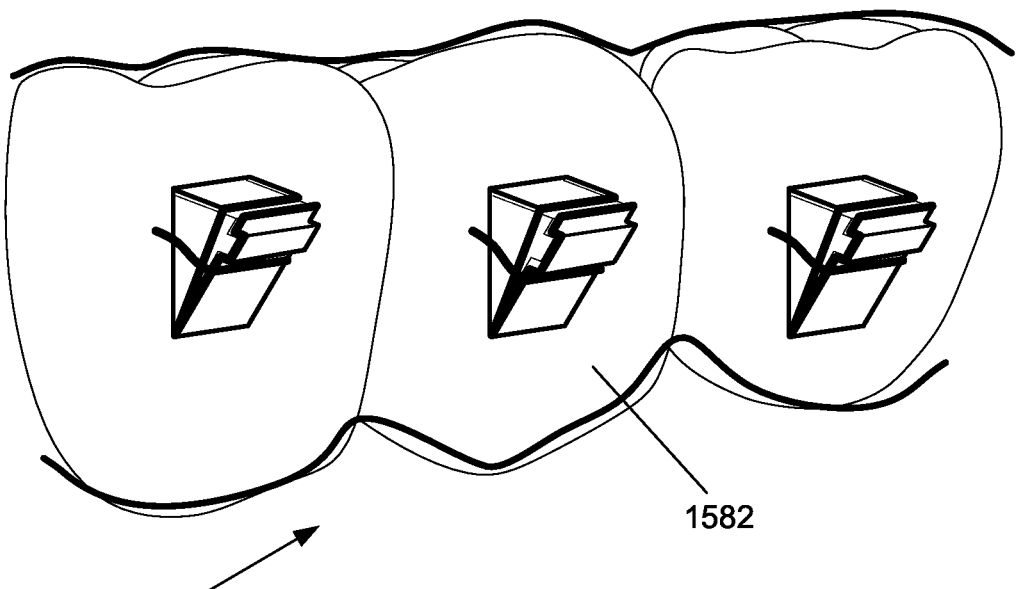
FIG. 15F illustrates the appliance of FIG. 15E after tooth repositioning has occurred.

FIG. 15E and FIG. 15F illustrate an orthodontic appliance 1570 including a plurality of flaps 1572 for engaging a plurality of attachments 1574 mounted on the teeth 1576. Each flap 1572 can include a relief 1578 shaped to accommodate a protrusion 1580 on the corresponding attachment 1574. In some instances, the protrusion 1580 is sized to fit tightly within the relief 1578 with little or no room for movement. Alternatively, the relief 1578 can be larger than the protrusion 1580, such that the relief 1578 includes sufficient space to accommodate movement of the protrusion 1580 within the relief 1578 (e.g., due to movement of the underlying tooth 1584). Each of the plurality of elastic members 1582 is angled upwards to pull against the relief 1578, thereby applying force on the attachment 1574 via the flap 1572. In many embodiments, the portion of the elastic member 1582 engaging the relief 1578 can be secured to the flap 1572 by adhesives, bonding, retention features, and the like. The configuration of the flaps, attachments, and elastics can be customized for each tooth, such that the applied force and/or resultant tooth movements vary per tooth. For example, the appliance 1570 can be configured to elicit an extrusive movement of the tooth 1584 relative to the other teeth. Similar to a conventional wire-bracket system, after the teeth 1576 have been repositioned (as illustrated in FIG. 15F), the attachments 1582 can be positioned collinearly (or approximately collinearly) with each other along a mesial-distal direction.

Although embodiments depicted in FIGS. 11 through 15 are shown as eliciting intrusive tooth movements, it shall be understood that the configurations presented herein can be modified as necessary in order to produce other types of tooth movements along different directions (e.g., occlusal-gingival, mesial-distal, buccal-lingual). Such modifications can involve changing an orientation, location, size, and/or shape of the various features provided herein. For example, referring again to FIGS. 11A and 11B, the orientation of the attachment 1102, receptacle 1104, and flap 1114 can be rotated by any amount (e.g., by 180°) to produce tooth movement in other directions (e.g., tooth extrusion instead of intrusion).

Figure 21A:
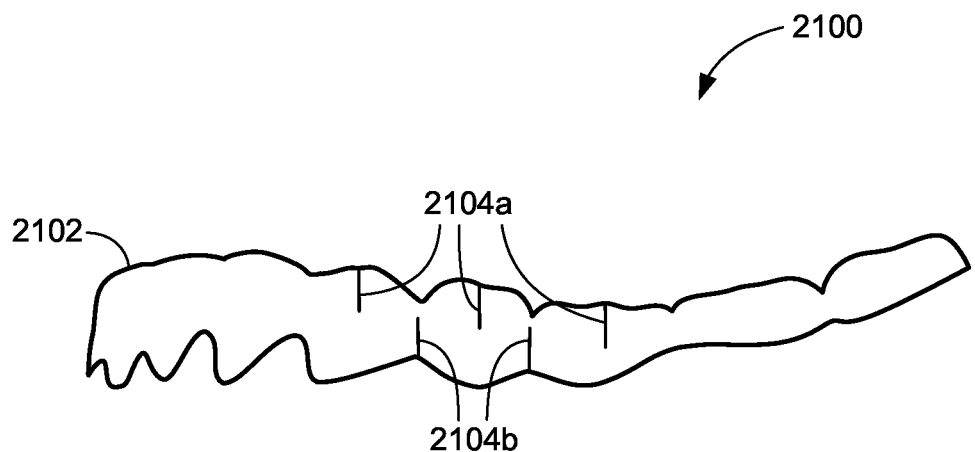
FIGS. 21A through 21F illustrate an orthodontic appliance with a plurality of discontinuities, in accordance with many embodiments.
Figure 21B:
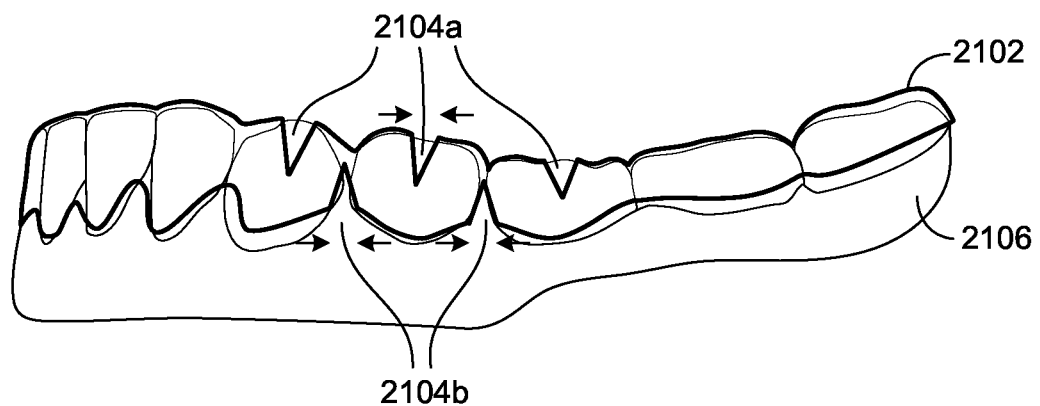
Figure 21C:
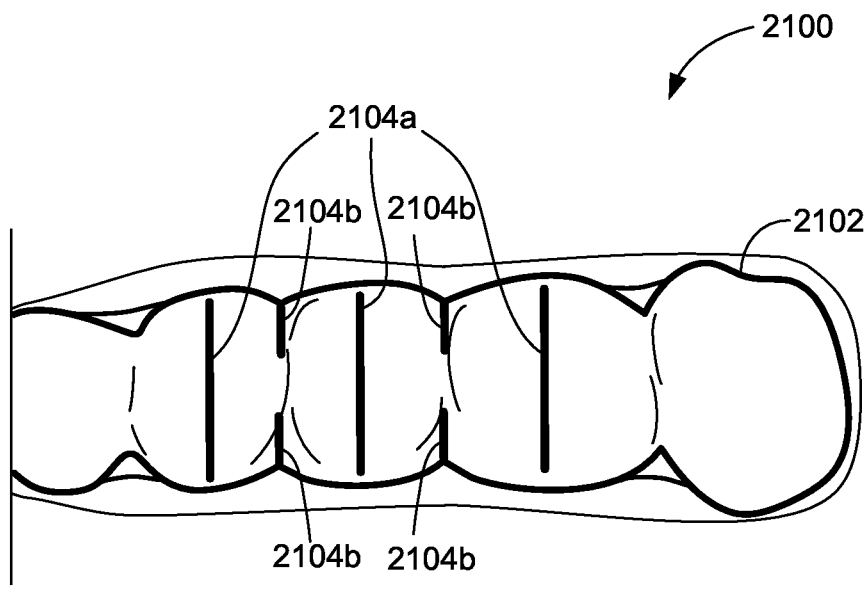
Figure 21D:
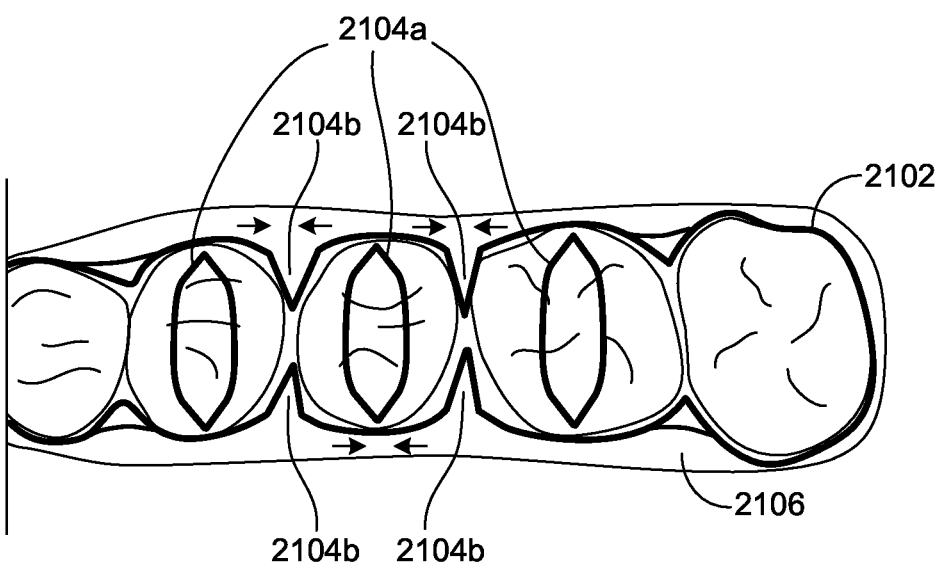
Figure 21E:
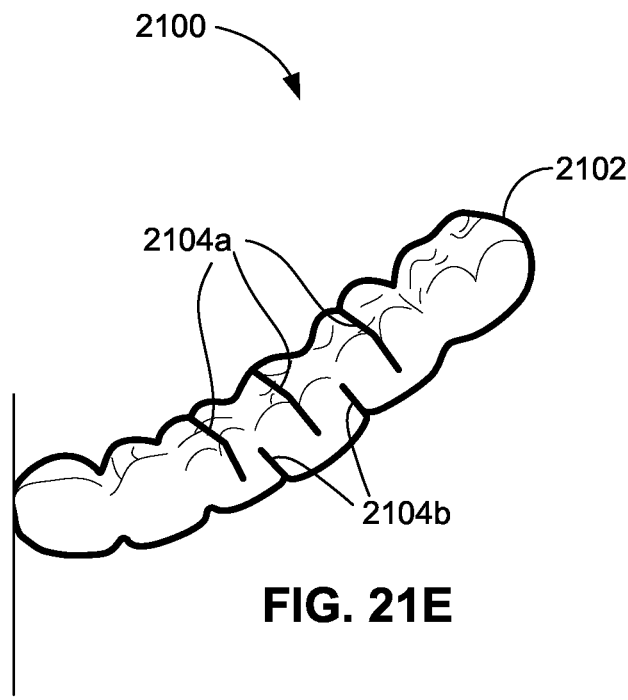
Figure 21F:
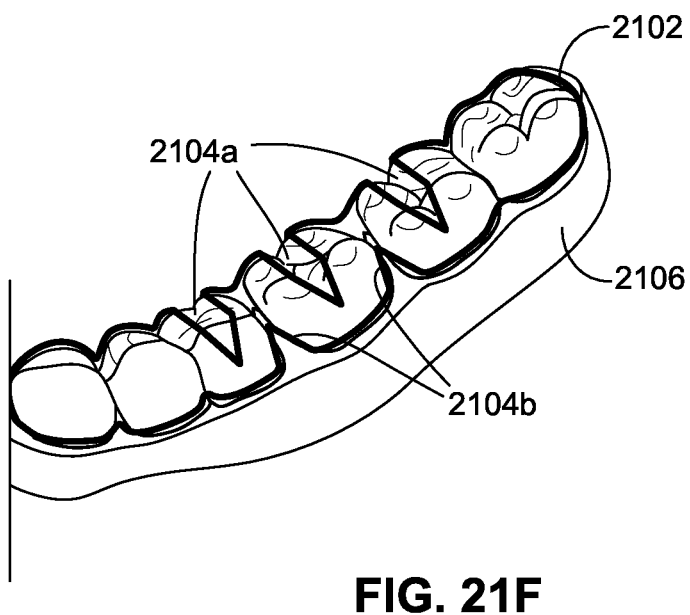

FIGS. 21A through 21F illustrate an orthodontic appliance 2100 with a plurality of discontinuities, in accordance with many embodiments. FIGS. 21A and 21B depict a side view, FIGS. 21C and 21D depict a top view, and FIGS. 21E and 21F depict a perspective view. The appliance 2100 includes a shell 2102 with a first plurality of elongate cuts 2104a and a second plurality of elongate cuts 2104b. The cuts 2104a, 2104b can be substantially parallel to each other. In many embodiments, the cuts 2104a are located primarily on the occlusal surfaces of the appliance 2100 and the cuts 2104b are located primarily on the lingual or buccal surfaces of the appliance 2100. Optionally, some portions of the cuts 2104a and/or 2104b can also extend to other surfaces of the appliance 2100, e.g., some portions of each cut 2104a can extend to the buccal and/or lingual surfaces and portions of each cut 2104b can extend to the occlusal surface. The positioning of the cuts 2104a, 2104b relative to the teeth 2106 received by the shell 2102 can be varied as desired. In the depicted embodiments, the cuts 2104a are located adjacent to occlusal regions of the teeth 2106 while the cuts 2104b are located adjacent to interproximal regions of the teeth 2106. The cuts 2104a can be interspersed with the cuts 2104b along the mesial-distal axis of the appliance 2100, so as to form an expandable "accordion" configuration that allows for mesial-distal elongation of the shell 2102 when placed on the teeth 2106 (depicted in FIGS. 21B, 21D, and 21F). The deformation of the cuts 2104a, 2104b when worn over the teeth 2106 can produce forces (e.g., opposing pairs of mesial-distal forces indicated by arrows) to elicit tooth movements that reduce spaces between teeth. Although FIGS. 21A through 21F depict an appliance 2100 without any elastic members, it shall be understood that alternative embodiments can include one or more elastic members that interact with the cuts 2104a and/or 2104b (e.g., spanning the cuts 2104a and/or 2104b) as previously described herein in order to modulate the forces applied to the teeth 2106.

In many embodiments, the directionality of an elastic member influences the directionality of the resultant forces applied to teeth. For example, in embodiments where the elastic member is elongate (e.g., a band or strip) the forces exerted by the elastic member onto the appliance and/or underlying teeth may be aligned with (e.g., substantially parallel to) the length of the elastic member. Moreover, the directionality of the elastic member relative to a discontinuity can influence the forces applied to teeth via the interaction of the elastic member and discontinuity. The directionality of an elastic member can be varied as desired in order to influence the direction of tooth movement, as well as control the portion(s) of teeth the force is exerted upon. For instance, in some instances it may be desirable to apply forces closer to the crown tip of a tooth (e.g., to produce tipping), while in other instances it may be desirable to apply forces closer to the root center of a tooth (e.g., to avoid tipping).

Figure 22A:
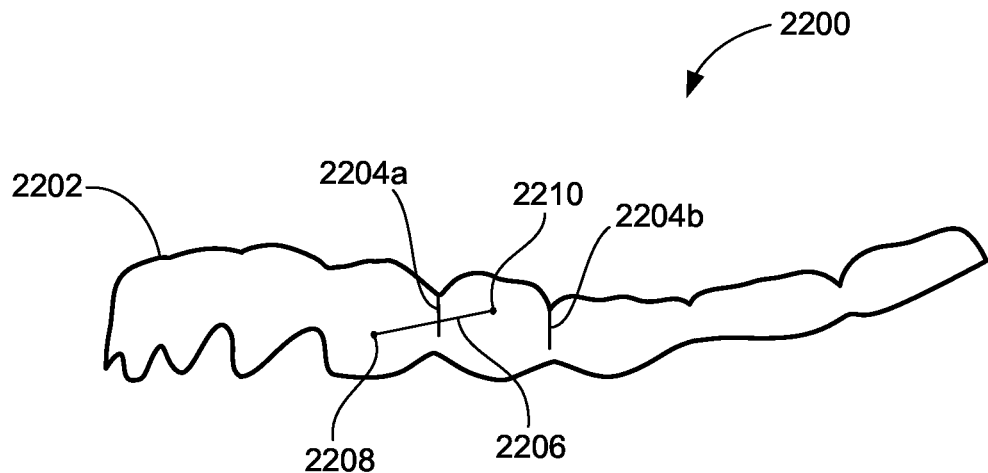
FIGS. 22A through 22D illustrate directionality of an elastic member influencing the forces applied to teeth, in accordance with many embodiments.
Figure 22B:
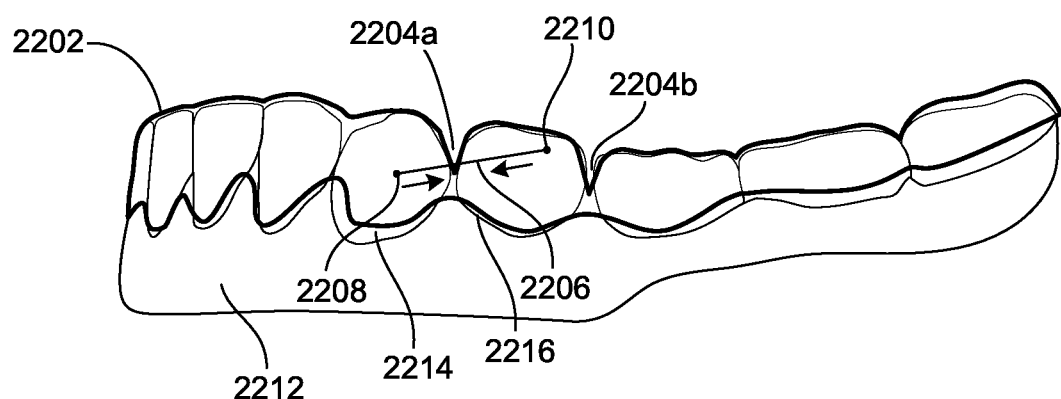

FIGS. 22A through 22D illustrate directionality of an elastic member influencing the forces applied to teeth, in accordance with many embodiments. An appliance 2200 includes a shell 2202 and at least one discontinuity 2204a-b formed in the shell 2202, depicted herein as elongate cuts spanning at least the occlusal and buccal surfaces of the appliance 2200. An elastic member 2206, depicted herein as an elongate band, is coupled to the buccal surface of the shell 2202 in a position spanning the discontinuity 2204a. In the embodiment of FIGS. 22A and 22B, the elastic member 2206 includes a mesial end 2208 that that is closer to the gingival edge of the shell 2202 and a distal end 2210 that is closer to the occlusal surface of the shell 2202, such that the length of elastic member 2206 is at an angle relative to the mesial-distal axis of the shell 2202 (e.g., is not parallel to the mesial-distal axis). The elastic member 2206 can be arranged such that the length of the elastic member 2206 is non-orthogonal to the length of the discontinuity 2204. Accordingly, when the appliance 2200 is placed on a patient's teeth 2212, the forces exerted on the teeth 2212 (indicated by arrows) are applied closer to the root center of tooth 2214 and closer to the crown tip of tooth 2216.

Figure 22C:
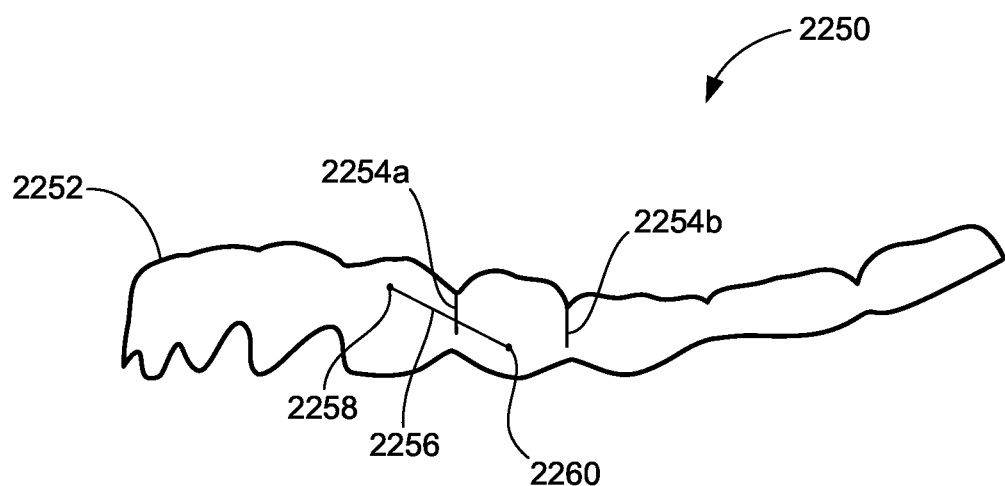
Figure 22D:
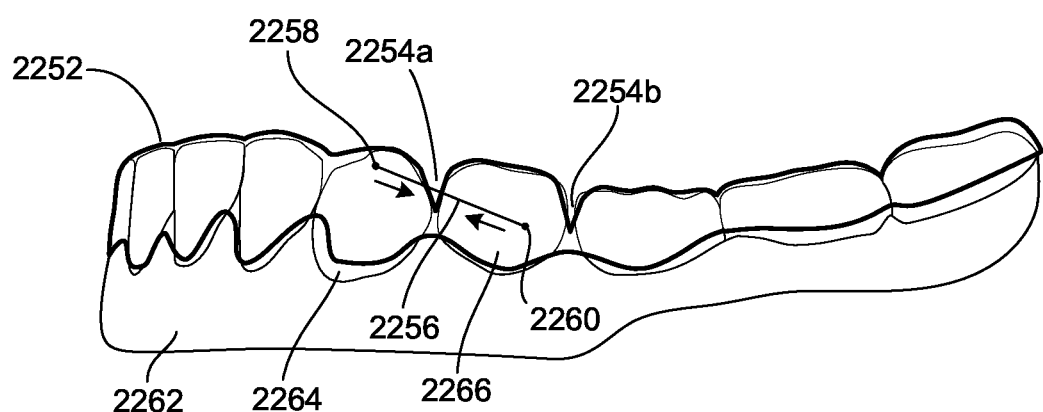

FIGS. 22C and 22D illustrate an orthodontic appliance 2250 having a shell 2252, discontinuities 2254a-b formed in the shell, and an elastic member 2256 spanning the discontinuity 2254a. The components of the appliance 2250 are substantially similar to those of the appliance 2200, except that the mesial end 2258 of the elastic member 2256 is closer to the occlusal surface of the shell 2252 while the distal end 2260 is closer to the gingival edge. Accordingly, when the appliance 2250 is placed over the teeth 2262, the resultant forces (indicated by arrows) are applied closer the crown tip of tooth 2264 and closer to the root center of tooth 2266.

In many embodiments, two or more elastic members can be used in conjunction with each other to apply a plurality of forces having different magnitudes and/or directions. For example, a pair of elastic members coupled to opposite sides of a shell can be used to produce a force couple to elicit tooth rotation. The use of multiple elastic members can allow for the generation of more complex force systems to improve control over tooth movement and/or produce more complicated tooth movements.

Figure 23A:
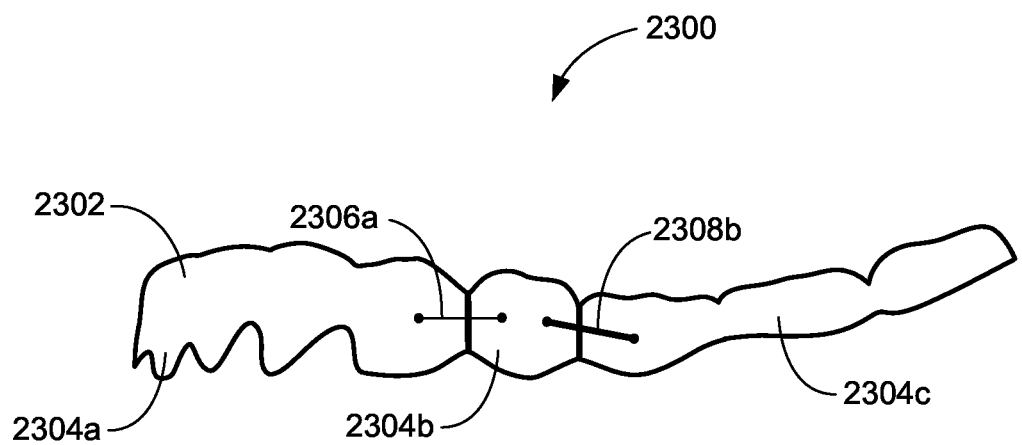
FIGS. 23A through 23D illustrate an orthodontic appliance configured to produce tooth rotation, in accordance with many embodiments.
Figure 23B:
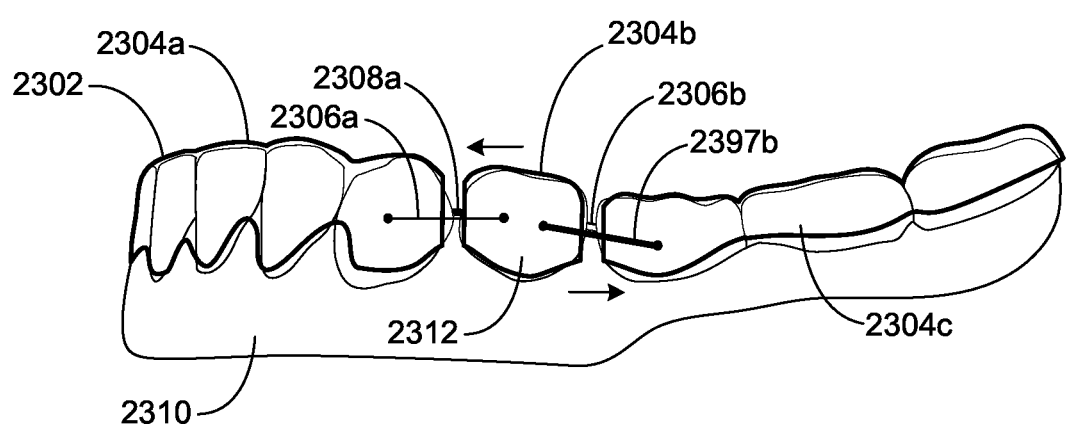
Figure 23C:
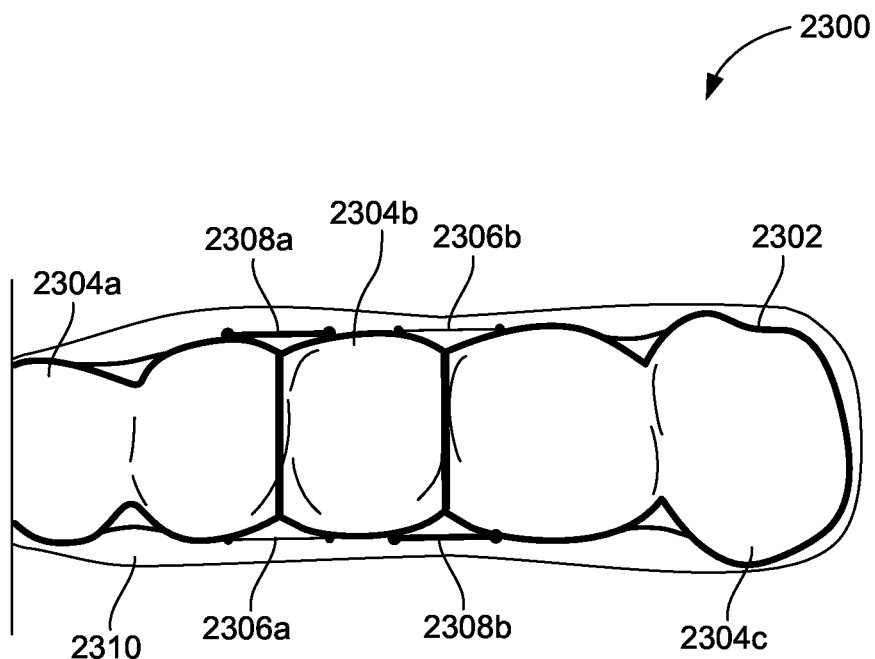
Figure 23D:
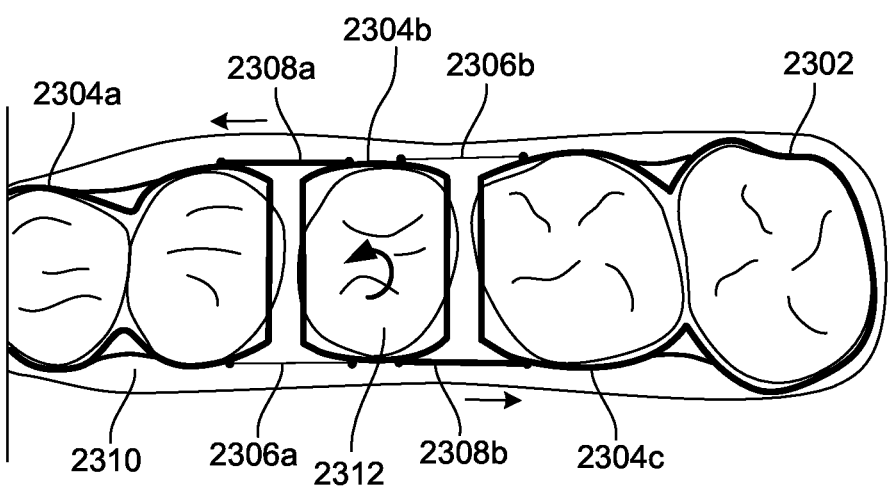
Figure 24A:
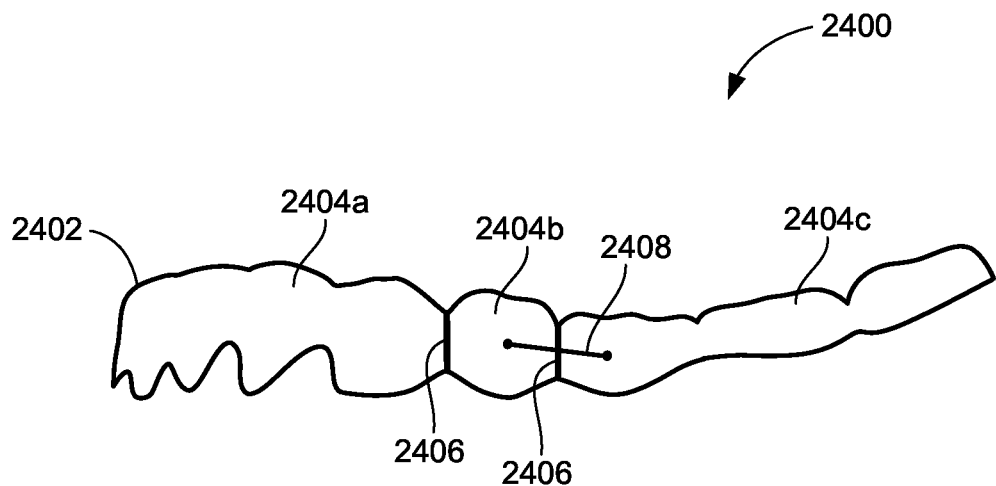
FIGS. 24A through 24D illustrate an orthodontic appliance configured to produce tooth rotation, in accordance with many embodiments.
Figure 24B:
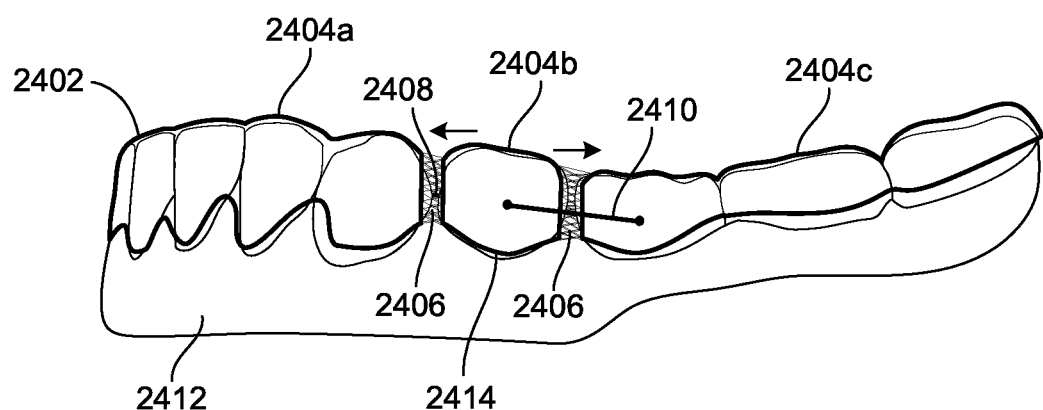
Figure 24C:
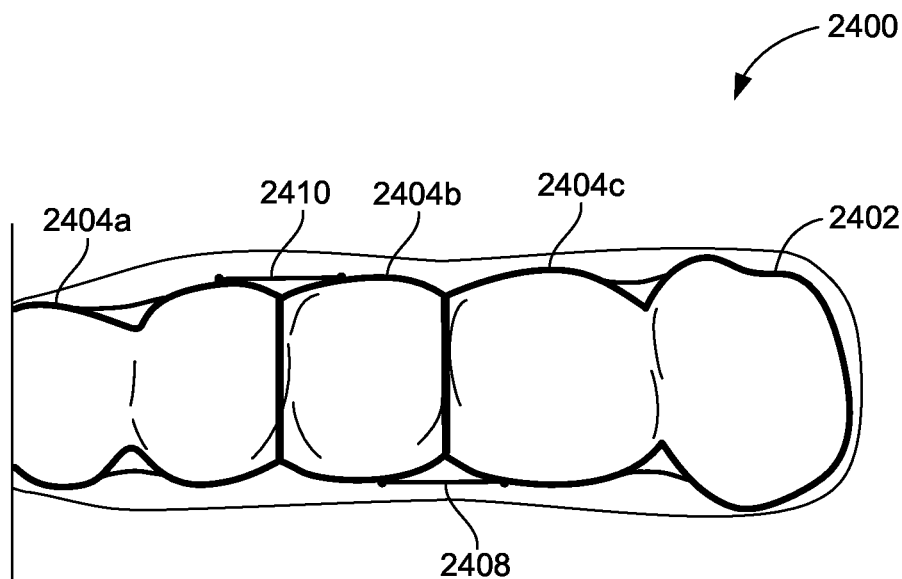
Figure 24D:
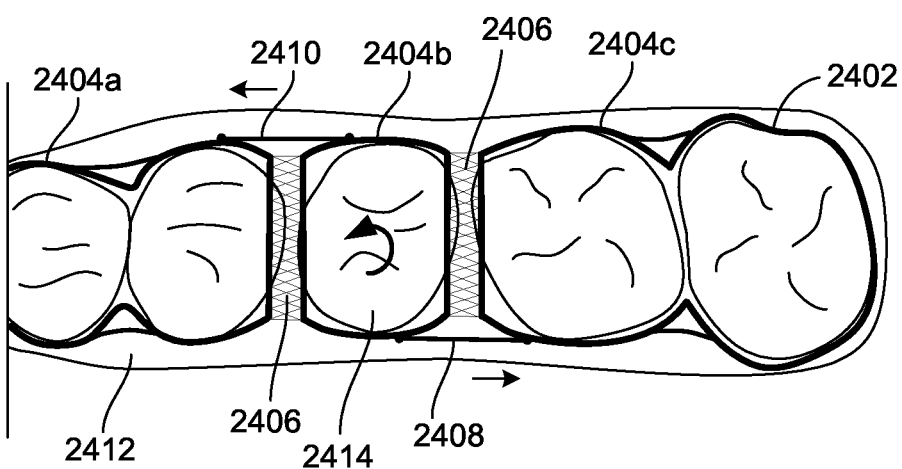

FIGS. 23A through 23D illustrate an orthodontic appliance 2300 configured to produce tooth rotation, in accordance with many embodiments. The appliance 2300 includes a shell 2302 that is separated into a plurality of discrete segments 2304a-c. The segments 2304a-c can be joined to each other by a first pair of elastic members 2306a-b and a second pair of elastic members 2308a-b, thereby forming a single appliance in which the segments 2304a-c can move relative to each other. In many embodiments, the segment 2304a is coupled to the segment 2304b by elastic members 2306a, 2308a and the segment 2304b is coupled to the segment 2304c by elastic members 2306b, 2308b. The properties (e.g., stiffness, thickness, material type, etc.) of the elastic members 2306a-b can differ from the properties of the elastic members 2308a-b. For example, the stiffnesses (elastic moduli) of the elastic members 2306a-b can be less than the stiffnesses (elastic moduli) of the elastic members 2308a-b. Accordingly, when the appliance 2300 is worn on the patient's teeth 2310 (as depicted in FIGS. 23B, 23D), the forces applied to the teeth by the elastic members 2308a-b can be greater in magnitude than the forces applied by the elastic members 2306a-b. In many embodiments, the difference in force magnitudes applied by the respective pairs of elastic members results in application of a force couple on the tooth 2312, thereby eliciting rotation of the tooth 2312.

FIGS. 24A through 24D illustrate an orthodontic appliance 2400 configured to produce tooth rotation, in accordance with many embodiments. Similar to the appliance 2300, the appliance 2400 includes a shell 2402 that is separated into discrete segments 2404a-c. The segments 2404a-c are joined by a first elastic member 2406, depicted herein as a mesh or sheet, in order to form a single appliance 2400 and permit relative movement of the segments 2404a-c. Additionally, the appliance 2400 includes a second elastic member 2408 coupled to a first side of the appliance 2400 (e.g., a buccal surface) and a third elastic member 2410 coupled to a second, opposing side of the appliance 2400 (e.g., a lingual surface). The second and third elastic members 2406, 2408 can be arranged such that when the appliance 2400 is placed on the teeth 2412, the second and third elastic members 2406, 2408 apply a force couple onto the tooth 2414, thereby eliciting rotation of the tooth 2414.

In order to improve control over the deformation of an orthodontic appliance (e.g., when worn by a patient), biasing features such as perforations, grooves, parallel lines, engraved shapes, and the like can be formed in the shell in order to define specific locations where desired deformations (e.g., bending, flexing, stretching, compression) should occur. The biasing features may penetrate only partially through the thickness of the shell (e.g., a groove) or may penetrate through the entire thickness (e.g., a cut or aperture). Such features can increase the local compliance of the shell to reduce its resistance to deformation at the specified locations and cause it to preferentially deform at those locations when appropriate forces are applied. In many embodiments, one or more biasing features are used in combination with one or more discontinuities (e.g., flaps, cuts, apertures, etc.) in order to modulate the deformation of the discontinuity when the appliance is placed on patient's teeth. For example, a perforated or engraved line can be used to define a hinge for a flap formed in an appliance. As another example, a plurality of parallel perforated or engraved lines can be used to define a compliant region in the shell that accommodates deformations of the shell (e.g., as force is applied by an elastic member).

Figure 26A:
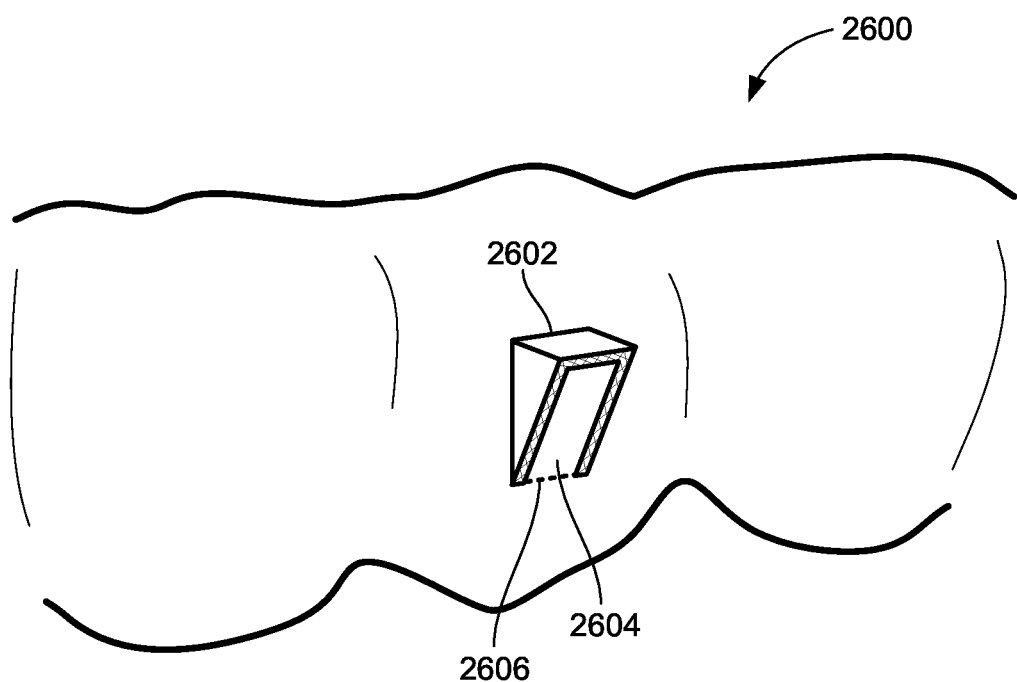
FIGS. 26A through 26D illustrate orthodontic appliances with biasing features, in accordance with many embodiments.
Figure 26B:
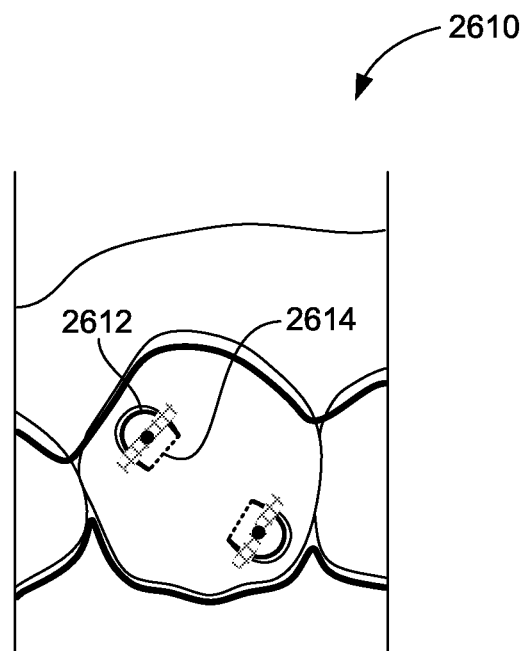
Figure 26C:
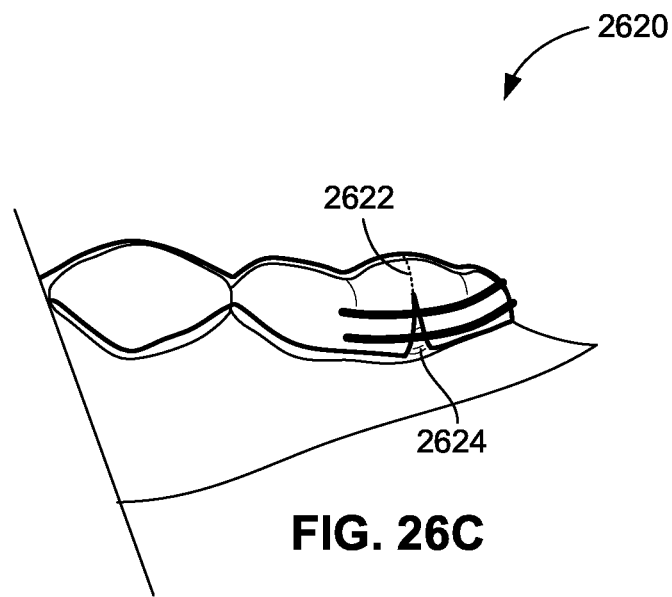
Figure 26D:
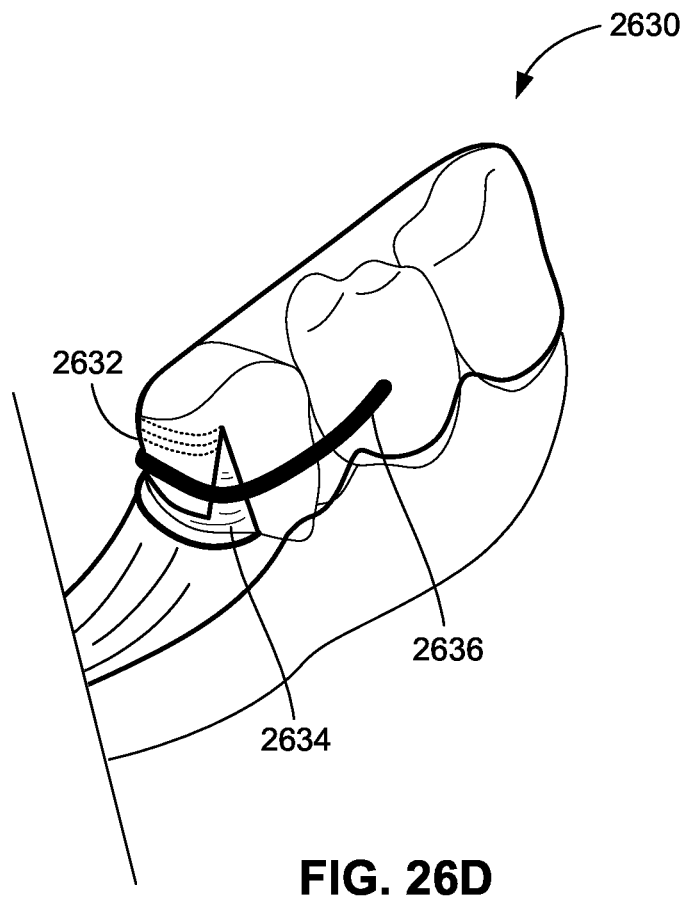

FIGS. 26A through 26D illustrate orthodontic appliances with biasing features, in accordance with many embodiments. Although the biasing features are depicted herein as perforated lines, it shall be understood that various alternative embodiments provided herein of biasing features can also be used. FIG. 26A illustrates an orthodontic appliance 2600 having a receptacle 2602 and a flap 2604. A biasing feature 2606 is formed at the hinge of the flap 2604 in order to ensure that the flap 2604 will preferentially bend at that location. Similarly, FIG. 26B illustrates an orthodontic appliance 2610 having a pair of flaps 2612, with a respective biasing feature 2614 defining the hinge of each flap 2612. FIG. 26C illustrates an appliance 2620 in which a biasing feature 2622 contacts and extends from one end of a discontinuity 2624 (depicted herein as a cut). The biasing feature 2622 can be aligned with the length of the discontinuity 2624 so as to facilitate deformation of the discontinuity 2624 (e.g., widening) when the appliance 2620 is placed on teeth. FIG. 26D illustrates an orthodontic appliance 2630 in which a plurality of biasing features 2632 are used to define a region of increased compliance near a discontinuity 2634 (depicted herein as an aperture). Accordingly, when the elastic member 2636 applies force to the appliance near the discontinuity 2634, the appliance 2630 can preferentially bend at the region of increased compliance in order to apply forces to the tooth, rather than at other locations where force application is not desired.

The various embodiments of the orthodontic appliances presented herein can be fabricated in a wide variety of ways. The configuration of an orthodontic appliance can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances.

Figure 27:
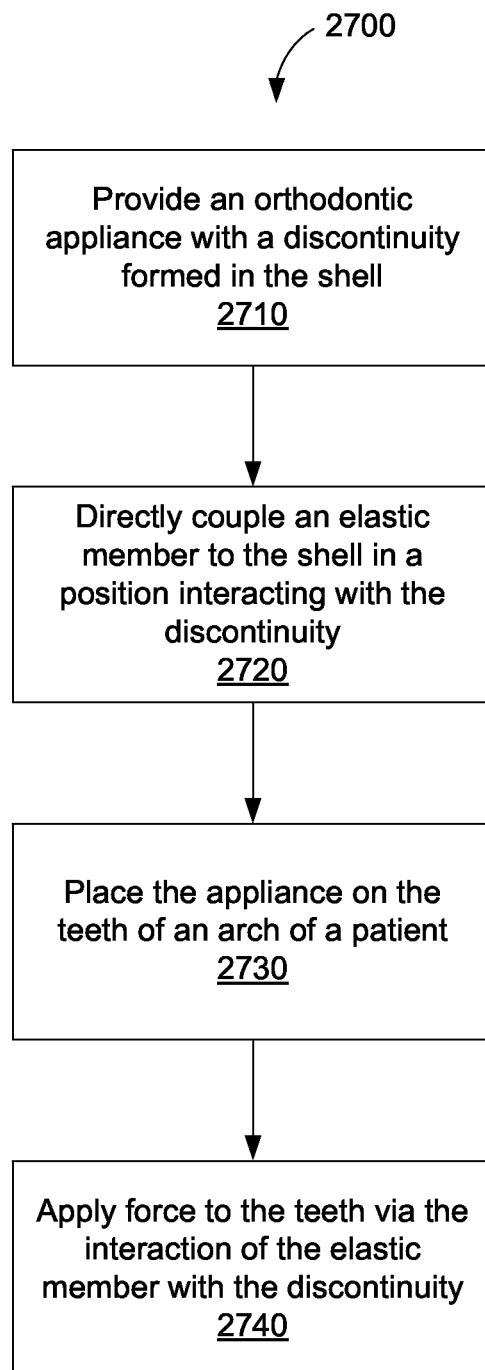
FIG. 27 is a schematic illustration by way of block diagram of a method for orthodontic treatment, in accordance with many embodiments.

FIG. 27 is a schematic illustration by way of block diagram of a method 2700 for orthodontic treatment, in accordance with many embodiments. The method 2700 can be applied to reposition one or more of a patient's teeth, maintain one or more of a patient's teeth in a current configuration, or suitable combinations thereof. The method 2700 can be practiced using any suitable orthodontic appliance, such as suitable orthodontic appliances described herein.

In step 2710, an orthodontic appliance with a discontinuity formed in the shell is provided. The discontinuity can include any embodiments of the various types of discontinuities described herein. In many embodiments, the discontinuity can be formed in the shell (e.g., by cutting, removal of material, deforming a portion of the shell, etc.) after the shell has been fabricated. Alternatively, the discontinuity can be formed simultaneously with the fabrication of the shell.

In step 2720, an elastic member is directly coupled to the shell in a position interacting with the discontinuity. Any embodiment of the elastic members described herein can be combined with any suitable discontinuity. As previously mentioned, the elastic member can be directly coupled to the shell without the use of intervening attachment elements (e.g., fasteners provided separately and coupled to the shell, such as hooks, screws, nails, pins, etc.). The coupling of the elastic member can be performed by an orthodontic practitioner prior to applying the appliance to the teeth. Alternatively, the coupling can be performed by a manufacturer of the appliance, such that the appliance is provided to the practitioner with the coupled elastic member. In many embodiments, the step 2720 is optional, such as where the orthodontic appliance is already provided with the coupled elastic member.

In step 2730, the appliance is placed on the teeth of an arch of the patient. In many embodiments, the appliance is designed to receive teeth from a single dental arch. One or more of the teeth can be coupled to a previously mounted attachment (e.g., FIG. 11A through FIG. 15D). Alternatively, the appliance can be placed on teeth without any attachments. As previously described herein, placement of the appliance can involve deformation of one or more of the shell, the discontinuity, and the elastic member in order to accommodate the teeth. In some instances, the discontinuity and/or a portion of shell near the discontinuity is displaced when the appliance is worn. For example, the discontinuity can form a flap (e.g., FIGS. 11-19) that is pushed outwards when the appliance is placed on the teeth. As another example, where the appliance includes separate shell segments (e.g., FIG. 8 and FIG. 10), the segments can be moved relative to each other when the appliance is placed on teeth. In some instances, the step 2730 can be performed prior to the step 2720, such that the appliance is placed on the teeth before the elastic member is coupled to the shell.

In step 2740, force is applied to the teeth via the interaction of the elastic member with the discontinuity. As described elsewhere herein, the elastic member can exert a continual force on the shell, and this force can be transmitted via the shell to the underlying teeth. In many embodiments, the force is applied to the teeth via an attachment mounted on one or more of the teeth (e.g., FIGS. 11-15). The applied force can result in repositioning of one or more teeth, as previously described herein. Alternatively, the force can be applied to maintain a current arrangement of the teeth, such that no tooth movements occur.

Figure 28:
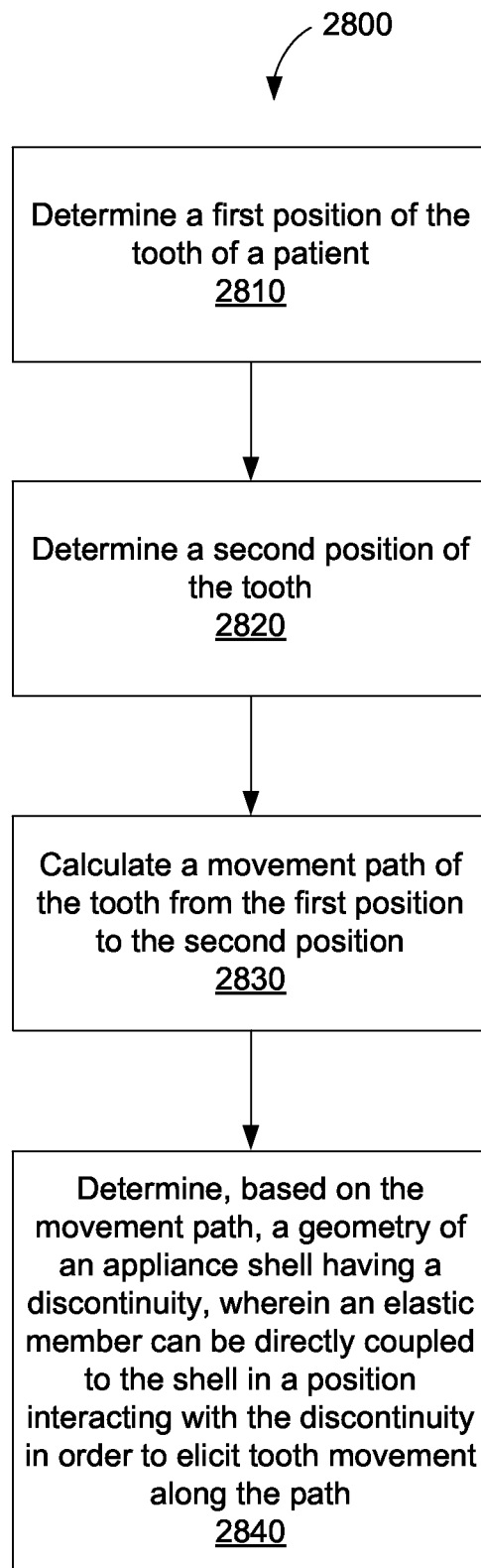
FIG. 28 is a schematic illustration by way of block diagram of a method for designing an orthodontic appliance, in accordance with many embodiments.

FIG. 28 is a schematic illustration by way of block diagram of a method 2800 for designing an orthodontic appliance, in accordance with many embodiments of the present invention. The steps of the method 2800 can be performed by a suitable system, such as the data processing system described elsewhere herein.

In step 2810, a first position of a tooth of a patient is determined. The first position can be, for example an initial position of the tooth (e.g., the current position of the tooth within the patient's arch). The position can be determined based on measurement data of the current tooth arrangement of the patient, such as measurement data obtained by scanning of the patient's teeth or a model of the patient's teeth. The measurement data can be used to generate a digital representation (e.g., a digital model) of the dentition, from which the first position of the tooth can be determined.

In step 2820, a second position of the tooth is determined. In many embodiments, the second position represents an intermediate or final position of the tooth after orthodontic treatment (e.g., repositioning) has occurred. The second position can, for instance, be selected based on an intermediate or final tooth arrangement specified by an orthodontic practitioner for correcting one or more malocclusions.

In step 2830, a movement path of the tooth from the first position to the second position is calculated. In many embodiments, the movement path is calculated using one or more suitable computer programs, which can take digital representations of the first and second positions as input, and provide a digital representation of the movement path as output. The movement path may also be calculated based on the positions and/or movement paths of other teeth in the patient's dentition, and such information can also be provided as digital representations. For example, the movement path can be optimized based on minimizing the total distance moved, preventing collisions with other teeth, avoiding tooth movements that are more difficult to achieve, or any other suitable criteria. In some instances, the movement path can be provided as a series of incremental tooth movements that, when performed in sequence, result in repositioning of the tooth from the first position to the second position.

In step 2840, geometry of an appliance shell having a discontinuity is determined based on the movement path, such that an elastic member can be directly coupled to the shell in a position interacting with the discontinuity in order to elicit tooth movement along the movement path. The geometry can be determined by one or more suitable computer programs, such as a computer program configured to accept a digital representation of the movement path as input and provide a digital representation of the shell, discontinuity, and/or elastic member geometry as output (e.g., as digital models). In some instances, the output can be provided to a manufacturing system in order to fabricate a physical model of the shell with the discontinuity, such as a suitable computer-aided manufacturing system.

The geometry of the shell, discontinuity, and elastic member can be configured in any manner suitable for generating the tooth movement, such as any of the embodiments described herein. In many embodiments, one or more portions of the shell (e.g., tooth receiving cavities of the shell) can be adapted to include a suitable amount of additional space to accommodate the tooth movement, as previously described herein. In some instances, the step 2840 can further include calculating the geometry of an attachment to be coupled to the tooth, such that the elastic member interacts with the attachment to effect movement of the underlying tooth.

Figure 29:
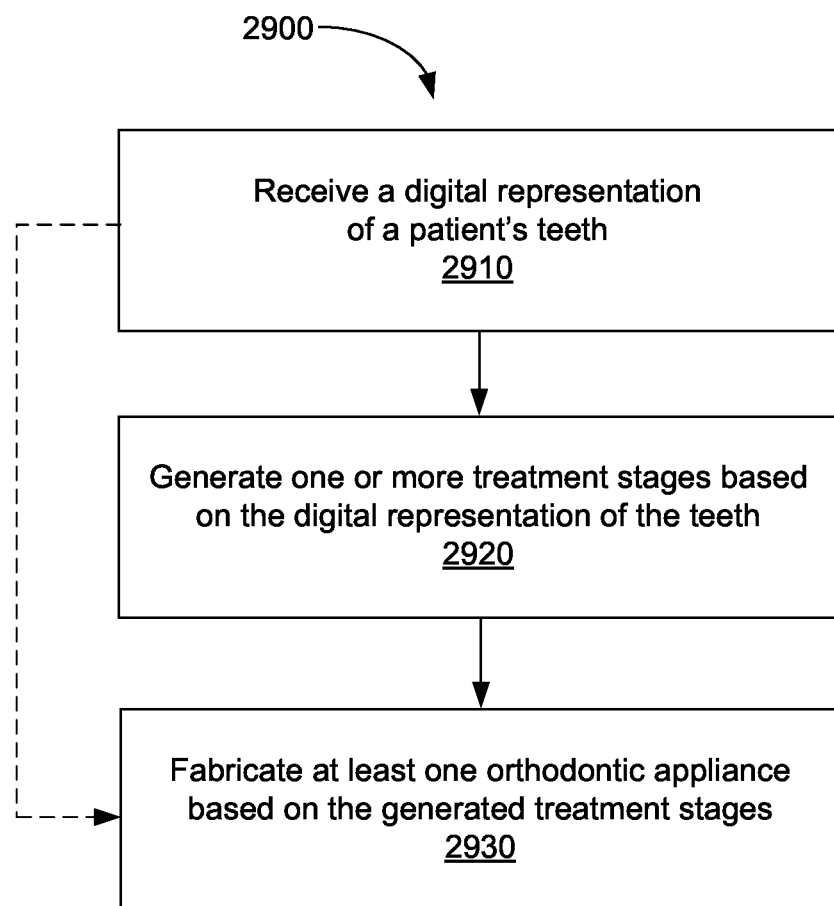
FIG. 29 illustrates a method for digitally planning an orthodontic treatment, in accordance with many embodiments.

FIG. 29 illustrates a method 2900 for digitally planning an orthodontic treatment and/or design or fabrication of an appliance, in accordance with many embodiments. The method 2900 can be applied to any of the treatment procedures described herein and can be performed by any suitable data processing system.

In step 2910, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 2920, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 2930, at least one orthodontic appliance is fabricated based on the generated treatment stages. For example, a set of appliances can be fabricated, each shaped to accommodate a tooth arrangement specified by one of the treatment stages, such that the appliances can be sequentially worn by the patient to incrementally reposition the teeth from the initial arrangement to the target arrangement. The appliance set may include one or more orthodontic appliances having a at least one discontinuity and/or at least one elastic member described herein. The configuration of the discontinuities and/or elastic members of such appliances (e.g., number, geometry, configuration, material characteristics) can be selected to elicit the tooth movements specified by the corresponding treatment stage. At least some of these properties can be determined via suitable computer software or other digital-based approaches. The fabrication of the appliance may involve creating a digital model of the appliance to be used as input to a computer-controlled fabrication system.

In some instances, staging of various arrangements or treatment stages may not be necessary for design and/or fabrication of an appliance. As illustrated by the dashed line in FIG. 29, design and/or fabrication of an orthodontic appliance, and perhaps a particular orthodontic treatment, may include use of a representation of the patient's teeth (e.g., receive a digital representation of the patient's teeth 2910), followed by design and/or fabrication of an orthodontic appliance based on a representation of the patient's teeth in the arrangement represented by the received representation. For example, a shell may be generated based on the representation of the patient's teeth (e.g., as in step 2910), followed by forming of discontinuities and/or application of elastic members to generate an appliance described in various embodiments herein.

Figure 30:
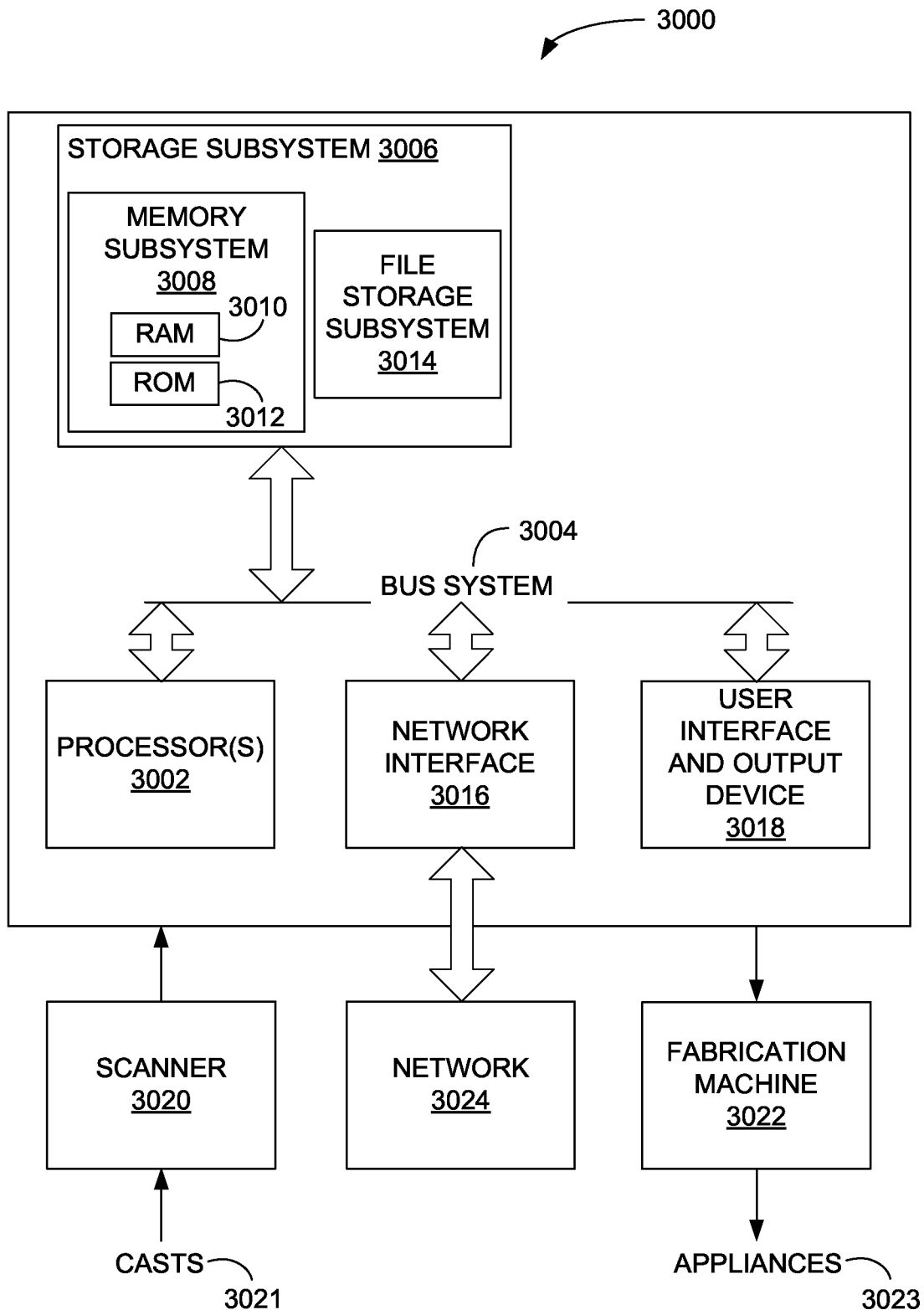
FIG. 30 is a simplified block diagram of a data processing system, in accordance with many embodiments.

FIG. 30 is a simplified block diagram of a data processing system 3000 that may be used in executing methods and processes described herein. The data processing system 3000 typically includes at least one processor 3002 that communicates with one or more peripheral devices via bus subsystem 3004. These peripheral devices typically include a storage subsystem 3006 (memory subsystem 3008 and file storage subsystem 3014), a set of user interface input and output devices 3018, and an interface to outside networks 3016. This interface is shown schematically as "Network Interface" block 3016, and is coupled to corresponding interface devices in other data processing systems via communication network interface 3024. Data processing system 3000 can include, for example, one or more computers, such as a personal computer, workstation, mainframe, laptop, and the like.

The user interface input devices 3018 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 3006 maintains the basic required programming, including computer readable media having instructions (e.g., operating instructions, etc.), and data constructs. The program modules discussed herein are typically stored in storage subsystem 3006. Storage subsystem 3006 typically includes memory subsystem 3008 and file storage subsystem 3014. Memory subsystem 3008 typically includes a number of memories (e.g., RAM 3010, ROM 3012, etc.) including computer readable memory for storage of fixed instructions, instructions and data during program execution, basic input/output system, etc. File storage subsystem 3014 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 3020 includes any means for obtaining a digital representation (e.g., images, surface topography data, etc.) of a patient's teeth (e.g., by scanning physical models of the teeth such as casts 3021, by scanning impressions taken of the teeth, or by directly scanning the intraoral cavity), which can be obtained either from the patient or from treating professional, such as an orthodontist, and includes means of providing the digital representation to data processing system 3000 for further processing. Scanner 3020 may be located at a location remote with respect to other components of the system and can communicate image data and/or information to data processing system 3000, for example, via a network interface 3024. Fabrication system 3022 fabricates appliances 3023 based on a treatment plan, including data set information received from data processing system 3000. Fabrication machine 3022 can, for example, be located at a remote location and receive data set information from data processing system 3000 via network interface 3024.

The data processing aspects of the methods described herein (e.g., the method 2700) can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor will receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An orthodontic appliance for repositioning a patient's teeth, the orthodontic appliance comprising:
    a first shell section comprising a first tooth receiving cavity shaped to receive a first portion of the patient's teeth and a first discontinuity formed on the first shell section;
    a second shell section comprising a second tooth receiving cavity shaped to receive a second portion of the patient's teeth and a second discontinuity formed on the second shell section, wherein the first shell section and the second shell section are separated by a spacing between the first portion of the patient's teeth and the second portion of the patient's teeth when the orthodontic appliance is worn on the patient's teeth;
    a first elastic member coupled to the first shell section, wherein the first elastic member interacts with the first discontinuity to exert a first force on the first portion of the patient's teeth; and
    a second elastic member coupled to the second shell section, wherein the second elastic member interacts with the second discontinuity to exert a second force on the second portion of the patient's teeth, wherein the first force and the second force increase the spacing between the first portion of the patient's teeth and the second portion of the patient's teeth.

2. The orthodontic appliance of claim 1, wherein the first discontinuity comprises an aperture or cut in the first shell section.

3. The orthodontic appliance of claim 1, wherein the second discontinuity comprises an aperture or cut in the second shell section.

4. The orthodontic appliance of claim 1, wherein a portion of the first elastic member spans the first discontinuity.

5. The orthodontic appliance of claim 1, wherein a portion of the second elastic member spans the second discontinuity.

6. The orthodontic appliance of claim 1, wherein at least a portion of the first elastic member is adjacent to the spacing between the first portion of the patient's teeth and the second portion of the patient's teeth when the orthodontic appliance is worn on the patient's teeth.

7. The orthodontic appliance of claim 1, wherein at least a portion of the second elastic member is adjacent to the spacing between the first portion of the patient's teeth and the second portion of the patient's teeth when the orthodontic appliance is worn on the patient's teeth.

8. The orthodontic appliance of claim 1, wherein the first elastic member is secured to the first shell section at a first end and a second end, wherein the first end is on a buccal side of the first shell section, and the second end is on a lingual side of the first shell section.

9. The orthodontic appliance of claim 1, wherein the second elastic member is secured to the second shell section at a first end and a second end, wherein the first end is on a buccal side of the second shell section, and the second end is on a lingual side of the second shell section.

10. The orthodontic appliance of claim 1, wherein the first discontinuity deforms when the orthodontic appliance is worn on the patient's teeth.

11. The orthodontic appliance of claim 1, wherein the second discontinuity deforms when the orthodontic appliance is worn on the patient's teeth.

12. The orthodontic appliance of claim 1, wherein the orthodontic appliance further comprises at least one channel configured to receive an attachment mounted on a tooth of the patient.

13. The orthodontic appliance of claim 12, wherein the at least one channel is formed within an internal cavity of the first shell section or the second shell section.

14. The orthodontic appliance of claim 12, wherein the at least one channel extends along a mesial-distal direction.

15. The orthodontic appliance of claim 12, wherein the at least one channel extends along an occlusal-gingival direction.

16. An orthodontic system comprising:
a plurality of orthodontic appliances, wherein the plurality of orthodontic appliances are configured to move one or more of a patient's teeth from a first tooth arrangement to a second tooth arrangement when worn by the patient, and wherein at least one orthodontic appliance of the plurality of orthodontic appliances comprises:
a first shell section comprising a first tooth receiving cavity shaped to receive a first portion of the patient's teeth and a first discontinuity formed on the first shell section;
a second shell section comprising a second tooth receiving cavity shaped to receive a second portion of the patient's teeth and a second discontinuity formed on the second shell section, wherein the first shell section and the second shell section are separated by a spacing between the first portion of the patient's teeth and the second portion of the patient's teeth when the at least one orthodontic appliance is worn on the patient's teeth;
a first elastic member coupled to the first shell section, wherein the first elastic member interacts with the first discontinuity to exert a first force on the first portion of the patient's teeth; and
a second elastic member coupled to the second shell section, wherein in the second elastic member interacts with the second discontinuity to exert a second force on the second portion of the patient's teeth, wherein the first force and the second force increase the spacing between the first portion of the patient's teeth and the second portion of the patient's teeth.

17. The orthodontic system of claim 16, wherein the first discontinuity comprises an aperture or cut in the first shell section.

18. The orthodontic system of claim 16, wherein the second discontinuity comprises an aperture or cut in the second shell section.

19. The orthodontic system of claim 16, wherein a portion of the first elastic member spans the first discontinuity.

20. The orthodontic system of claim 16, wherein a portion of the second elastic member spans the second discontinuity.

21. The orthodontic system of claim 16, wherein at least a portion of the first elastic member is adjacent to the spacing between the first portion of the patient's teeth and the second portion of the patient's teeth when the at least one orthodontic appliance is worn on the patient's teeth.

22. The orthodontic system of claim 16, wherein at least a portion of the second elastic member is adjacent to the spacing between the first portion of the patient's teeth and the second portion of the patient's teeth when the at least one orthodontic appliance is worn on the patient's teeth.

23. The orthodontic system of claim 16, wherein the first elastic member is secured to the first shell section at a first end and a second end, wherein the first end is on a buccal side of the first shell section, and the second end is on a lingual side of the first shell section.

24. The orthodontic system of claim 16, wherein the second elastic member is secured to the second shell section at a first end and a second end, wherein the first end is on a buccal side of the second shell section, and the second end is on a lingual side of the second shell section.

25. The orthodontic system of claim 16, wherein the first discontinuity deforms when the at least one orthodontic appliance is worn on the patient's teeth.

26. The orthodontic system of claim 16, wherein the second discontinuity deforms when the at least one orthodontic appliance is worn on the patient's teeth.

27. The orthodontic system of claim 16, wherein the at least one orthodontic appliance of the plurality of orthodontic appliances further comprises at least one channel configured to receive an attachment mounted on a tooth of the patient.

28. The orthodontic system of claim 27, wherein the at least one channel is formed within an internal cavity of the first shell section or the second shell section.

29. The orthodontic system of claim 27, wherein the at least one channel extends along a mesial-distal direction.

30. The orthodontic system of claim 27, wherein the at least one channel extends along an occlusal-gingival direction.

* * * * *